United States Patent [19]
Tashiro et al.

[11] Patent Number: 5,565,964
[45] Date of Patent: Oct. 15, 1996

[54] MULTIFUNCATION IMAGE PROCESSING APPARATUS

[75] Inventors: Hirohiko Tashiro; Toshiya Kanazawa, both of Yokohama; Hidehiko Asai; Michiko Hirayu, both of Kawasaki, all of Japan

[73] Assignee: Canon Kabushiki Kaisha, Tokyo, Japan

[21] Appl. No.: 502,469

[22] Filed: Jul. 14, 1995

Related U.S. Application Data

[63] Continuation of Ser. No. 278,230, Jul. 21, 1994, abandoned.

[30] Foreign Application Priority Data

Jul. 23, 1993 [JP] Japan .................... 5-226591

[51] Int. Cl.$^6$ .................... G03G 15/00; G03G 21/14
[52] U.S. Cl. .................... 355/210; 355/209; 355/314; 355/202; 358/425
[58] Field of Search .................... 355/314, 313, 355/203, 204, 209, 210, 200, 202; 358/425

[56] References Cited

U.S. PATENT DOCUMENTS

| | | |
|---|---|---|
| 4,633,405 | 12/1986 | Ito et al. . |
| 4,814,824 | 3/1989 | Ito et al. . |
| 4,835,572 | 5/1989 | Ide .................... 355/314 X |
| 4,857,957 | 8/1989 | Kusumoto .................... 355/314 |
| 4,963,946 | 10/1990 | Maruta et al. .................... 355/313 X |
| 5,270,779 | 12/1993 | Kawai .................... 355/313 |
| 5,325,209 | 6/1994 | Manabe .................... 358/437 |
| 5,363,173 | 11/1994 | Alesio et al. .................... 355/204 |

FOREIGN PATENT DOCUMENTS 5-130311  5/1993  Japan .

Primary Examiner—R. L. Moses
Attorney, Agent, or Firm—Fitzpatrick, Cella, Harper & Scinto

[57] ABSTRACT

A multifunction image processing apparatus allows autoclear function to clear only a process mode designated by an operator, if no key-input has been made at an operation panel, otherwise, allows the autoclear function to operate against a pre-designated function and/or a currently-used function mode. The operator can designate an initial picture of a process mode to be displayed after autoclearing can be designated. The apparatus has good operability since the autoclear can be performed in accordance with the respective functions.

11 Claims, 50 Drawing Sheets

↓ REGISTRATION OF STANDARD MODE

↑ C     ↓ OK

↕

NORMAL STANDARD DISPLAY

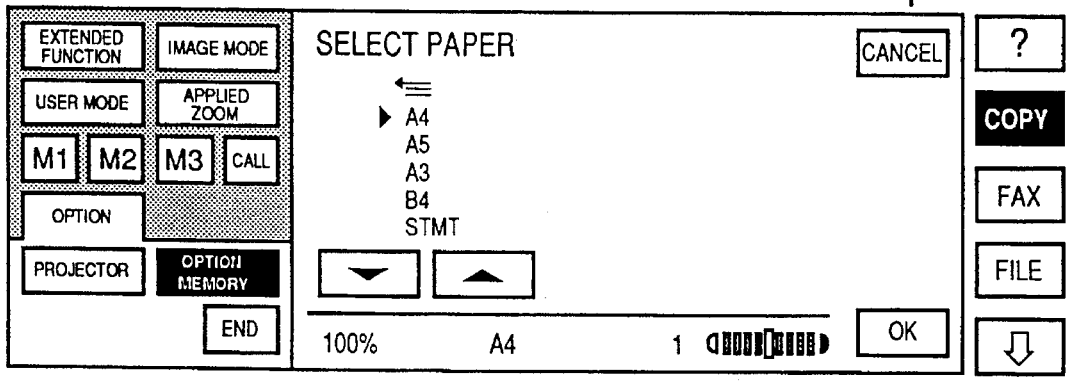
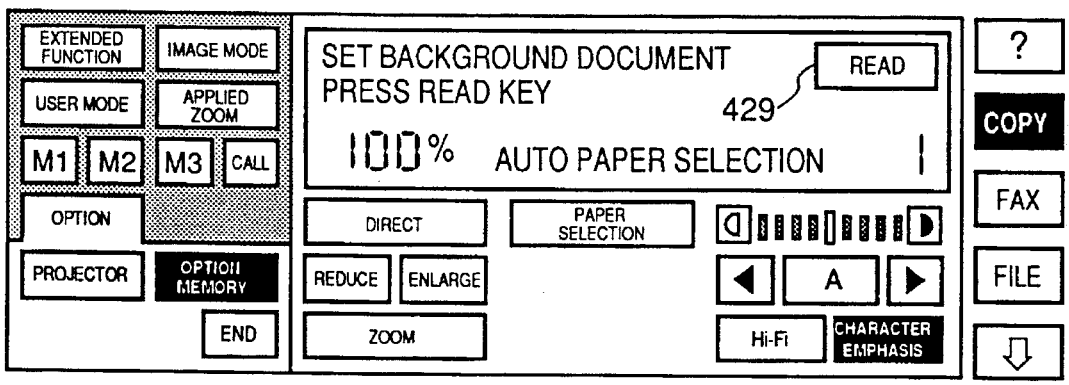
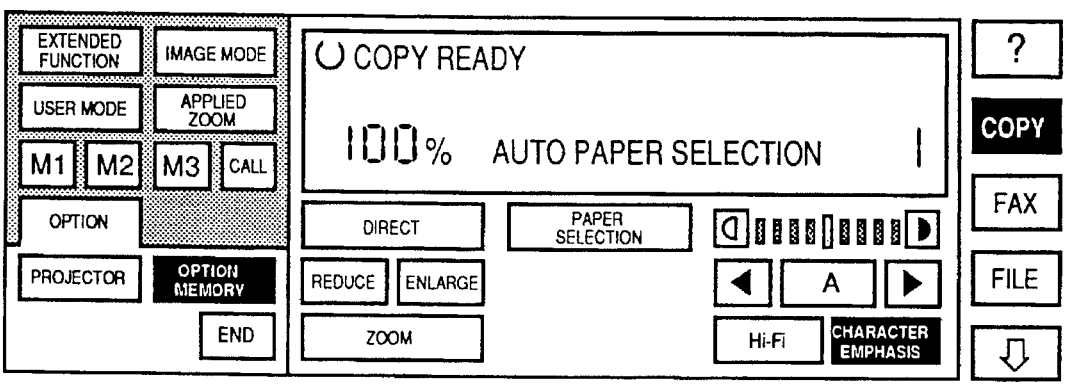

↓ INPUT FIRST POINT

↓ OK

FIG. 34A
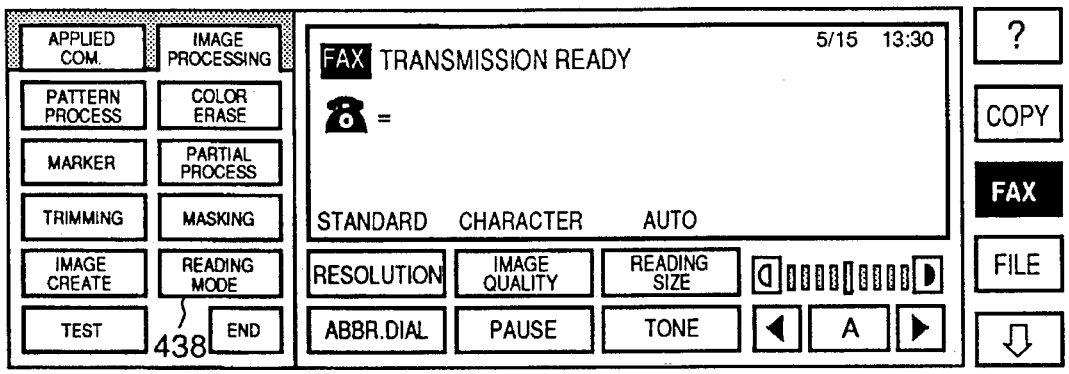
FIG. 34B
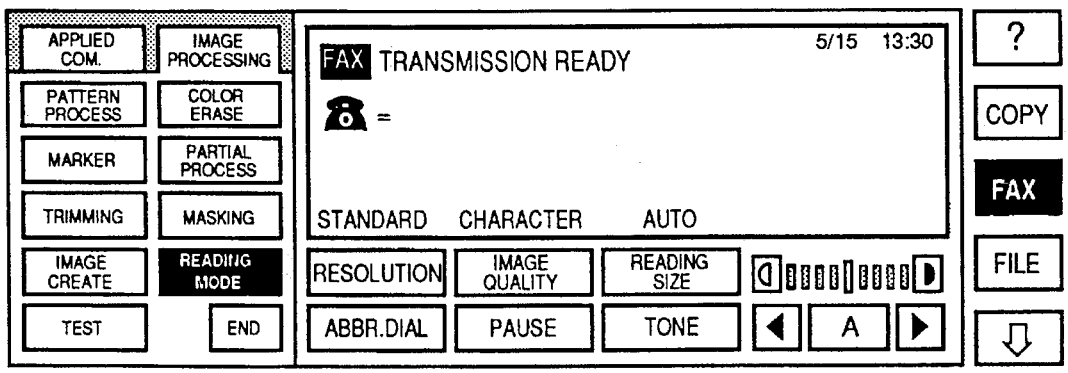
FIG. 34C
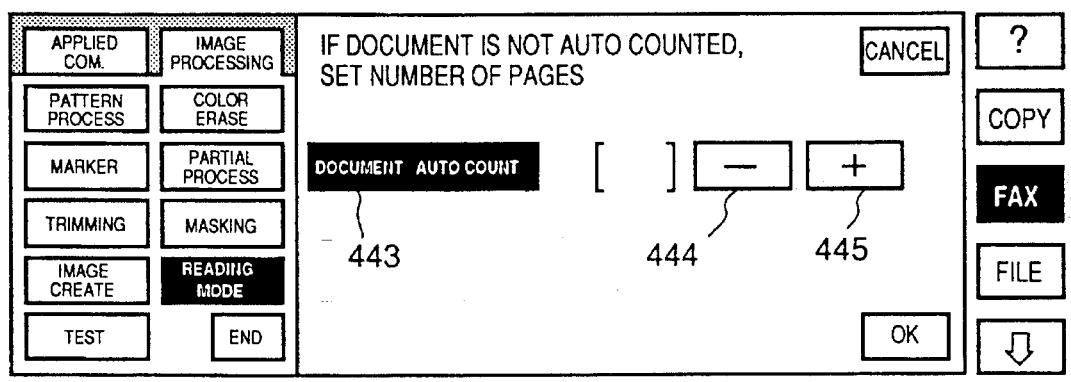
FIG. 36A

DOCUMENT AUTO COUNT

CANCEL

| APPLIED COM. | IMAGE PROCESSING |
|---|---|
| PATTERN PROCESS | COLOR ERASE |
| MARKER | PARTIAL PROCESS |
| TRIMMING | MASKING |
| IMAGE CREATE | READING MODE |
| TEST | END |

IF DOCUMENT IS NOT AUTO COUNTED, SET NUMBER OF PAGES

CANCEL

DOCUMENT AUTO COUNT    [ 2 ]   —   +

OK

?  COPY  FAX  FILE  ⬇

| APPLIED COM. | IMAGE PROCESSING |
|---|---|
| PATTERN PROCESS | COLOR ERASE |
| MARKER | PARTIAL PROCESS |
| TRIMMING | MASKING |
| IMAGE CREATE | READING MODE |
| TEST | END |

SELELECT DOCUMENT SIZE

CANCEL

A4   STMT
A5   LTR
B5

(EXCEPT THESE SIZES 2in1 IS IMPOSSIBLE)

OK

?  COPY  FAX  FILE  ⬇

↓ OK      ↓ CANCEL

FIG. 34B      FIG. 35D

MULTIFUNCATION IMAGE PROCESSING APPARATUS

This application is a continuation of application Ser. No. 08/278,230 filed Jul. 21, 1994, now abandoned.

BACKGROUND OF THE INVENTION

1. Field of Invention

Present invention relates to an image processing apparatus having a plurality of functions such as copying, printing and facsimile functions.

2. Related Art

Recently, multifunction image processing apparatuses have been put into practical use. Those apparatuses use a scanner and a printer of a digital copying machine to perform facsimile communication, or use the printer of the digital copying machine to code data from a computer into bitmap data and print out images.

Such apparatus has three or more functions in one unit, e.g., a copy function, a facsimile function, a printer formatter function, an image file function and an image memory function, as disclosed in Japanese Patent Application Laid-Open No. 5-130311.

Setting of these functions are made such that corresponding icons are displayed on an operation panel, and when one icon is designated, the function is set. In the copy function, no key-input at the operation panel for a predetermined interval causes an autoclear function that automatically resets the mode of the copy function to a standard mode.

However, in the above multifunction apparatus, the autoclear function clears all the functions. For example, if the autoclear function is performed for the copy function while the facsimile function operates, the autoclear function also clears the facsimile function.

SUMMARY OF THE INVENTION

The present invention has been made in consideration of the above situation, and has as its object to provide an image processing apparatus which eliminates the above-mentioned drawback of the conventional apparatus.

Another object of the present invention is to provide an image processing apparatus which allows autoclear function to operate in a pre-designated function and/or a current function.

Another object of the present invention is to provide an image processing apparatus which allows designation of a function to be displayed after autoclear operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 27A to 27C illustrate a display on the operation panel in the memory-synthesizing mode setting process;

FIGS. 34A to 34C illustrate a display on the operation panel for setting a reading mode of the facsimile transmission function;

FIGS. 36A and 36B illustrate a display on the operation panel in the reading mode setting of the facsimile transmission function;

DETAILED DESCRIPTION OF THE PREFERRED EMBODIMENTS(S)

Preferred embodiments of the present invention will be described in detail in accordance with the accompanying drawings.

First Embodiment

Figure 1:
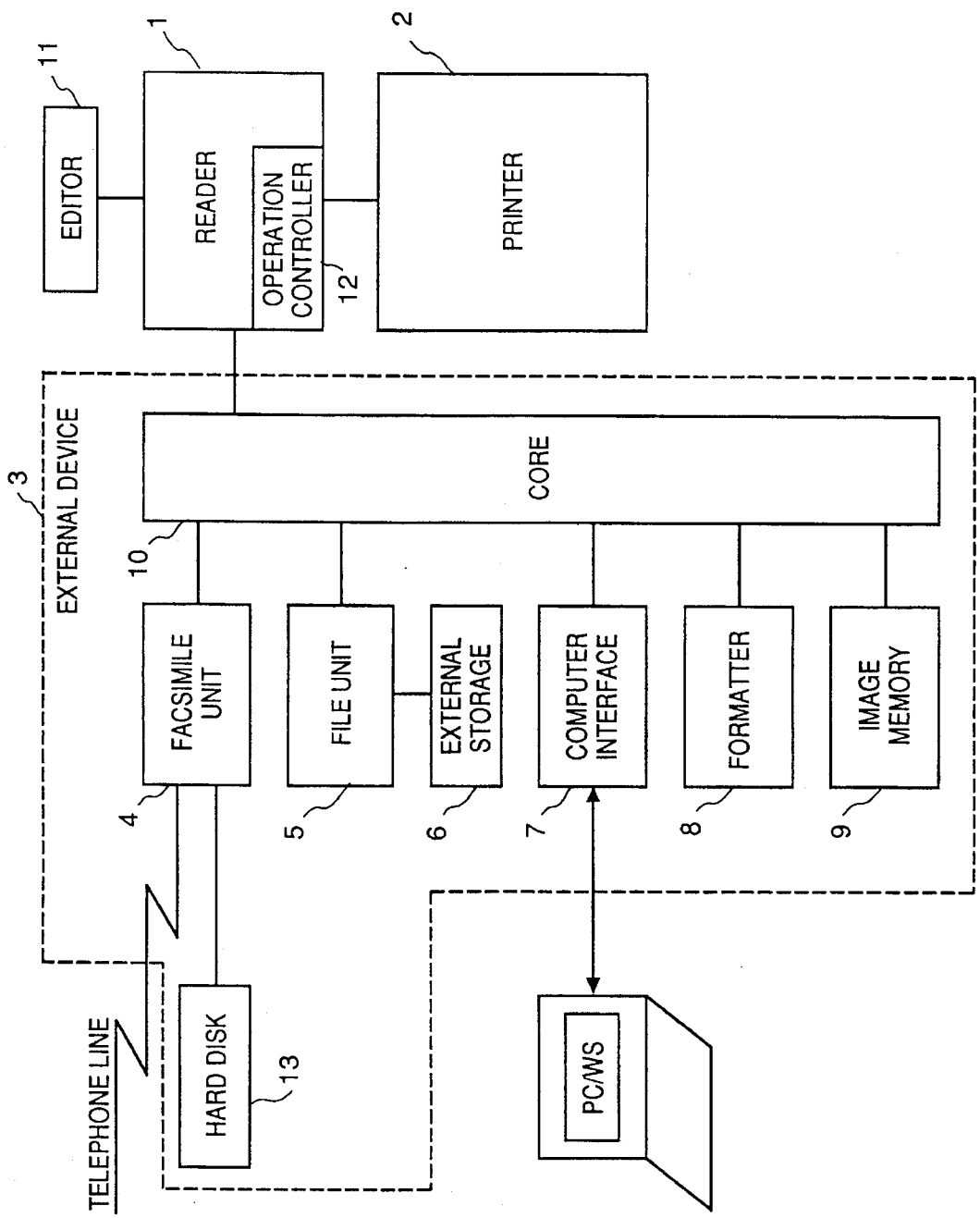
FIG. 1 is a block diagram showing the construction of an image processing apparatus according to a first embodiment of the present invention.

FIG. 1 shows the configuration of an image processing apparatus according to a first embodiment of the present invention.

In FIG. 1, reference numeral 1 denotes an image input unit (hereinafter referred to as "reader") for reading an original image and outputting image data; 2, an image output unit (hereinafter referred to as "printer"), having a plural kinds of paper cassettes, for outputting images based on the image data in accordance with a printing instruction; and 3, an external device electrically connected with the reader 1, having various functions. The external device 3 comprises a facsimile unit 4, a file unit 5, an external storage 6 connected to the file unit 5, a computer interface 7 for connecting the apparatus to a computer 14 and a LAN, a formatter 8 for converting information from the computer 14 into image data, an image memory 9 for storing information from the reader 1 or temporarily storing information from the computer 14, and a core 10 for controlling the respective functions. Numeral 11 denotes an editor connected to the reader 1, for inputting area coordinates; and 12 an operation controller provided in the reader 1, for controlling display of various settings and various inputs. Note that the operation controller 12 has a CPU, a RAM and a ROM. The facsimile unit 4 comprises a hard disk 13.

Figure 2:
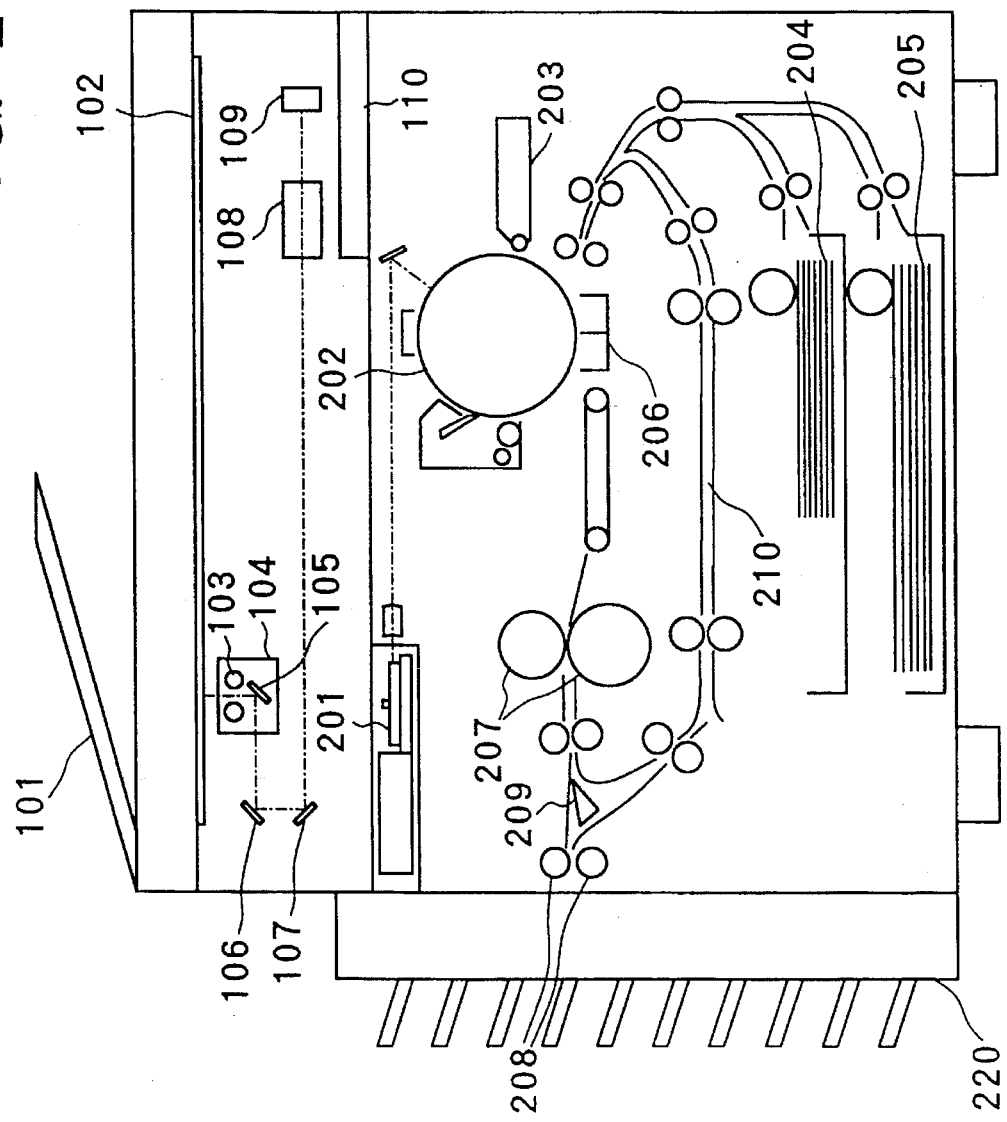
FIG. 2 is a cross-sectional view showing the structure of a reader and a printer in FIG. 1.

FIG. 2 shows the structure of the reader 1 and the printer 2 in FIG. 1. The operation of the reader 1 and the printer 2 will be described with reference to FIG. 2.

Original documents placed on a document handler 101 are sequentially conveyed to a glass platen 102, by one sheet at a time. When the original reaches a predetermined position on the glass platen 102, a lamp 103 of a scanner 104 emits light, and the scanner 104 moves to irradiates the original. The reflection light from the original enters a CCD image sensor 109 (hereinafter referred to as "CCD") via mirrors 105, 106, 107 and a lens 108.

The CCD 109 performs photoelectric conversion upon the input light to obtain an electric signal. An image processor 110 performs various image processings upon the electric signal and outputs the signal into an external switching circuit (not shown).

The external switching circuit is a selector to transfer the signal from the reader 1 to the printer 2 or to the external device 3. Further, the external switching circuit selects any of the signal from the reader 1 and a signal from the external device 3 and transfers the signal to the printer 2.

An exposure controller 201 converts the electric signal, outputted to the printer 2 by the external switching circuit of the image processor 110, into a modulated optical signal, and irradiates a photoreceptor 202 with the optical signal. A developer 203 develops a latent image formed on the photoreceptor 202.

One of recording sheet trays 204 and 205 supplies a recording sheet in synchronization with the developing timing, and a transfer unit 206 transfers the developed image onto the recording sheet. A fixer 207 fixes the image to the recording sheet, and a paper discharging unit 208 discharges the sheet to outside of the apparatus. When a sorter 220 is used, recording sheet is discharged to one of the bins of the sorter 220, otherwise, it is discharged to the top bin.

Next, a method for printing a plurality of images onto both sides of one recording sheet will be described below.

The recording sheet fixed by the fixer 207 is once conveyed to the paper discharging unit 208. Thereafter, the transfer direction is reversed, and the recording sheet is conveyed to a retransfer sheet tray 210 via a conveying direction switcher 209. As the next original is prepared, the original image is read in the above-described manner, however, in this printing, the retransfer sheet tray 210 supplies the reversed recording sheet. As a result, images read from the two originals are printed on the front and rear sides of the same recording sheet.

Figure 3:
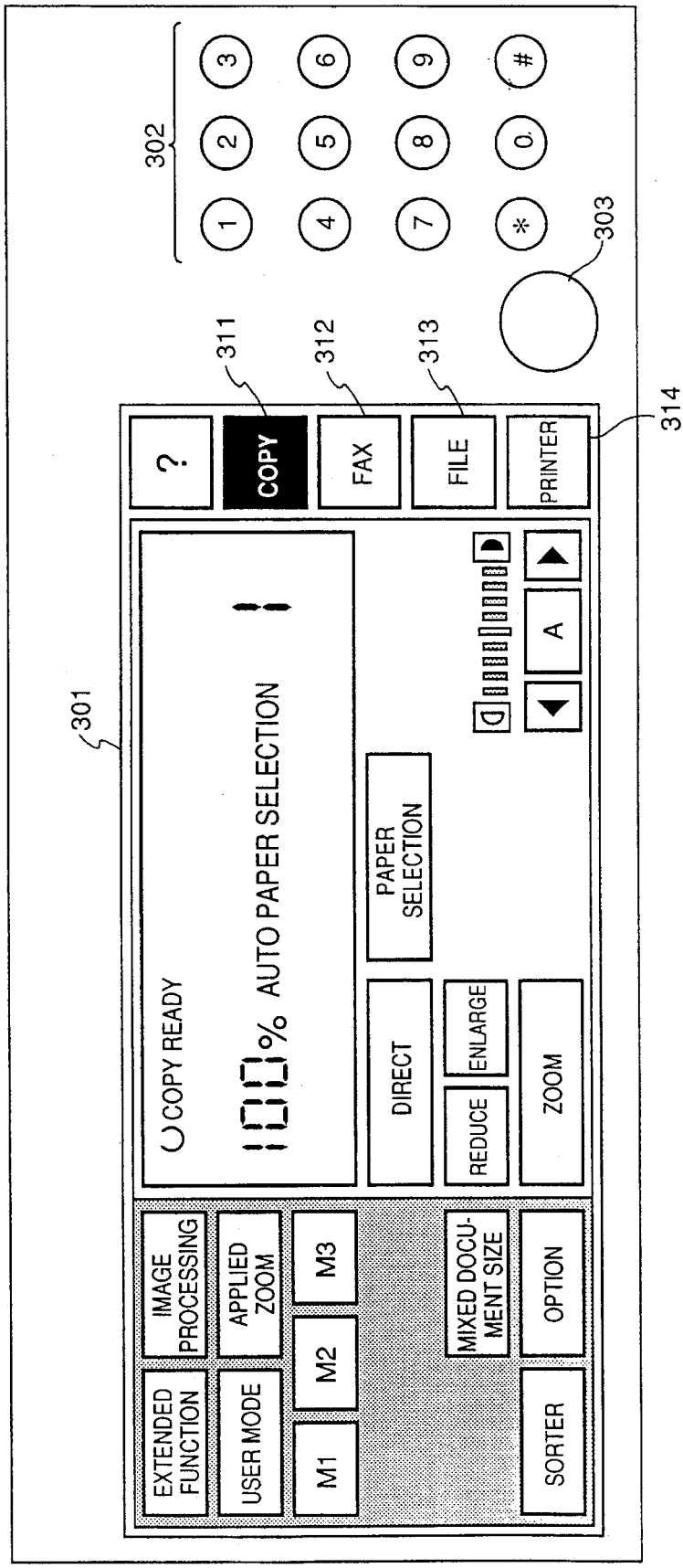
FIG. 3 illustrates an operation panel at the reader in FIG. 1.

FIG. 3 shows an operation panel at the reader 1. In FIG. 3, numeral 301 denotes a display screen for displaying system operation statuses and messages to an operator. The surface of the display screen 301 is a touch panel having selection keys. Numeral 302 denotes ten-keys for key-inputting numerals; 303, a start key for starting operation; 311, a selection key "COPY" for copy function; 312, a selection key "FAX" for facsimile function; 313, a selection key "FILE" for image file function; 314, a selection key "PRINTER" for a printer function; and 310, a help key "?" for explanations of operations by the respective keys.

Next, the operation of the apparatus according to the present embodiment will be described with reference to the flowcharts in FIGS. 4 to 9.

Figure 4:
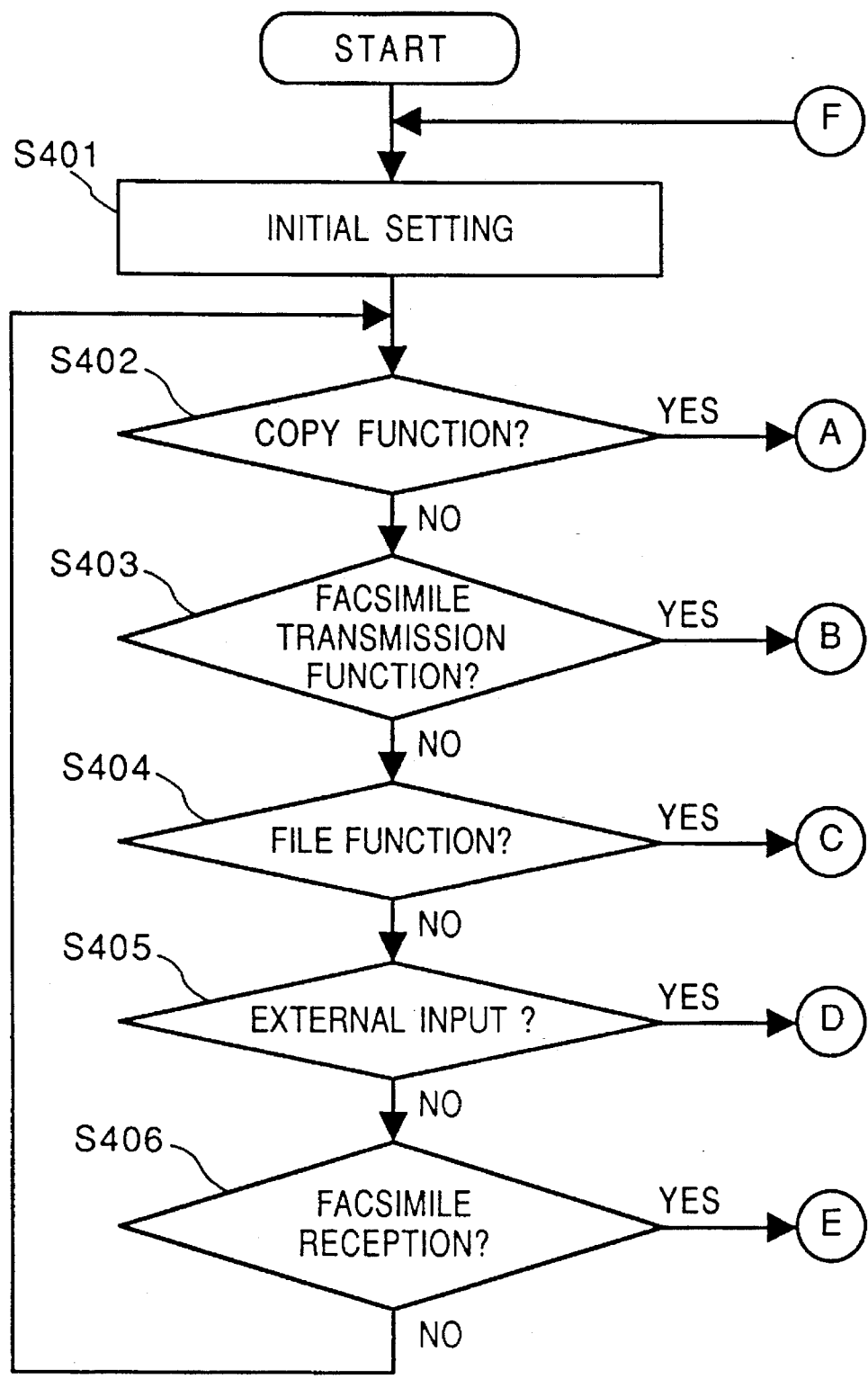
FIG. 4 is a flowchart showing the main operation of the first embodiment.

In FIG. 4, after the power of the apparatus is turned on, initial setting is performed in step S401. For example, the display screen 301 displays a picture representing mode selection keys to be described later, and as the operator touches the panel surface at one of the selection keys, the mode corresponding to the selection key is selected. Hereinafter, a picture displayed on the display screen 301 will be referred to as "panel image" also.

Figure 10:
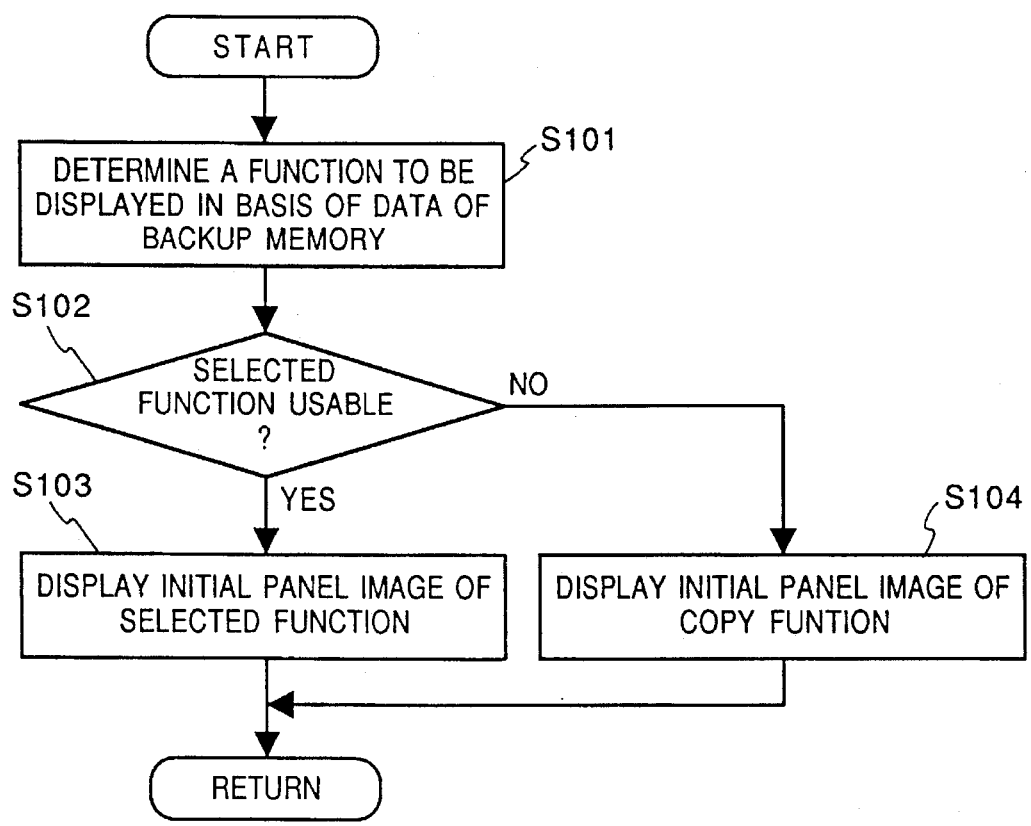
FIG. 10 is a flowchart showing initial setting operation according to the first embodiment.

FIG. 10 shows the initialization in step S401 in detail. After the power is turned on, in step S101, a picture for setting mode for one function to be displayed is determined from a pre-set data value in a backup memory of the reader 1. In step S102, whether or not the selected function can be used is determined. If YES, the process proceeds to step S103 in which a picture of the selected function is displayed, and the process returns to the main routine.

On the other hand, if the selected function cannot be used, the process proceeds to step S104, in which a panel image for copy function is displayed, and the process returns to the main routine. Note that a common function setting mode to be described later is employed to determine a panel image(picture) of one function to be selected after the power is turned on.

The display of selection keys for the respective functions are made depending upon presence/absence of boards of the respective function attachable to the apparatus of the embodiment.

Figure 11:
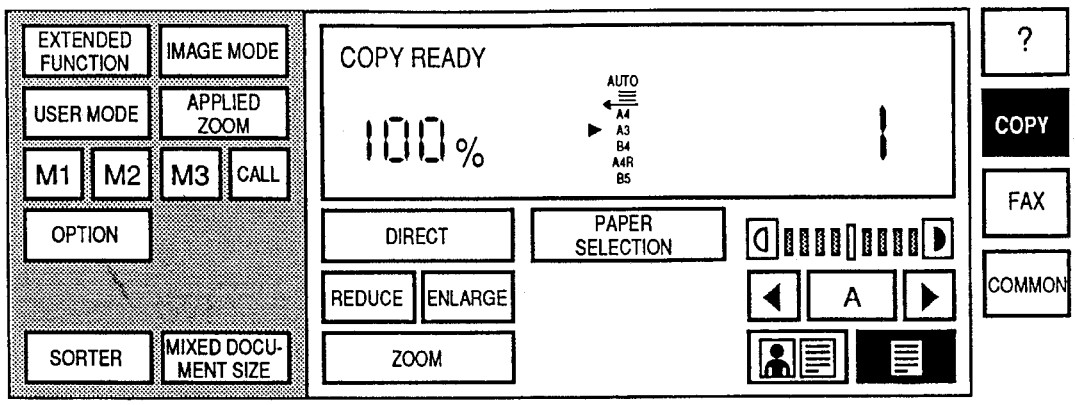
FIG. 11 illustrates a display on the operation panel when a facsimile unit is attached to the apparatus of the first embodiment.

For example, in a case where only a facsimile function board is attached to the apparatus, the displayed panel image is as shown in FIG. 11. In a case where the boards of the facsimile unit, the printer formatter and the file unit are attached, a displayed panel image is as shown in FIG. 12.

Figure 12:
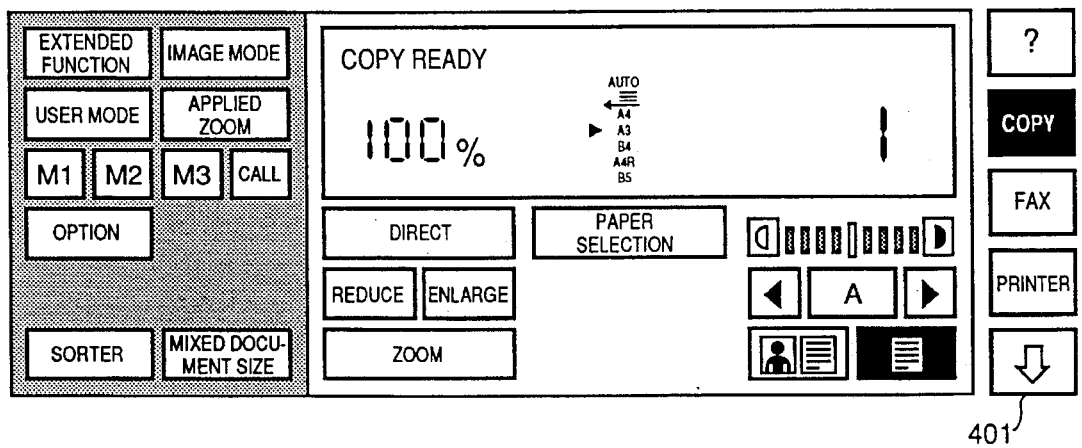
FIG. 12 illustrates a display on the operation panel when the facsimile unit, a printer formatter and a file unit are attached to the apparatus of the first embodiment.
Figure 13:
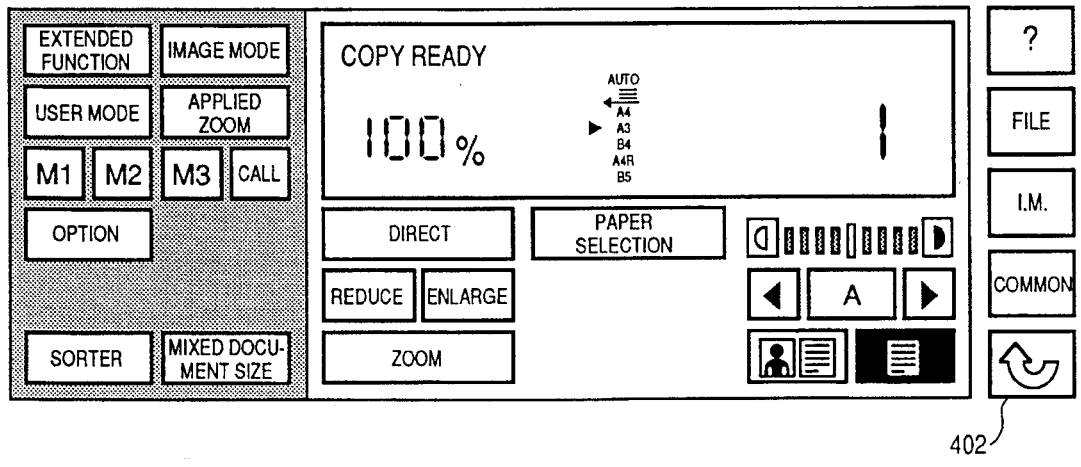
FIG. 13 illustrates the display on the operation panel in FIG. 12 when a downward scroll key is pressed.

In FIG. 12, if a downward scroll key 401 is pressed, the selection items change; as shown in FIG. 13, a file "FILE" key appears in place of COPY key and the common function "COMMON" key appears in place of the PRINTER key. In FIG. 13, if an upward scroll key 402 is pressed, the COPY key appears in place of the FILE key and the PRINTER key again appears in place of the COMMON key.

Thus, as the initial setting in step S401 in FIG. 4 is completed, in step S402, whether or not the selected function is the copy function is determined. If YES, the process advances to step S501 in FIG. 5. On the other hand, if NO in step S402, the process proceeds to step S403, in which whether or not the selected function is a facsimile transmission function is determined. If YES, the process advances to step S601 in FIG. 6.

If the function selected in step S403 is not the facsimile transmission function, the process proceeds to step S404, in which whether or not the selected function is the file function is determined. If YES, the process advances to step S701 in FIG. 7, while if NO, whether or not there is an input from the computer interface (external input) is determined in step S405. If YES, the process advances to step S801 in FIG. 8.

If NO in step S405, whether or not there is a facsimile reception is determined in step S406. If NO, the process returns to step S402 to repeat the determination of selected function.

On the other hand, if YES in step S406, the process advances to step S901.

The processing for a case where the copy function is selected will be described in detail with reference to FIG. 5.

In step S501, initial setting in the copy function is performed. In step S502, key-inputs at the indicator 301 and the ten-keys 302 on the operation controller are read, and copying conditions are set. In step S503, pressing of the start key 303 is awaited.

Figure 14:
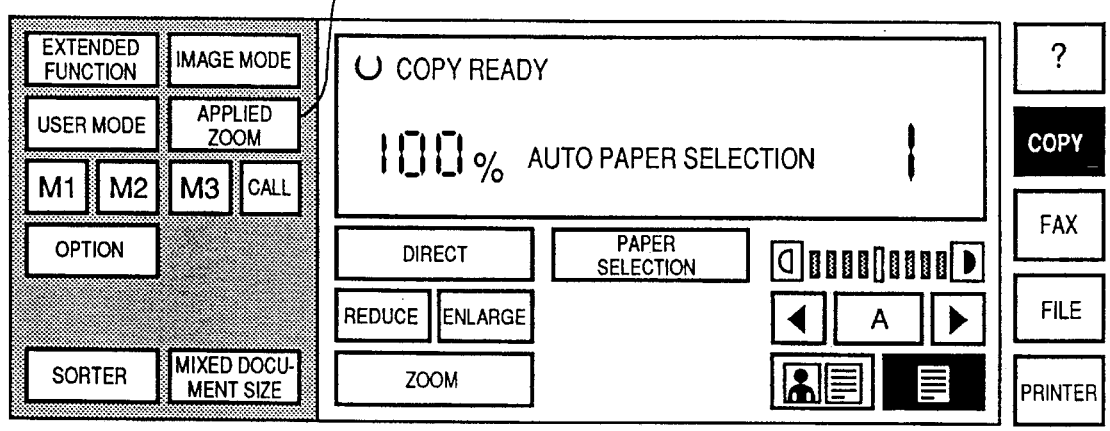
FIG. 14 illustrates an initial display on the operation panel in the copying processing according to the first embodiment.
Figure 15:
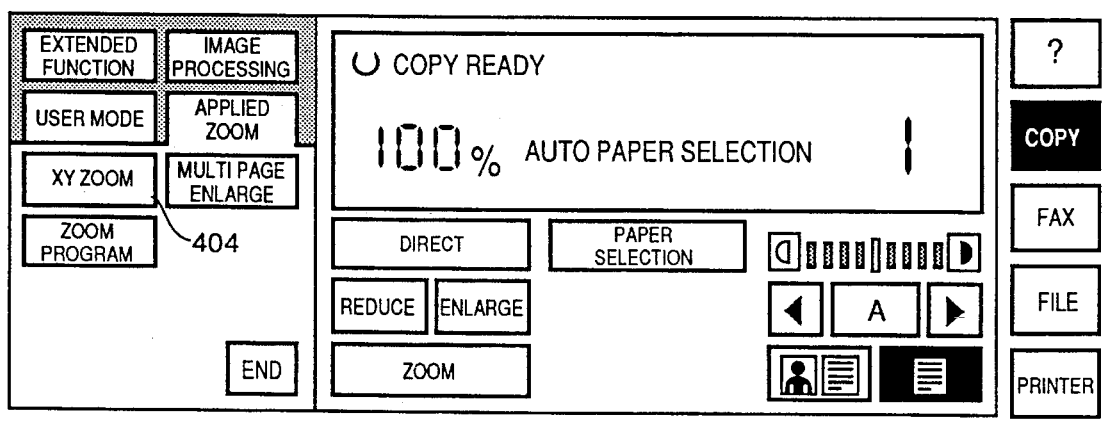
FIG. 15 illustrates a display on the operation panel in an applied zoom mode according to the first embodiment.

FIG. 14 shows the initial panel image in the copy function. When the operator requires zooming independently in a main-scanning direction and a subscanning direction, the operator presses an APPLIED ZOOM key 403 to select an applied zooming mode. In this mode, the display is as shown in FIG. 15. If the operator presses an XY ZOOM key 404, a panel image for XY zoom setting shown in FIG. 16 appears.

In the XY zoom setting panel image, the operator first presses an X key to confirm the setting of x-directional (subscanning direction) zoom ratio, then uses a "−" key and a "+" key to change the ratio. The ten-keys 302 can also be used for inputting the ratio. The ratio continues to change while the "−" key or the "+" key is being pressed. When the "−" key or the "+" key is released, the ratio is set to the value at the time. These keys are touch panel keys comprising touch sensors.

Figure 16:
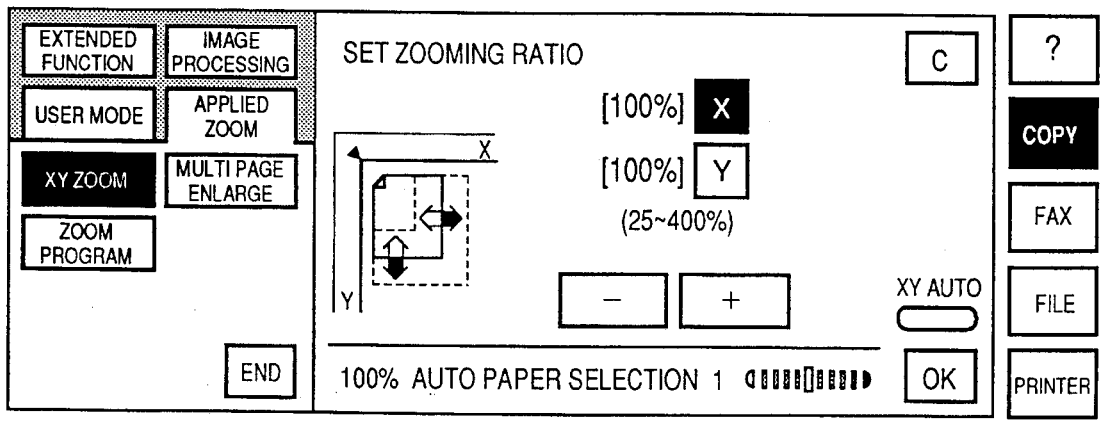
FIG. 16 illustrates a display on the operation panel for XY zoom setting according to the first embodiment.

In FIG. 16, the y-directional (main-scanning directional) zooming ratio is designated in a similar manner to that in the x-directional (subscanning directional) zooming ratio. If a clear "C" key is pressed, the xy zoom setting is initialized, and the panel image in FIG. 16 changes to the image in FIG. 15. In FIG. 16, if an OK key is pressed, the xy zoom setting is confirmed and the panel image changes to the image in FIG. 14. Other functions such as an extended function and an image processing function are operated in a similar manner.

Figure 5:
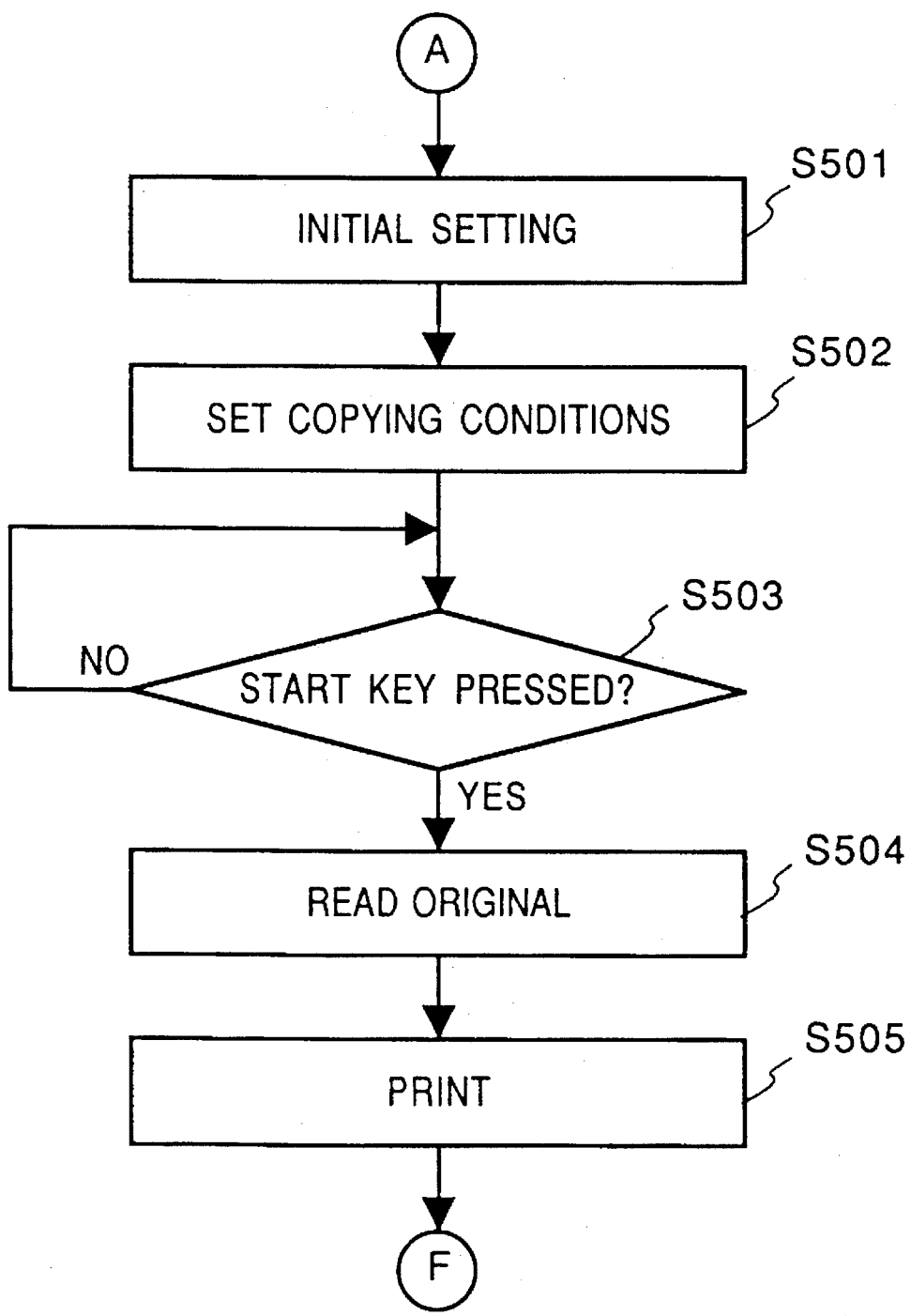
FIG. 5 is a flowchart showing the operation in a copy function according to the first embodiment.

Next, if it is determined that the start key 303 has been pressed in step S503 in FIG. 5, the process proceeds to step S504, in which the reader 1 reads an original, and then proceeds to step S505, in which the printer 2 performs printing. As the printing is completed, the process returns to step S401 (initial setting) in FIG. 4.

Figure 17:
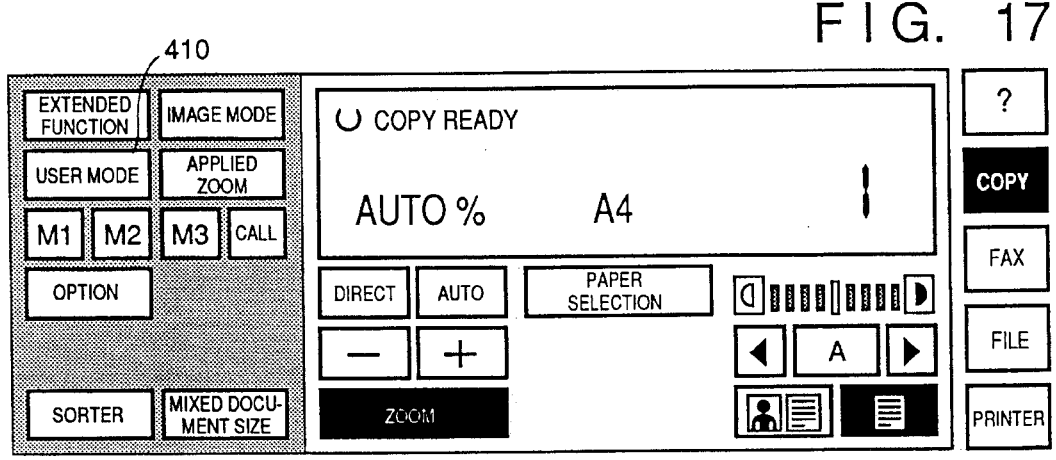
FIG. 17 illustrates a display on the operation panel for a mode different from a standard mode.
Figure 18:
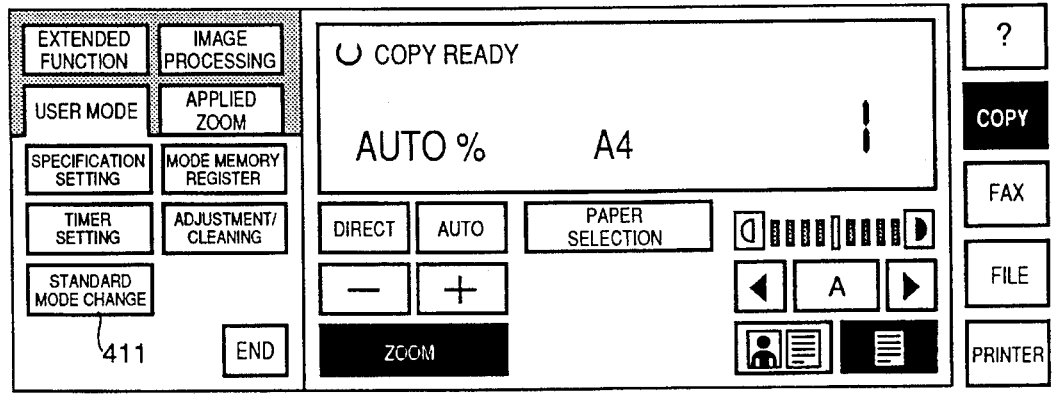
FIG. 18 illustrates a display on the operation panel when a user mode is selected.
Figure 19A:
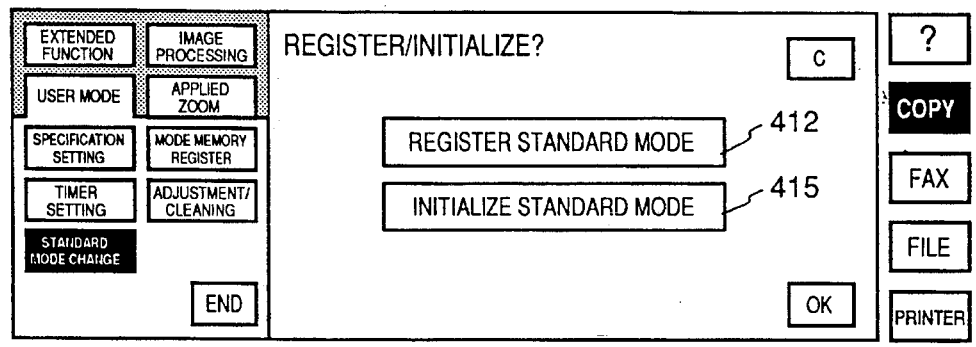
FIGS. 19A to 19D illustrate a display on the operation panel for changing the standard mode of copy function according to the first embodiment.
Figure 19B:
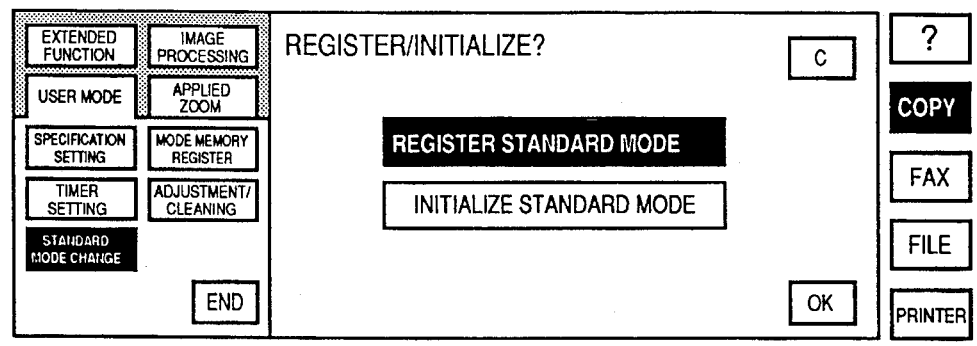
Figure 19C:
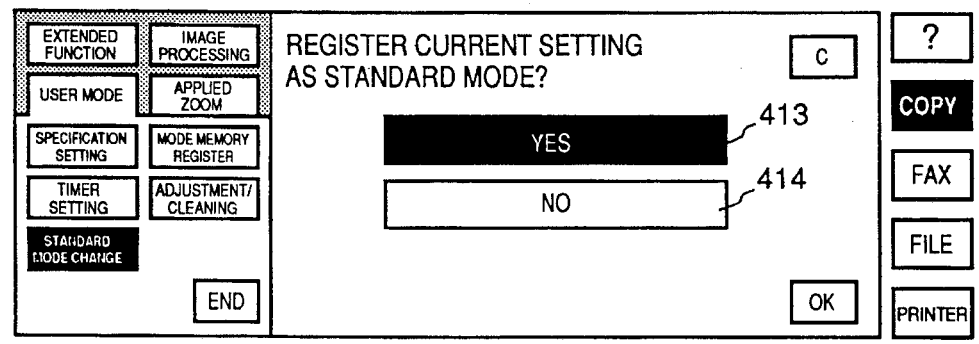
Figure 19D:
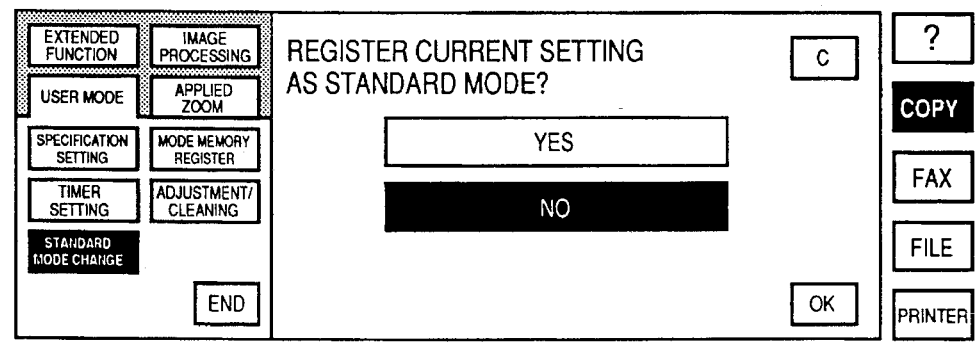

FIGS. 19A to 19D and FIGS. 20A to 20C show a panel image in modifying a standard mode including settings such as enlargement/reduction ratio, paper selection and the number of copies. This allows the operator to arbitrarily modify or initialize a standard mode to be set after turning on the power, or after the autoclear operation, or resetting operation. For example, FIG. 17 shows settings of the copy function, where the enlargement/reduction ratio is automatic enlargement/reduction, the recording sheet size is A4, and the number of copies is one. If a USER MODE key 410 is pressed, the panel image changes to an image shown in FIG. 18. If a STANDARD MODE CHANGE key 411 is selected, the panel image changes to an image shown in FIG. 19A, which has a selections keys 412 "REGISTER STANDARD MODE" and 415 "INITIALIZE STANDARD MODE". If the REGISTER STANDARD MODE key 412 is selected, the panel image changes to a confirmation image shown in FIG. 19B. If the OK key is selected, the panel image changes to an image, which has a message "REGISTER CURRENT SETTING AS STANDARD MODE?" with selection keys 413 "YES" and 414 "NO". If the YES key 413 is selected, the display of the YES key 413 is complemented shown in FIG. 19C. On the other hand, if the NO key 414 is selected, the display of the NO key 414 is complemented as shown in FIG. 19D. In FIG. 19C or 19D, if the selection is desirable, the operator presses the OK key in the panel image. Then the panel image changes to the image in FIG. 17.

Figure 20A:
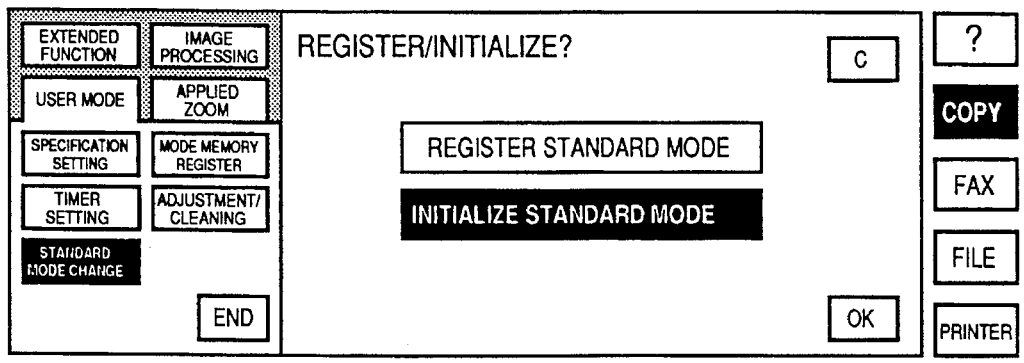
FIGS. 20A to 20C also illustrate a display on the operation panel in the standard mode changing process.
Figure 20B:
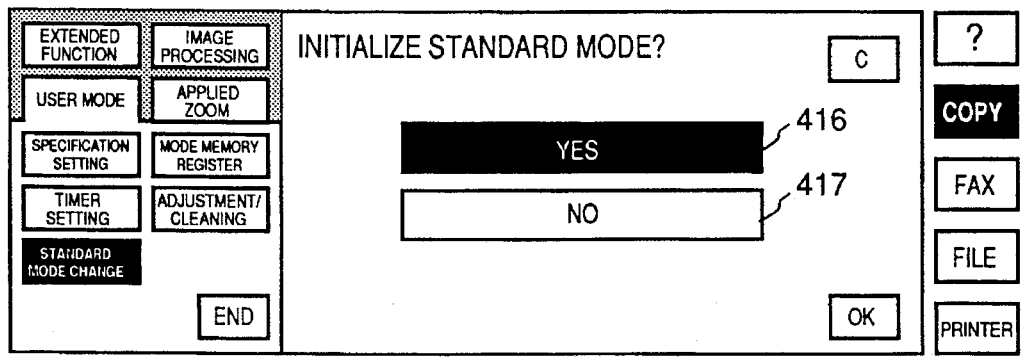
Figure 20C:
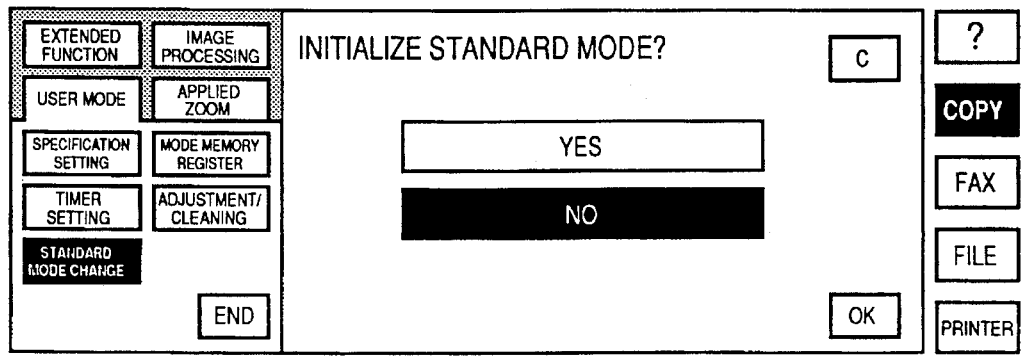

In FIG. 19A, if the INITIALIZE STANDARD MODE key 415 is pressed, the display of the key 415 is complemented as shown in FIG. 20A and the operator presses the OK key, the panel image changes to a confirmation image shown in FIG. 20B, which has a message "INITIALIZE STANDARD MODE?" with selection keys 416 "YES" and 417 "NO". If the YES key 416 is selected, the display of the YES key 416 is complemented as shown in FIG. 20B, while if the NO key 417 is selected, the display of the NO key 417 is complemented as shown in FIG. 20C. In any of FIGS. 20B and 20C, if the selection is desirable, the operator presses the OK key, and the panel image changes to the image in FIG. 17.

Figure 21A:
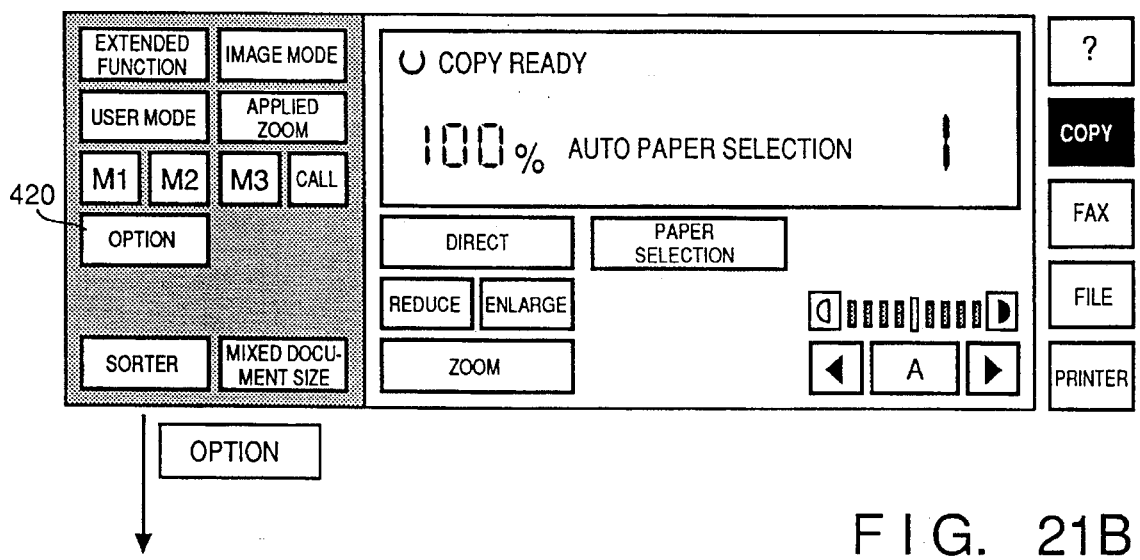
FIGS. 21A to 21C illustrate a display on the operation panel in a projector mode setting process according to first embodiment.
Figure 21B:
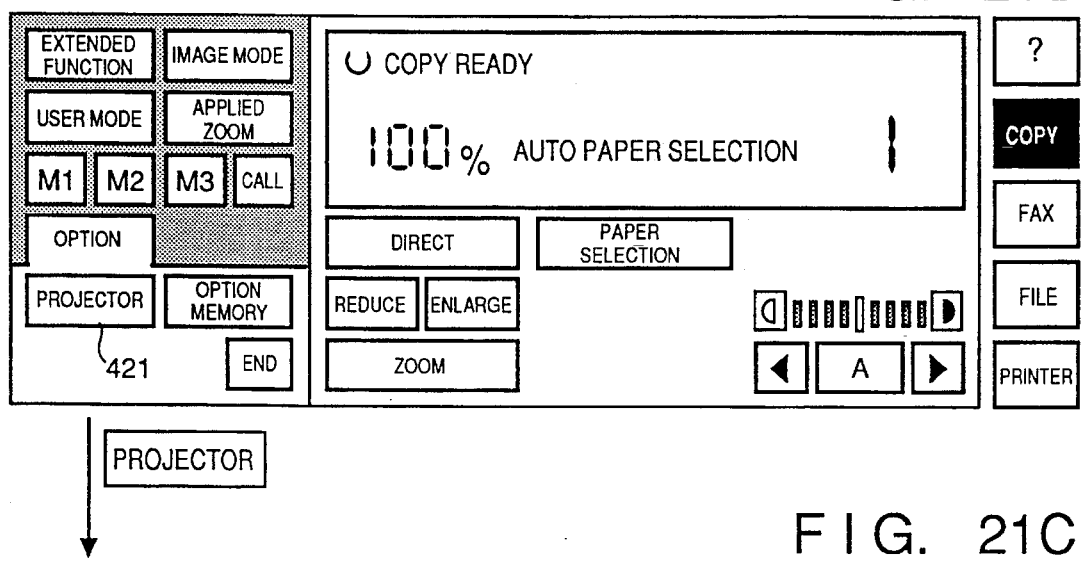

FIGS. 21A to 21C, FIGS. 22A to 22F, and FIGS. 23A to 23D show panel images in projector mode setting. When a projector is attached, a mode for copying from a 35 mm negative/positive film or a mode for copying from a 4×5 negative/positive film can be set. For these settings, in FIG. 21A, an OPTION key 420 is first selected. The panel image changes to an option setting image as shown in FIG. 21B. If a PROJECTOR key 421 is pressed, the panel image changes to an image shown in FIG. 21C. Note that in this panel image, a SKIP key 422 appears only in a case where previous projector mode setting is stored in the memory. If this SKIP key 422 is selected, the projector mode setting in the memory is employed.

Figure 21C:
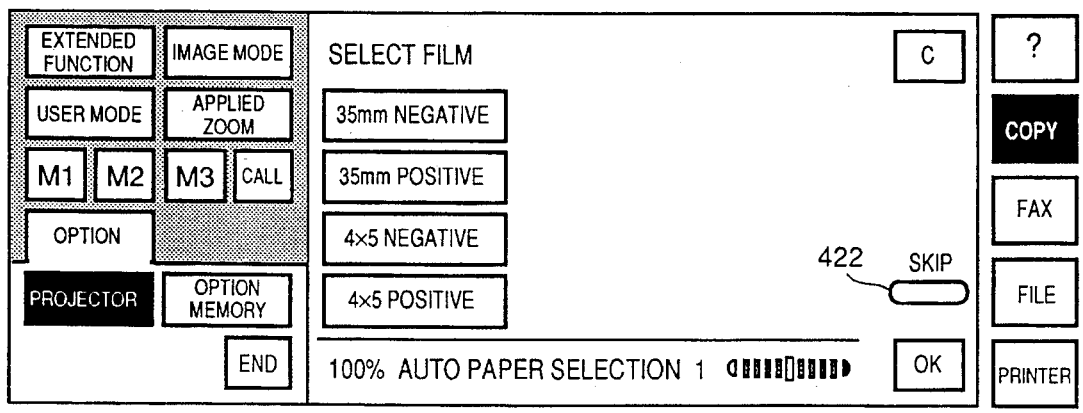
Figure 22A:
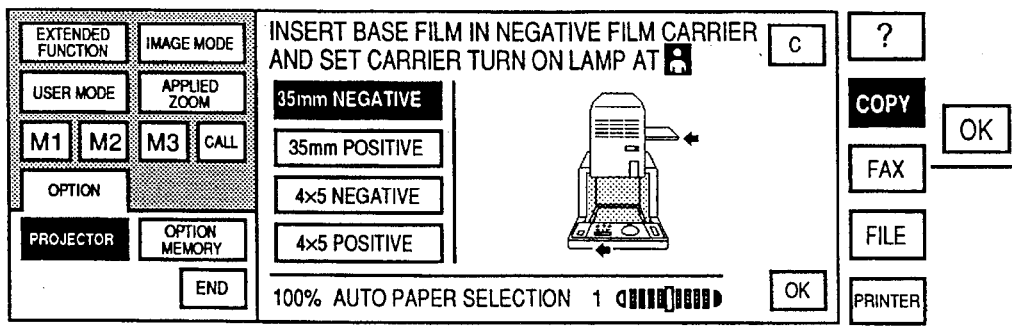
FIGS. 22A to 22F illustrate a display on the operation panel in the projector mode setting process according to the first embodiment.
Figure 22B:
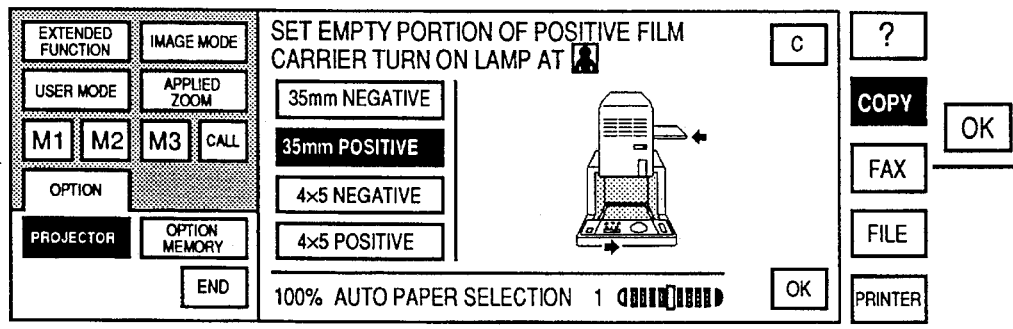
Figure 22C:
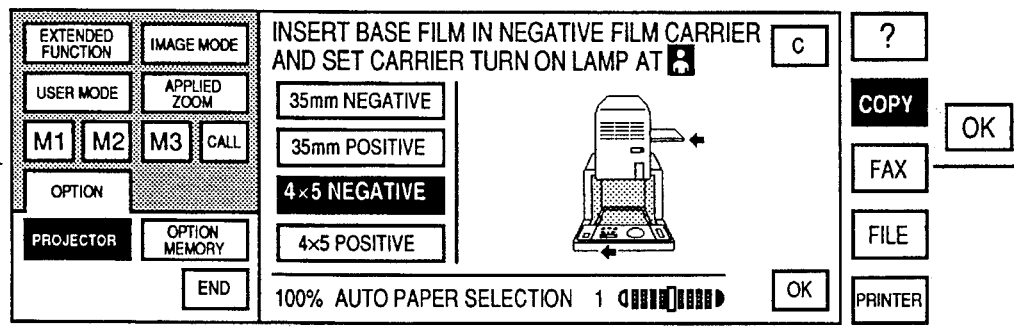
Figure 22D:
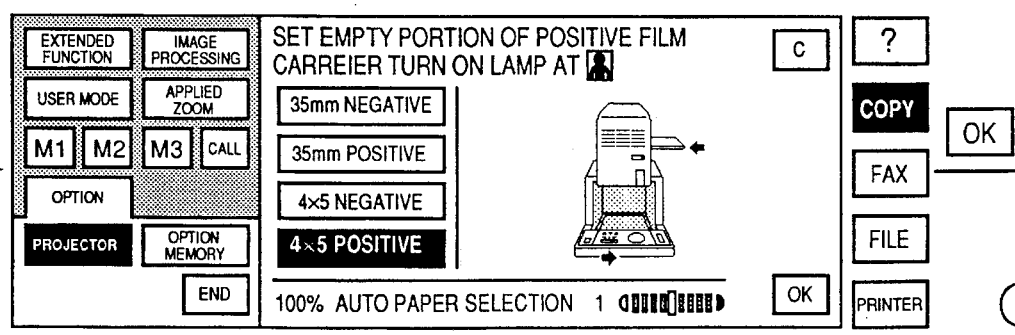
Figure 22E:
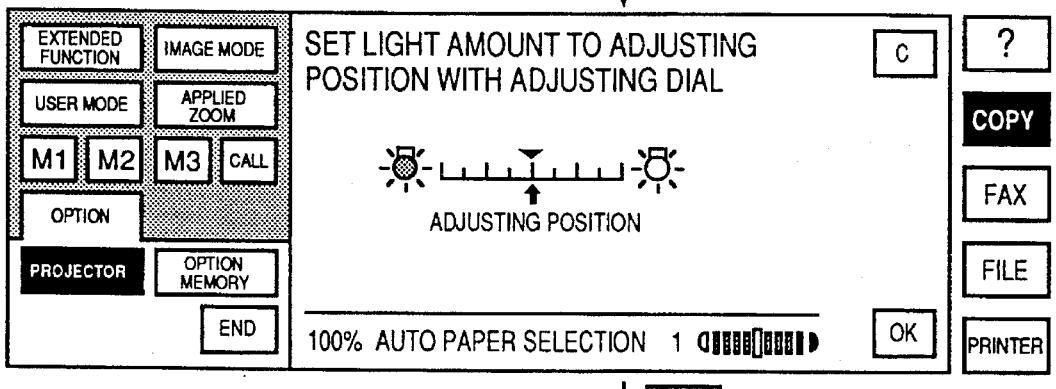

In the panel image in FIG. 21C, the operator selects the type of film to be copied. In case of 35 mm negative film, the panel image changes to a confirmation panel image as shown in FIG. 22A. In case of 35 mm positive film, the confirmation panel image is as shown in FIG. 22B. In case of 4×5 negative film, the confirmation panel image is as shown in FIG. 22C. In case of 4×5 positive film, the confirmation panel image is as shown in FIG. 22D. In any of FIGS. 22A to 22D, if the selection is desirable, the operator presses the OK key, and the panel image changes to a setting image as shown in FIG. 22E. The operator inputs an light amount adjusting position and presses the OK key.

Figure 22F:
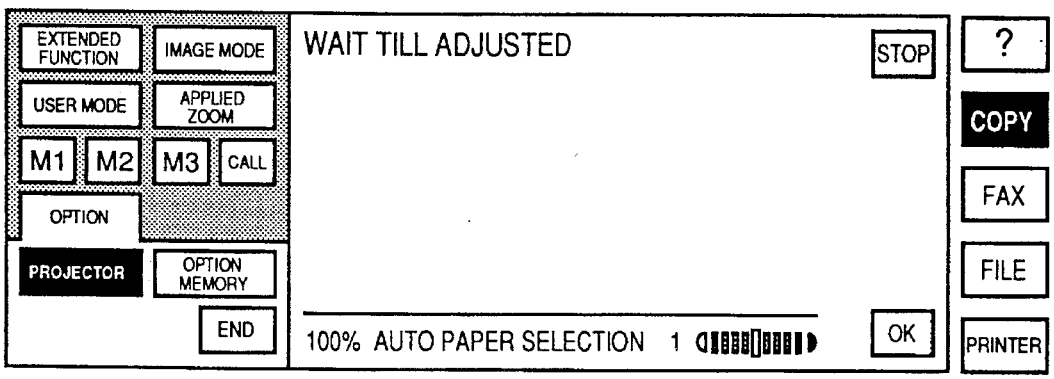
Figure 23A:
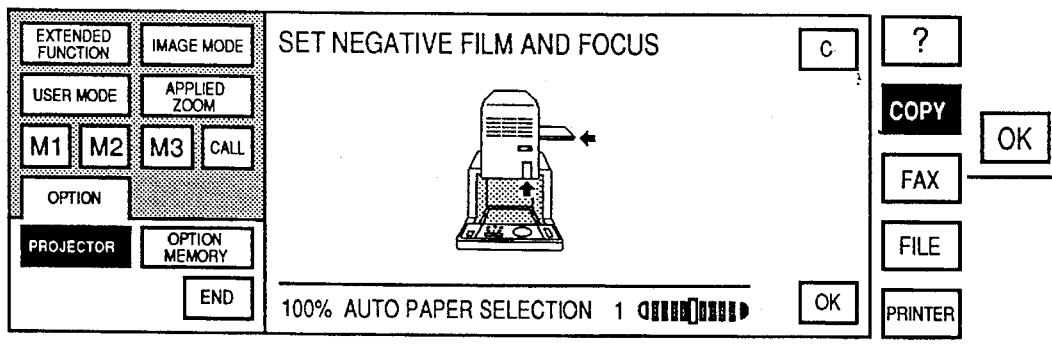
FIGS. 23A to 23D illustrate a display on the operation panel an the projector mode setting process.
Figure 23B:
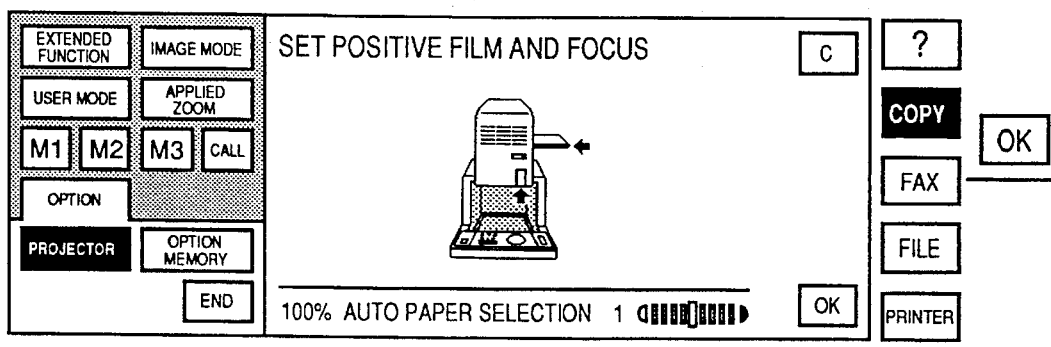
Figure 23C:
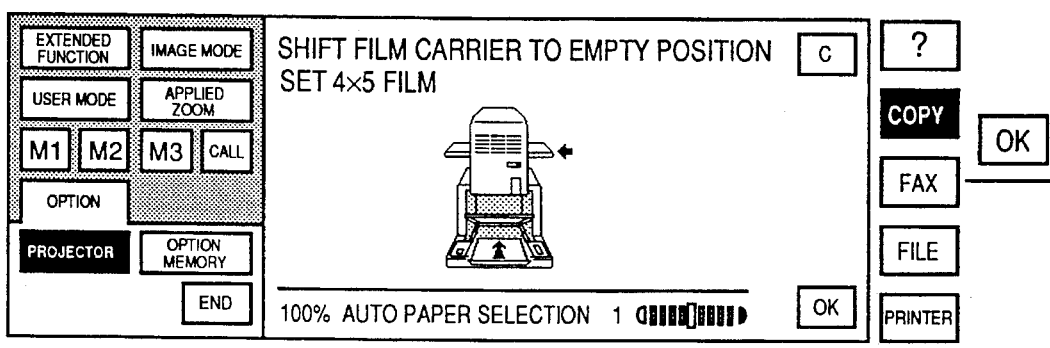
Figure 23D:
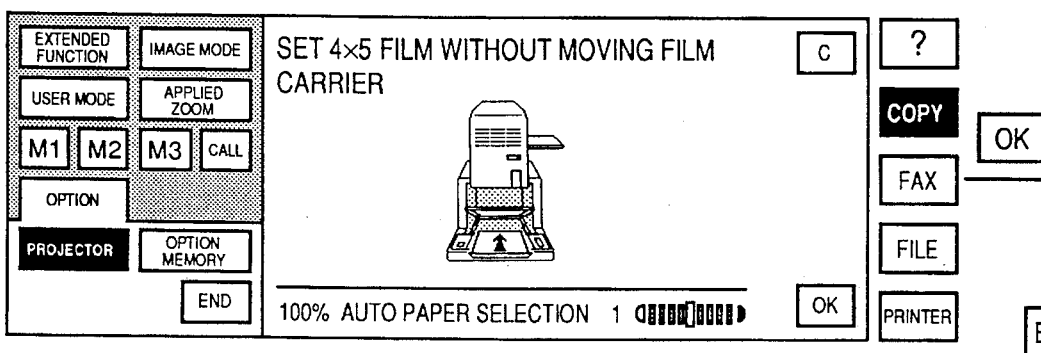

As the operator manipulates an adjusting dial of the projector to adjust the light amount to an amount corresponding to the adjusting position, the panel image changes from FIG. 22E to an image shown in FIG. 22F, then adjustment is performed. The image in FIG. 22F changes to an instruction panel image as shown in any of FIGS. 23A to 23D. In case of 35 mm negative film, the instruction image is as shown in FIG. 23A; 35 mm positive film, the instruction image is as shown in FIG. 23B; 4×5 negative film, the instruction image is as shown in FIG. 23C; and 4×5 positive film, the instruction image is as shown in FIG. 23D. In any of these instruction images, if the film setting has been correctly made, the operator selects the OK key, and the panel image changes to a subsequent setting panel image.

Next, setting of a projector layout mode will be described below.

FIGS. 24A to 24C and FIGS. 25A to 25D show panel images in the projector layout mode setting. When the projector and an image memory are attached, the operator can designate the number of layouts.

Figure 24A:
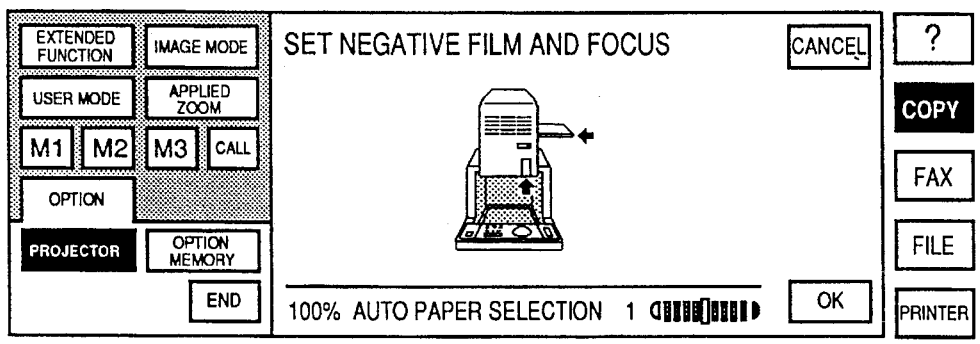
FIGS. 24A to 24C illustrate a display on the operation panel in a projector layout mode setting process according to the first embodiment.
Figure 24B:
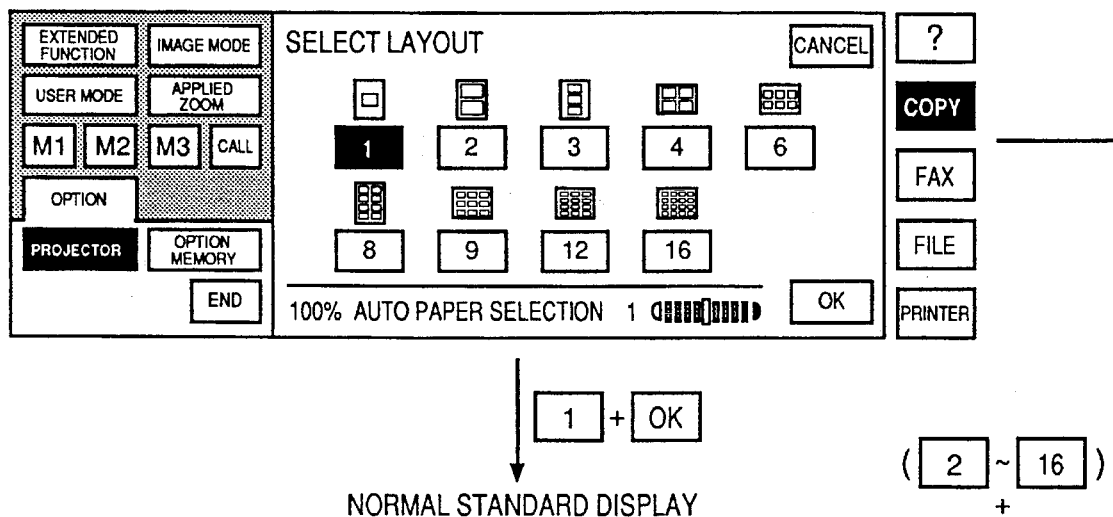
Figure 24C:
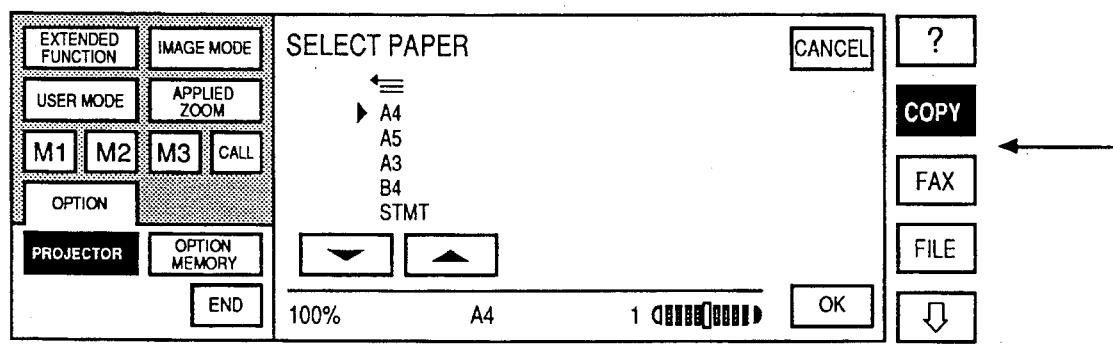

FIG. 24A shows an instruction panel image following FIG. 23A in 35 mm negative film case. If the OK key is pressed, the panel image changes to an image shown in FIG. 24B for selection of the number of sheets. If "1" is selected and the OK key is pressed, the panel image changes to the standard panel image as shown in FIG. 21A. However, if any of "2" to "16" is selected and the OK key is pressed, the panel image changes to a paper size selection image shown in FIG. 24C. As the operator selects a desired paper size and presses the OK key, the panel image changes to an image a shown in FIG. 25A.

Figure 25A:
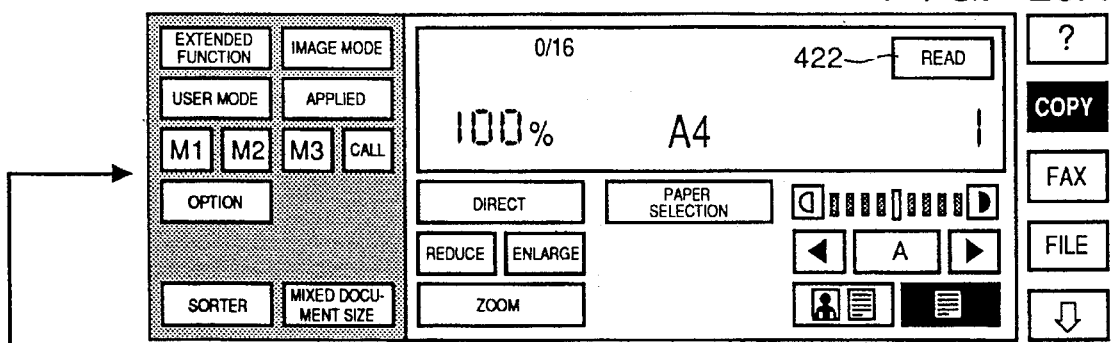
FIGS. 25A to 25D illustrate a display on the operation panel in the projector layout mode setting process.
Figure 25B:
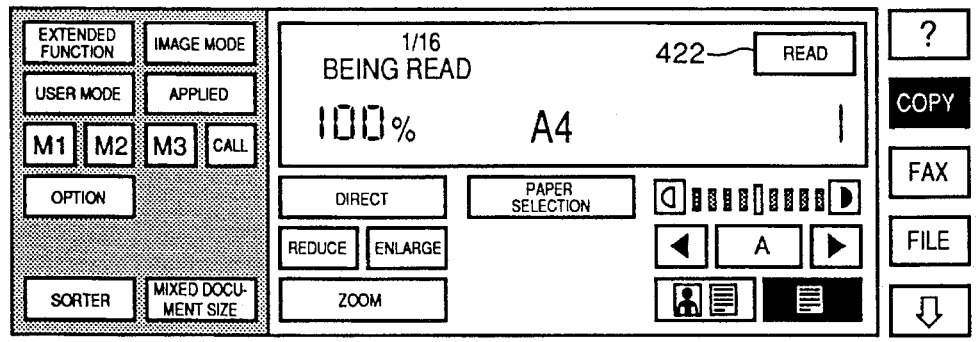
Figure 25C:
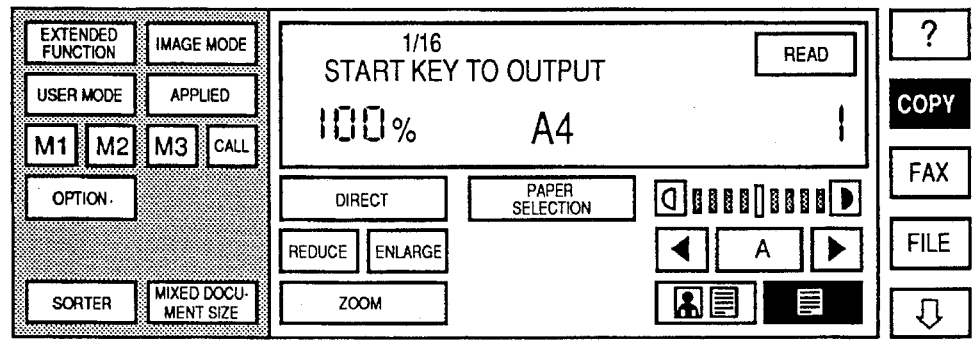
Figure 25D:
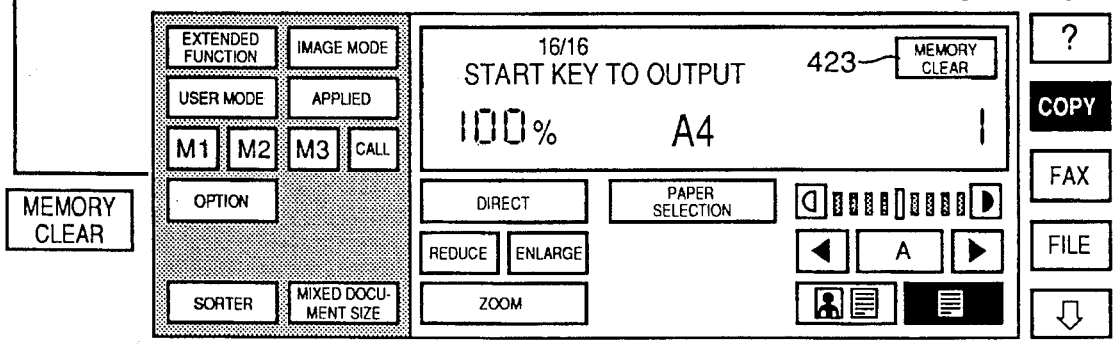

The operator presses a READ key 422, then reading of a first film image is started, and the read image is stored into the image memory, at this time, reading status "1/16" and "BEING READ" appear shown in FIG. 25B. When the reading is completed, indication "1/16" with a message "START KEY TO OUTPUT" shown in FIG. 25C appears in place of the message in FIG. 25B. If the READ key 422 is pressed again, a second film image is read. In this manner, the reading according to a designated layout and storing the read image into the image memory are performed. If the image memory becomes full by reading the set number of images on the final film image according to the designated layout, the panel image changes to an image shown in FIG. 25D. At this time, if the operator presses a MEMORY CLEAR key 423, then the image data stored in the image memory is deleted, and the panel image returns to the image shown in FIG. 25A. After the reading of the set number of film images is completed, the operator presses the start key 303, and the recorded film images are printed.

Next, memory-synthesizing mode and memory-hatching mode will be described below.

FIGS. 26A to 26D, FIGS. 27A to 27C and FIGS. 28A to 28D show panel images for selecting the memory-synthesizing mode. FIG. 29 shows a panel image for selecting density in the openwork-synthesizing mode. In the memory-synthesizing mode, selection can be made from whole-image synthesizing mode, area synthesizing mode and openwork synthesizing mode. Further, in the area synthesizing mode, insertion synthesizing mode or overlay synthesizing mode can be selected.

Figure 26A:
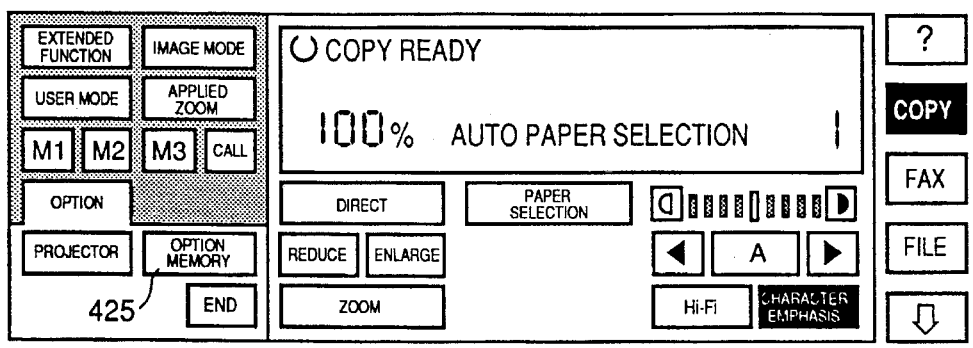
FIGS. 26A to 26D illustrate a display on the operation panel in a memory-synthesizing mode setting process according to the first embodiment.
Figure 26B:
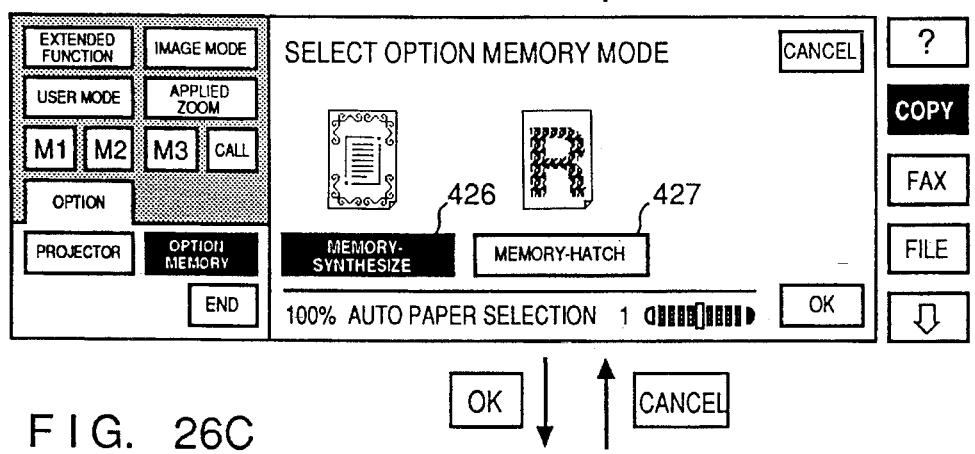

In the panel image in FIG. 26A, when the operator presses an OPTION MEMORY key 425, the panel image changes to an image shown in FIG. 26B for selecting the memory-synthesizing mode or the memory-hatching mode using a MEMORY-SYNTHESIZE key 426 and a MEMORY-HATCH key 427. If the MEMORY-SYNTHESIZE key 426 is pressed and then the OK key is pressed, the panel image changes to a further selection image shown in FIG. 26C for setting the synthesizing mode.

If a WHOLE IMAGE key 428 is pressed to select the whole image synthesizing mode and then the OK key is pressed, the panel image changes to a paper selection image shown in FIG. 27A. As the operator selects paper and presses the OK key, the image changes to an instruction image shown in FIG. 27B that requests to set a background original. The operator sets a background original document and presses a READ key 429, then reading the background document is started. The read image is stored into the image memory. The panel image changes to an image shown in FIG. 27C. The operator replaces the set document with another document and presses the start key 303, then the read document image and the image stored in the image memory are synthesized.

Figure 26C:
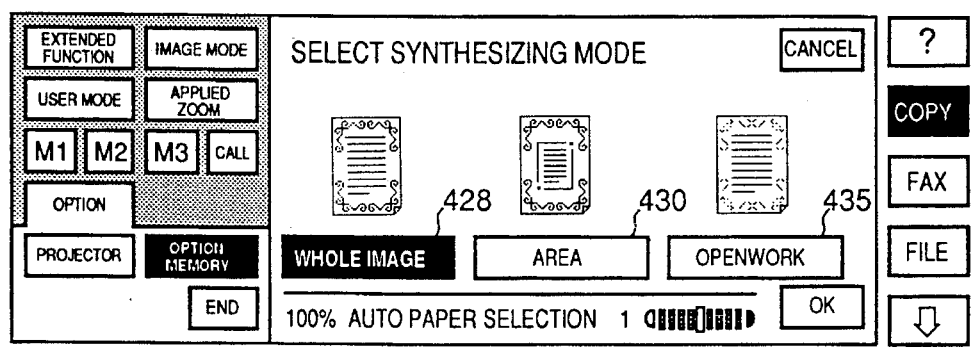
Figure 28A:
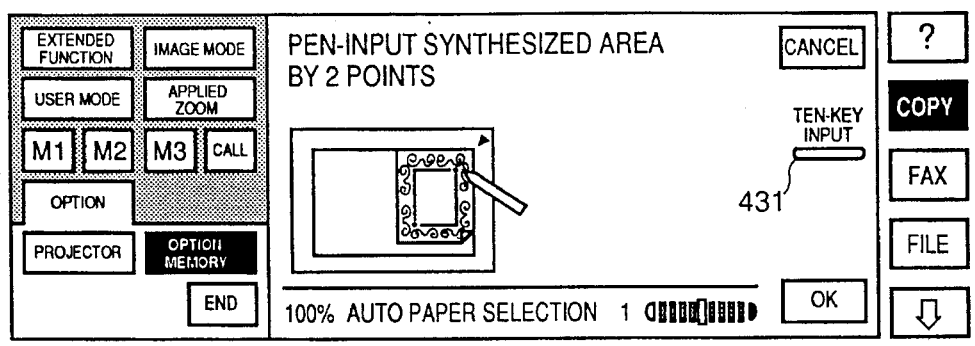
FIGS. 28A to 28D illustrate a display on the operation panel in the memory-synthesizing mode setting process.
Figure 28B:
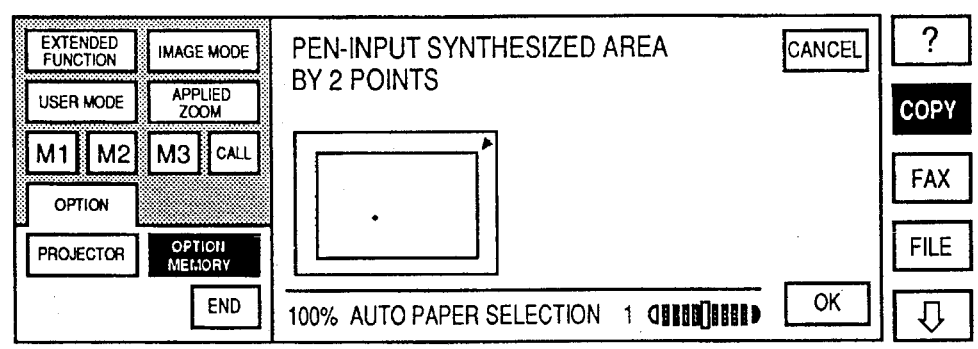
Figure 28C:
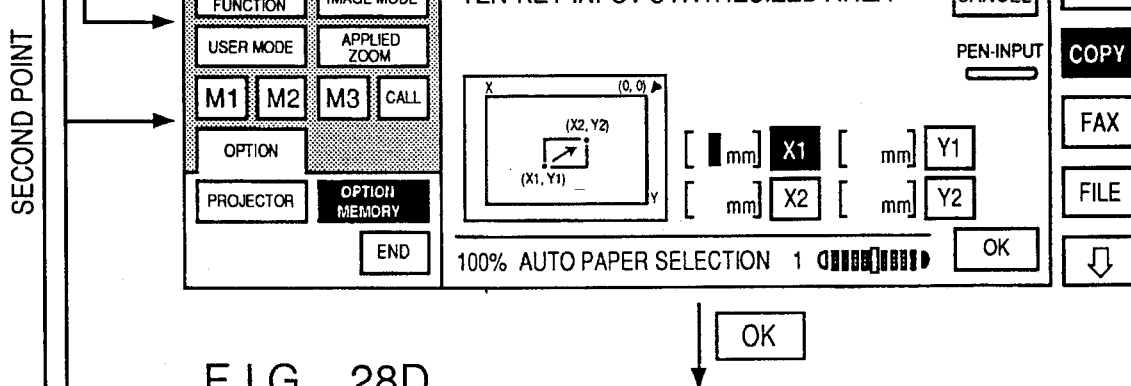

On the other hand, in FIG. 26C, if an AREA key 430 is pressed to select the area-synthesizing mode, the panel image changes to panel image shown in FIG. 28A, then to subsequent the panel image shown in FIG. 28B, when the operator inputs coordinates of an area to be synthesized, as two points, by pen-input. As the operator inputs the first and second point, the panel image changes to further a panel image shown in FIG. 28D for selecting an inserting mode or an overlaying mode. In FIG. 28A, if a TEN-KEY INPUT key 431 is pressed, the panel image changes to a panel image for ten-key input shown in FIG. 28C. The operator defines the area to be synthesized by ten-key inputting the coordinates of the area.

Figure 28D:
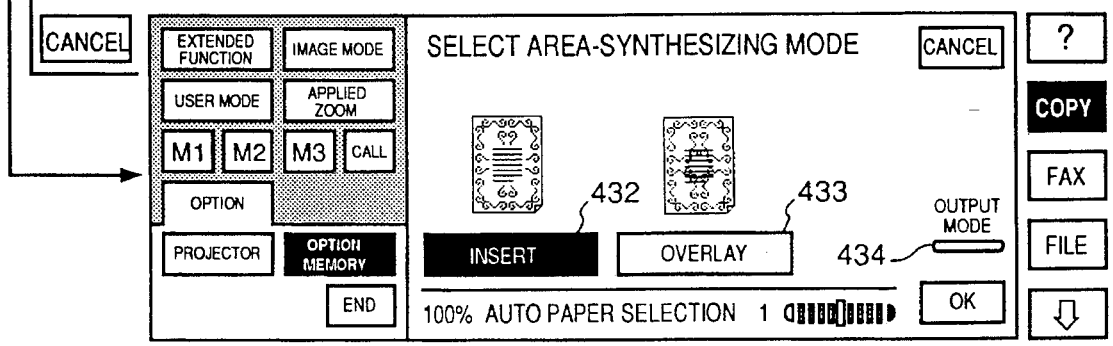
Figure 29:
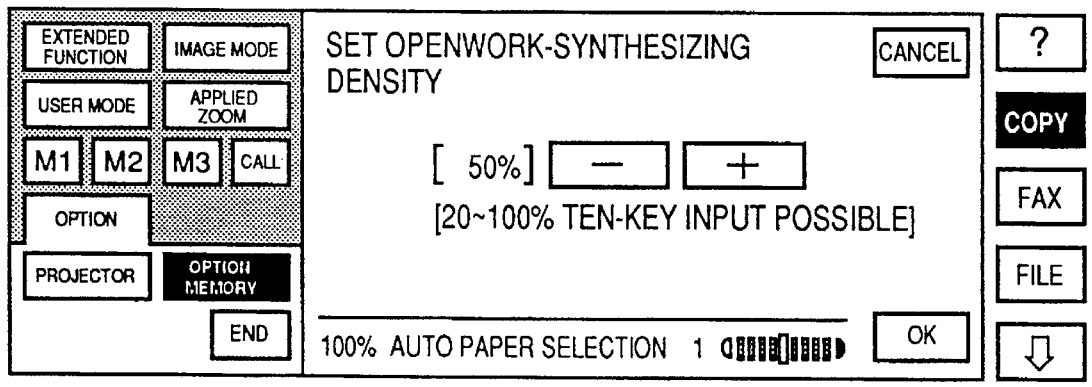
FIG. 29 illustrates a display on the operation panel for setting an openwork-synthesizing density.

When the area coordinates input is completed in any of the above input, the instruction image changes to the image in FIG. 28D, and the operator selects any of the inserting synthesizing mode and the overlay synthesizing mode by pressing an INSERT key 432 or an OVERLAY key 433. When the setting is completed, the operator presses the OK key to change the panel image to the image shown in FIG. 26A. Hereinafter, an original image is read in the aforementioned procedure and the memory-synthesizing mode is performed.

Figure 26D:
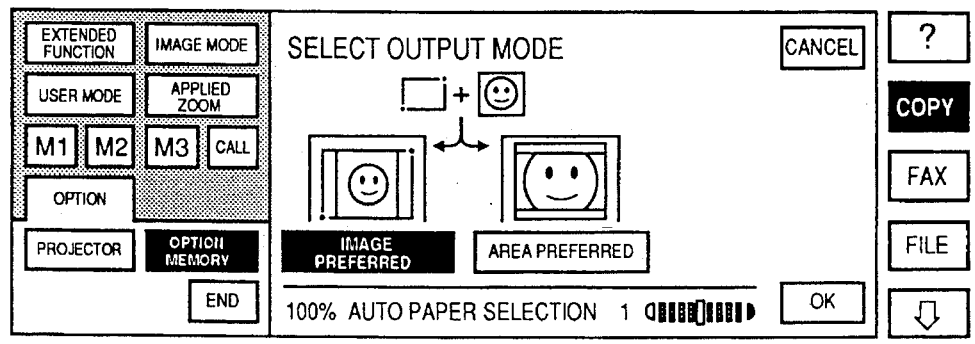

In FIG. 28D, if an OUTPUT MODE key 434 is pressed, the panel image changes to an image shown in FIG. 26D for selecting an output mode. An image preferred mode is for enlarging/reducing the read image to be inserted into the designated area so that the whole image can be inserted into the designated area. An area preferred mode is for inserting the read image into the designated area without changing the image size. When this selection is completed or an CANCEL key is pressed, the panel image changes to the insert/overlay selection image in FIG. 28D again.

In FIG. 26C, if an OPENWORK key 435 is pressed and the OK key is pressed, the panel image changes to an image a shown in FIG. 29 for setting an openwork-synthesizing density. As the setting is completed and the operator presses the OK key, the panel image changes to the paper selection image in FIG. 27A.

FIGS. 30A and 30B and FIGS. 31A to 31D show instruction images for setting the memory-hatching mode. In this mode, the operator selects whole-image hatching mode (hatching to whole image) or area-image hatching mode (hatching to a specified portion of the image).

Figure 30A:
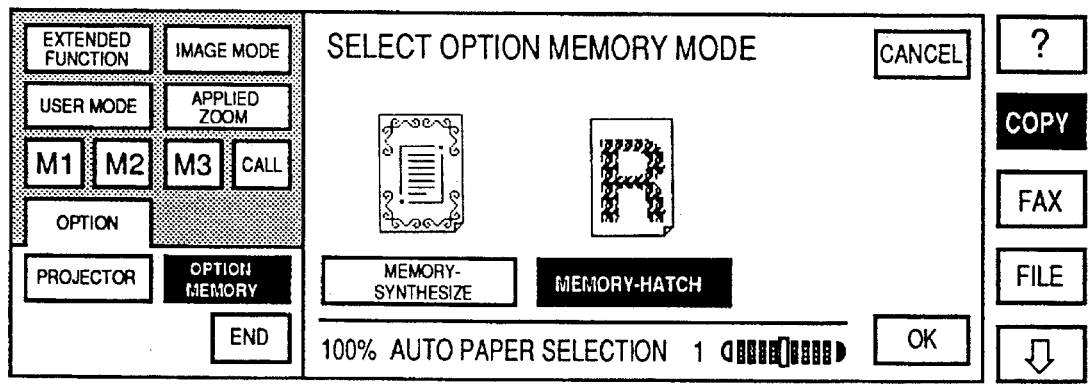
FIGS. 30A and 30B illustrate a display on the operation panel in a memory-hatching mode setting process according to the first embodiment.
Figure 30B:
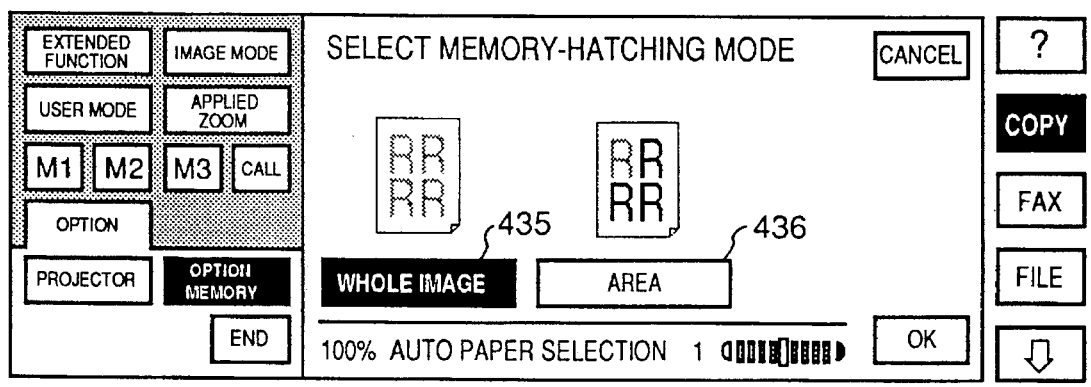
Figure 31A:
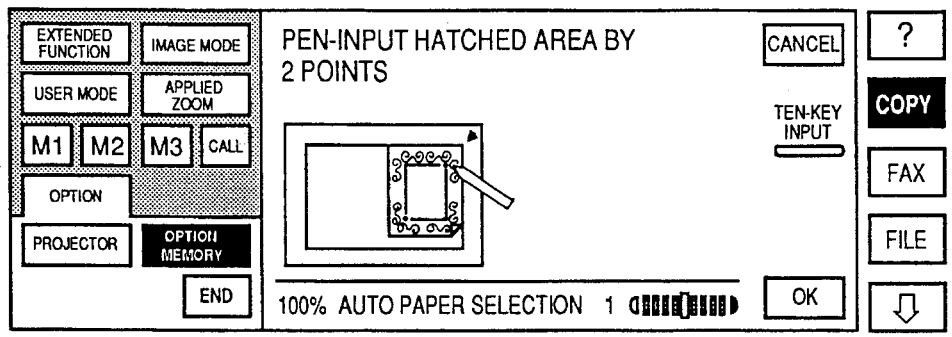
FIGS. 31A to 31D illustrate a display on the operation panel in the memory-hatching mode setting.
Figure 31B:
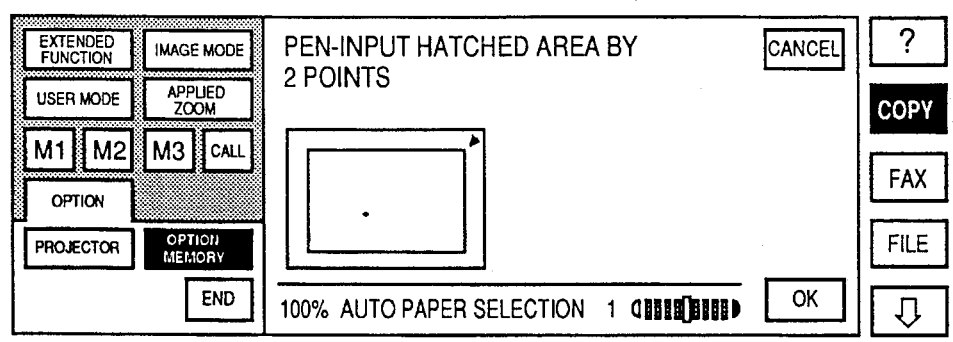
Figure 31C:
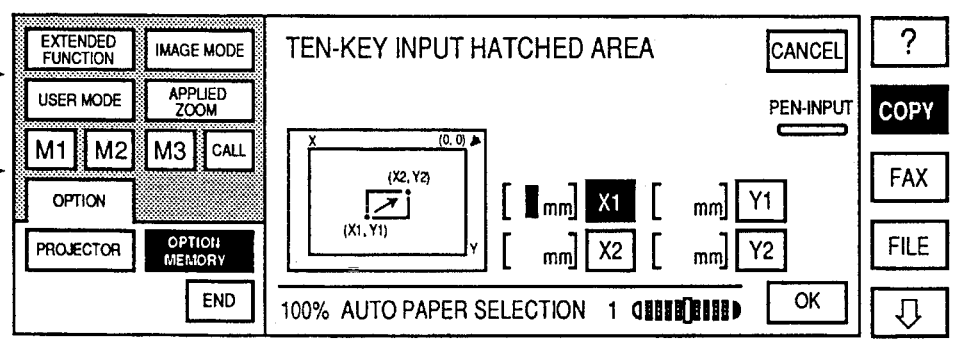

In FIG. 26B, if the MEMORY-HATCH key 427 is pressed, the MEMORY-HATCH key 427 is complemented as shown in FIG. 30A. To confirm the memory-hatching, the operator presses the OK key, then the image changes to the subsequent instruction image shown in FIG. 30B for selecting the whole-image hatching mode or the area-image hatching mode. If a WHOLE IMAGE key 435 is pressed, the image changes to the paper selection image in FIG. 31D, while if an AREA key 436 is pressed, the image changes to an instruction image shown in FIG. 31A for defining an area to be hatched. The area designation processing shown in FIGS. 31A to 31C is similar to that in the memory-synthesizing shown in FIGS. 28A to 28C, where the operator defines the area to be hatched by pen-inputting or ten-key inputting the area coordinates. As the area is defined, the instruction image changes to a paper selection image shown in FIG. 31D.

Figure 31D:
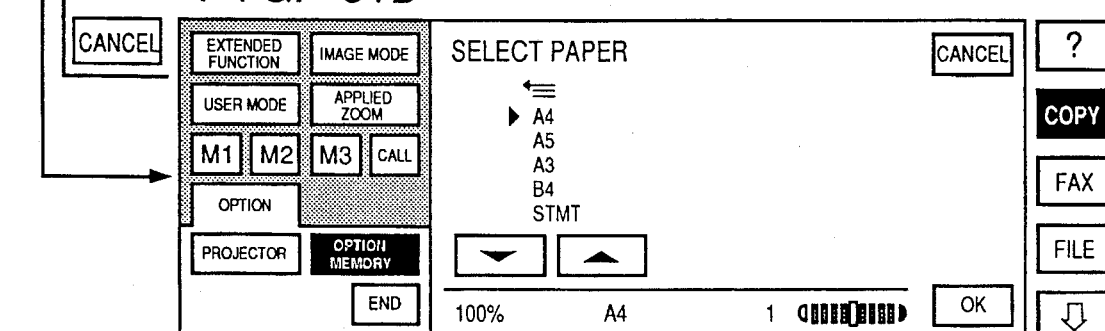

In FIG. 31D, the operator selects output paper and presses the OK key. Then the image changes to the instruction images for reading background original document shown in FIGS. 27B and 27C. The subsequent processing is similar to that in the memory-synthesizing mode.

Figure 6:
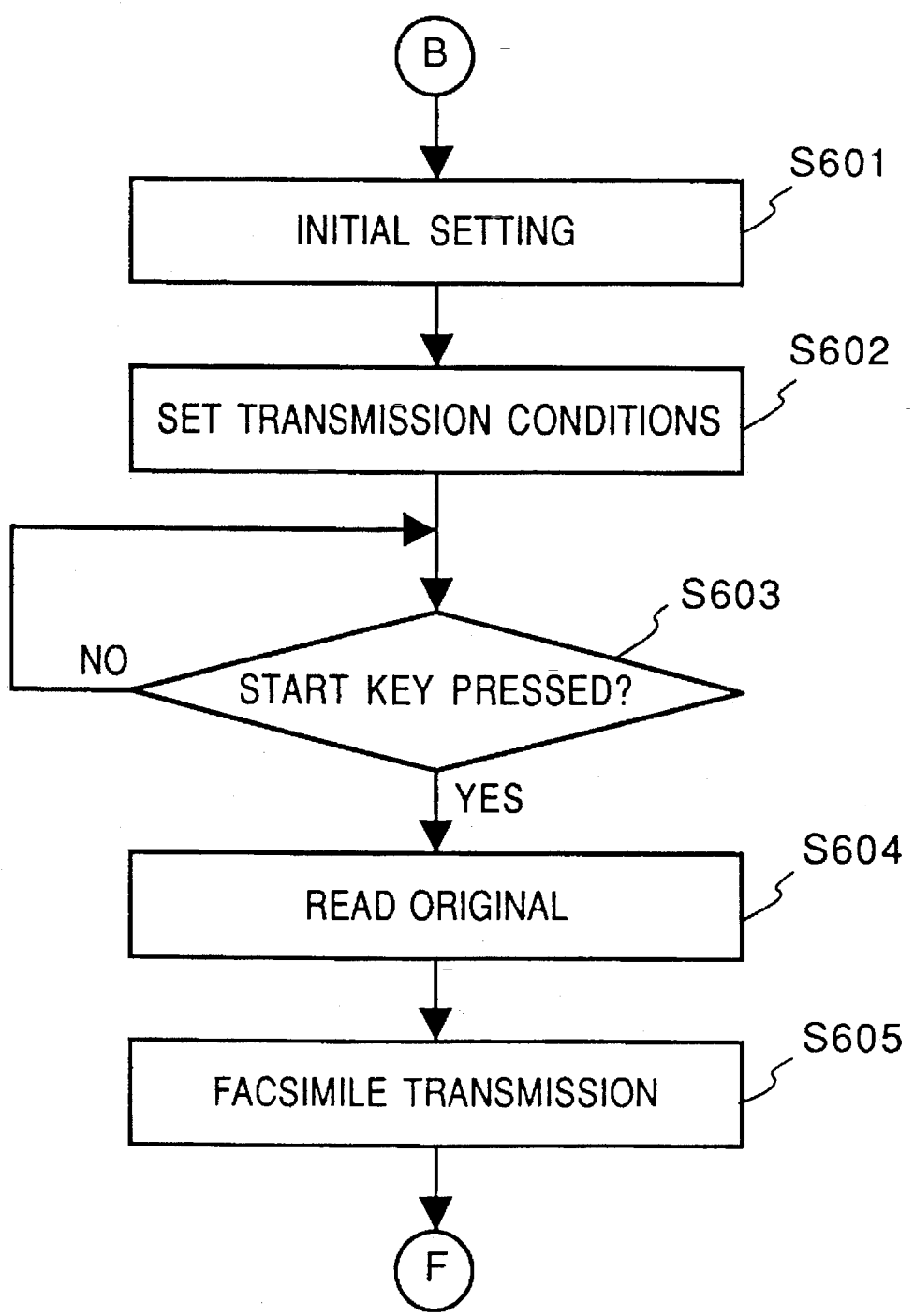
FIG. 6 is a flowchart showing the operation in a facsimile transmission function according to the first embodiment.

Next, the processing when the facsimile transmission function is selected in step S403 (FIG. 4) will be described with reference to the flowchart in FIG. 6.

Figure 32:
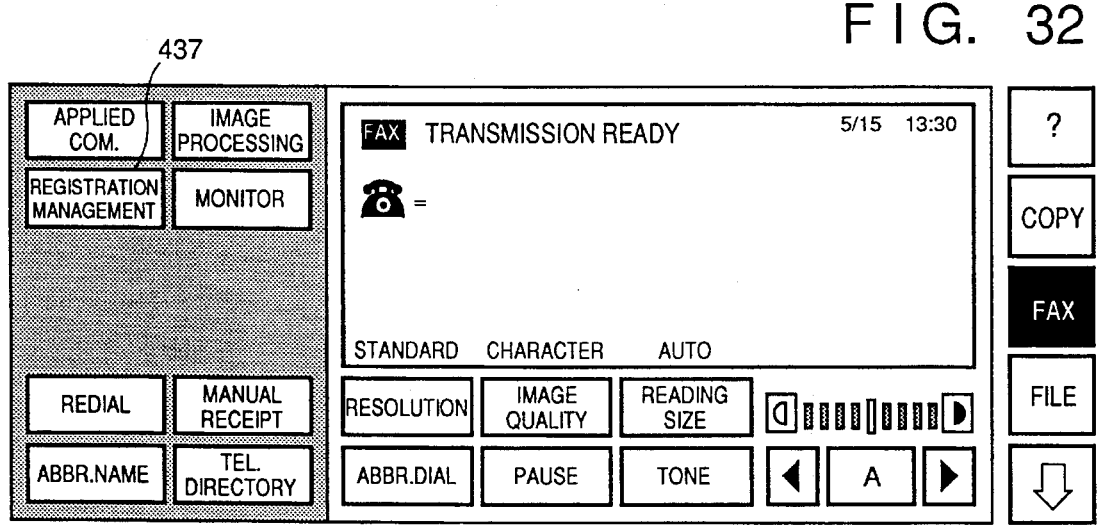
FIG. 32 illustrates an initial display in a facsimile function.

In step S601, initial setting of the facsimile transmission is performed. Note that FIG. 32 shows an initial panel image in the facsimile transmission function. Next, in step S602, key-inputs from the control panel are read to set the facsimile transmission conditions such as resolution, image quality and a transmitter's name. In step S603, pressing of the start key 303 is awaited. At this time, if a destination is designated by dialing using a one-touch dialing key or ten-key dialing, the keys other than image processing keys turn hatched and no longer responsive to pressing. This is to avoid changing the mode where the destination is inputted. However, the image processing keys are active since only image processing can be performed by document. In this manner, the present embodiment hatches keys not to be selected, thus preventing erroneous operation.

When the start key 303 is pressed, the process proceeds from step S603 to step S604, in which the reader 1 reads the original and transfers the read image data to the facsimile unit 4. The facsimile unit 4 performs facsimile transmission in accordance with a set format and a predetermined protocol. After the transmission has been completed, the process returns to the initial setting.

Figure 33:
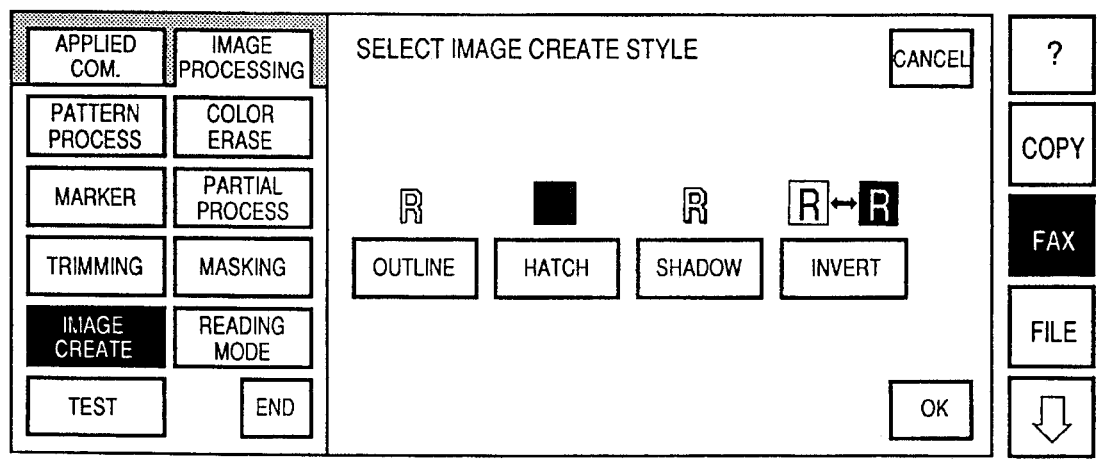
FIG. 33 illustrates a display on the operation panel for image processing upon facsimile transmission according to the first embodiment.

FIG. 33 shows a panel image for selecting image processing from outlining, hatching, shadowing, and complementing for facsimile transmission. These processings are similar to those in the copy function. That is, various image processings can be made upon original image before transmission.

FIGS. 34A to 34C, FIGS. 35A to 35D, and FIGS. 36A and 36B show panel images for setting a reading mode in the facsimile transmission function. The reading mode includes continuous-page (rightward, leftward) reading mode, double-sided reading mode, 2-in-1 reading mode. The continuous page reading mode is for continuously reading the right half and the left half of an original placed on the platen as separate pages. The continuous-page reading mode includes the right-half first mode and the left-half first mode. The double-sided reading mode is for reading by document handler, to read the front side and the rear side of a double-sided original as separate pages. The 2-in-1 reading mode is for reading two originals placed on the platen fed by document handler (feeder) as one page. These reading modes are similar to those used in the copy function.

Figure 35A:
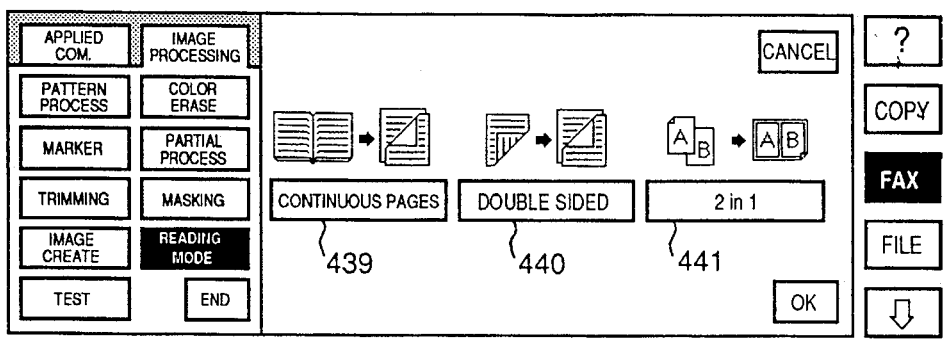
FIGS. 35A to 35D illustrate a display on the operation panel in the reading mode setting in the facsimile transmission function.
Figure 35B:
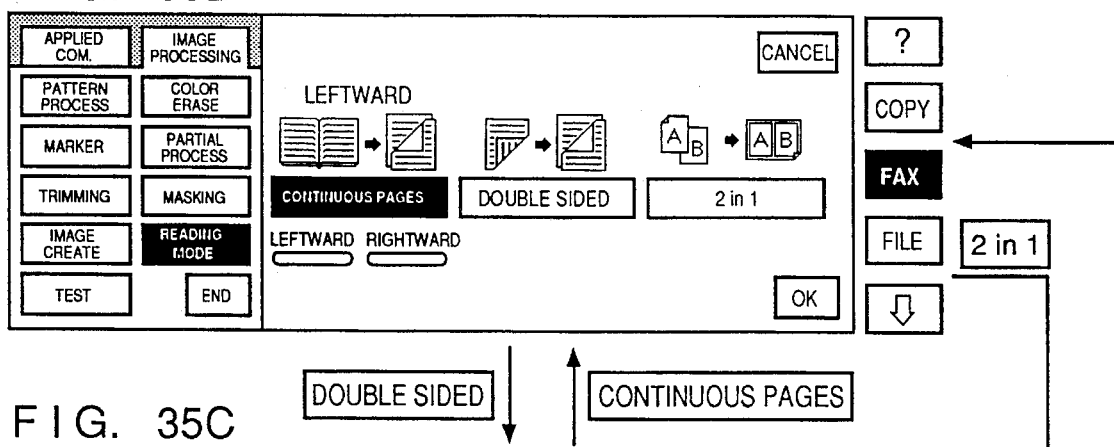
Figure 35C:
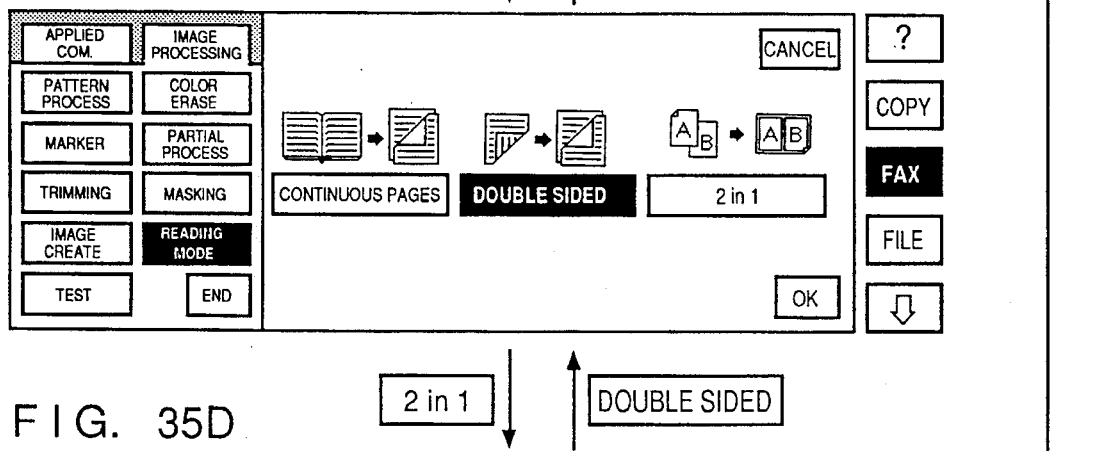
Figure 35D:
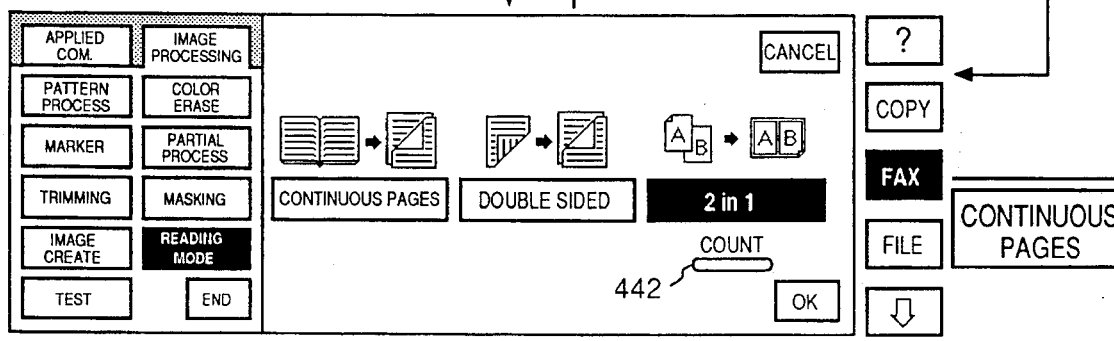

In FIG. 34A, if a READ key 438 is pressed, the panel image changes to an image shown in FIG. 35A. If a CONTINUOUS PAGE key 439 is pressed as shown in FIG. 35A, selection keys for designating the continuous-page reading direction, LEFTWARD and RIGHTWARD appear as shown in FIG. 35B. In 35A, if a DOUBLE-SIDED key 440 is pressed, the DOUBLE-SIDED key 440 is complemented as shown in FIG. 35C, otherwise, if a 2in1 key 441 is pressed, the 2-in-1 key 441 is complemented and a COUNT key 442 appears as shown in FIG. 35D. In the continuous-page reading mode, whether the reading is started from the left half or the right half is designated in FIG. 35B. In any of FIGS. 35B to 35D, when the operator presses the OK key, the panel image changes to the image in FIG. 34B. It should be noted that if the CANCEL key is pressed in any of FIGS. 35A to 35D, the panel image returns to the initial image in FIG. 34A. As the operator sets the original and presses the start key 303, the reading in the designated reading mode is started and the facsimile transmission is started.

Further, in the 2-in-1 reading mode, reading method differs in reading document of an odd-number pages and in reading document of an even-number pages. In FIG. 35D, if the COUNT key 442 is pressed, the panel image changes to an image in FIG. 34C. To instruct counting the pages of the document, the operator selects a DOCUMENT AUTO COUNT key 443. Otherwise, the operator designates the pages as an odd/even number pages using a "–" key 444 and a "+" key 445. FIG. 34C shows the DOCUMENT AUTO COUNT key 443 complemented by the operator's selection. At this time, if the OK key is pressed, the panel image changes to the image in FIG. 34B. To designate the odd/even number page using the "–" key 444 and the "+" key 445, the operator sets the number of pages of the original in FIG. 36A. As the operator presses the OK key after the setting, the panel image changes to an image shown in FIG. 36B. In FIG. 36A, if the CANCEL key is pressed, the image returns to the image in FIG. 35D.

Figure 37A:
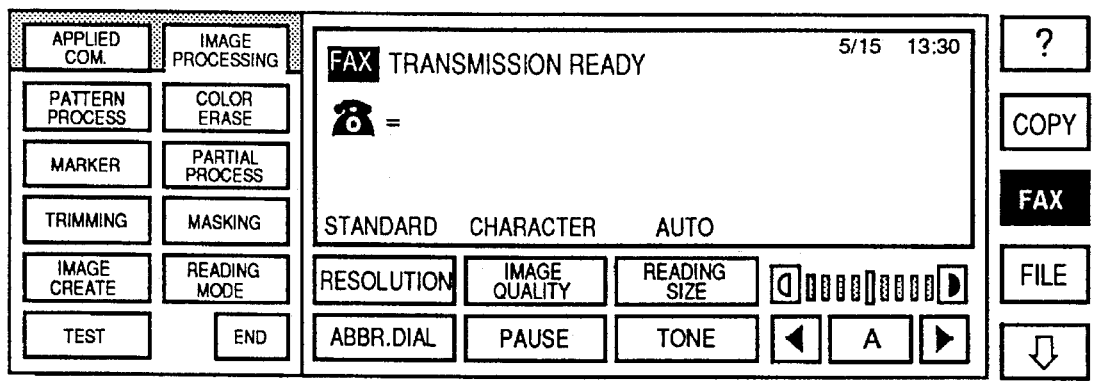
FIGS. 37A and 37B illustrate a display on the operation panel for setting a test mode according to the first embodiment.
Figure 37B:
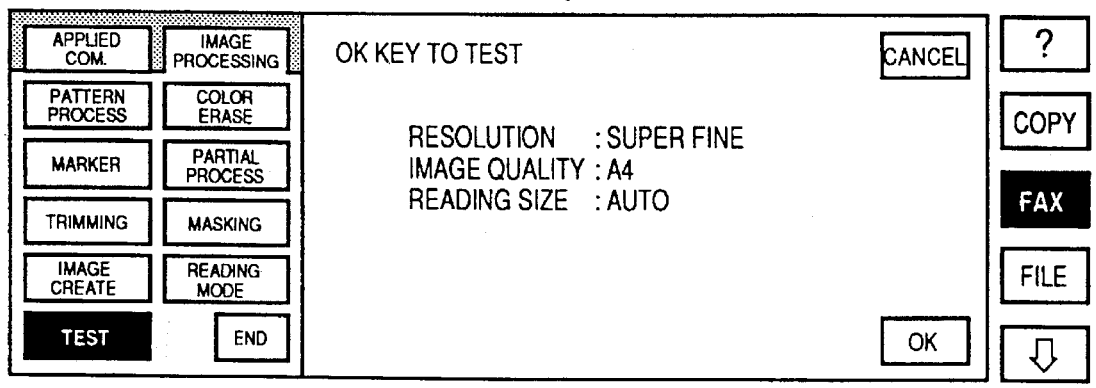

FIGS. 37A and 37B show a test mode setting image. In the test mode, an original to be transmitted is read and the read image data is processed in accordance with a set transmission mode, and the data is test-printed. By virtue of this mode, the operator can see an image which will be obtained by the receiver before actual transmission.

Figure 38A:
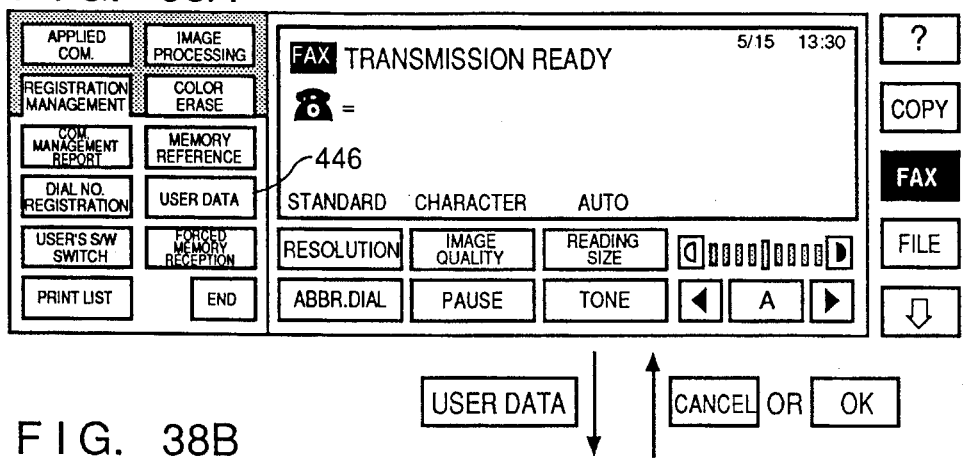
FIGS. 38A to 38D illustrate a display on the operation panel for modifying the standard mode of facsimile transmission function according to the first embodiment.
Figure 38B:
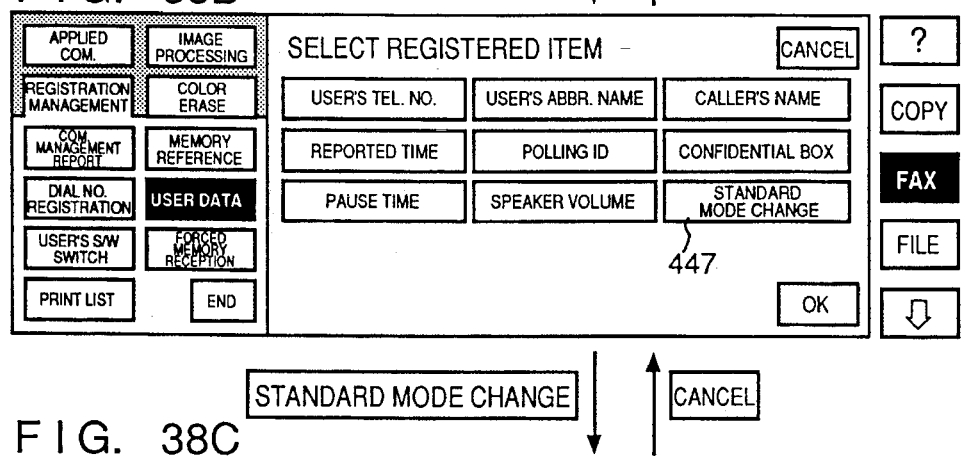
Figure 38C:
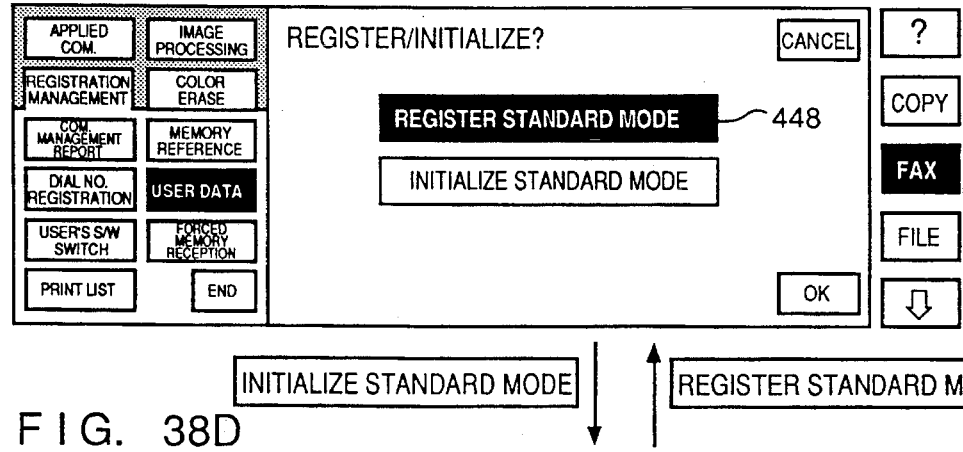
Figure 38D:
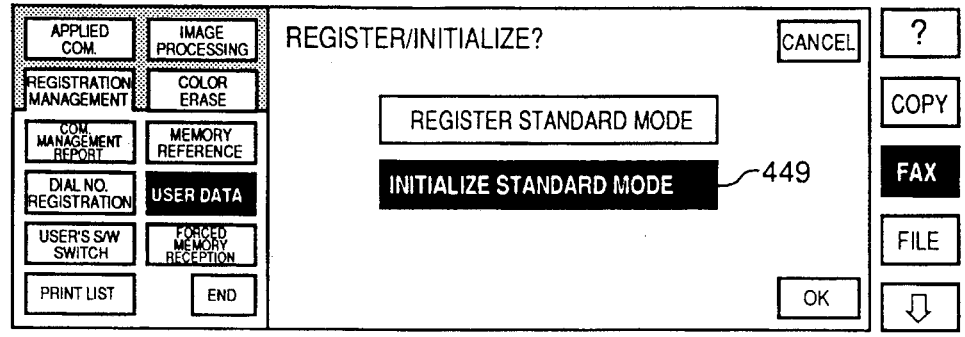
Figure 39A:
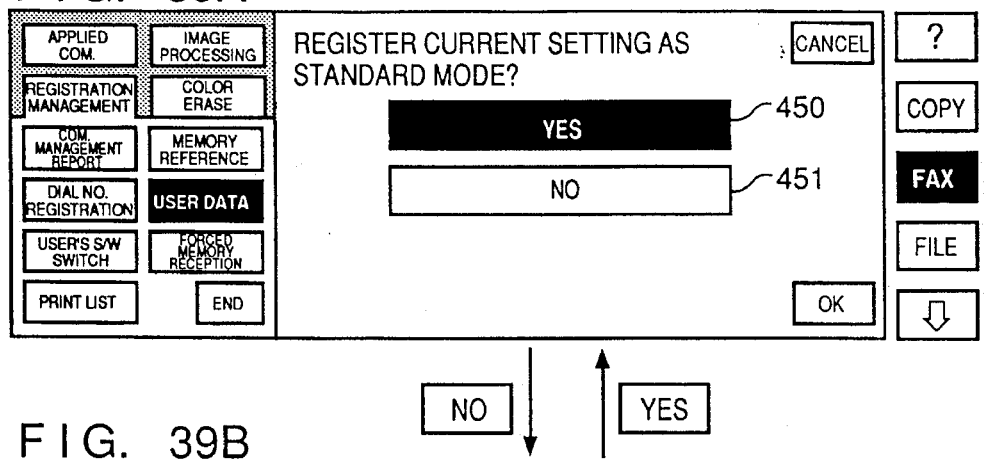
FIGS. 39A to 39D illustrate a display on the operation panel for modifying the standard mode according to the first embodiment.
Figure 39B:
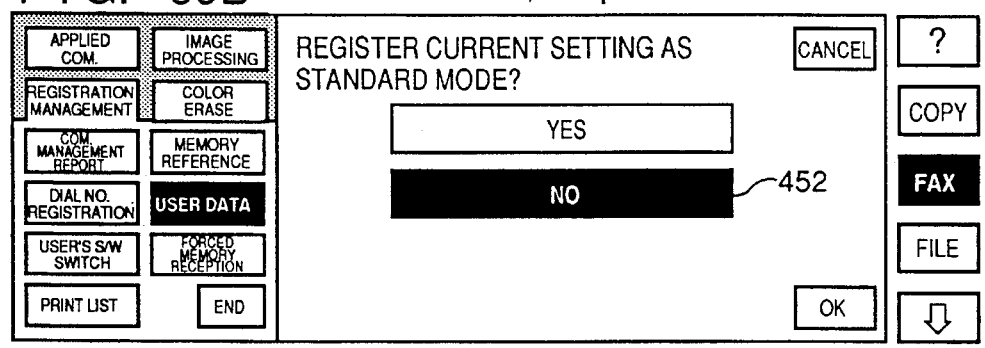

FIGS. 38A to 38D and FIGS. 39A to 39D show panel images for modifying a standard mode for facsimile transmission. The standard mode where a resolution, image quality and density registered in advance can be reset to the default values. In the facsimile-transmission initial image shown in FIG. 32, if a REGISTRATION MANAGEMENT key 437 is pressed, the panel image changes to an image as shown in FIG. 38A, where if a USER DATA key 446 is selected, the image changes to an image shown in FIG. 38B. If a STANDARD MODE CHANGE key 447 is pressed, the panel image changes to an image as shown in FIG. 38C for selecting registration or initialization of the standard mode. If the operator selects a REGISTER STANDARD MODE key 448 and presses the OK key, the panel image changes to an image shown in FIG. 39A. If the operator selects a YES key 450 and presses the OK key, a message "REGISTERED" appears for a predetermined period, e.g., two seconds, and the image returns to the image in FIG. 38A. In FIG. 39A, if the operator selects the CANCEL key, the panel image changes to an image shown in FIG. 38C. Also, in FIG. 39A, if the operator selects a NO key 451, the panel image changes to an image as shown in FIG. 39B, and if the operator presses the OK key, the image changes to the image in FIG. 38C.

Figure 39C:
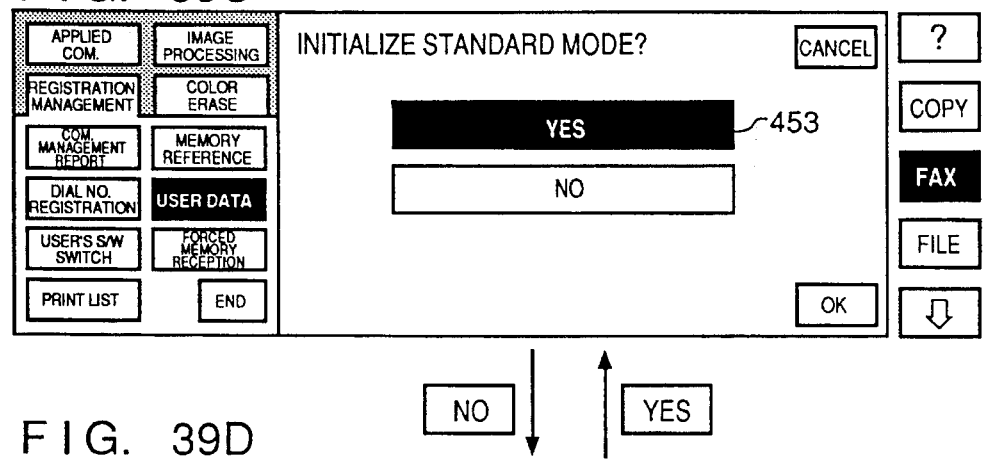

In FIG. 38D, if the operator selects a INITIALIZE STANDARD MODE key 449 and presses the OK key, the image changes to the image in FIG. 39C. In this image, if the CANCEL key is pressed, the panel image returns to the image in FIG. 38C, while if the OK key is pressed, a massage "INITIALIZED" appears for a predetermined period, e.g., two seconds, and then the image returns to the image in FIG. 38A.

Figure 39D:
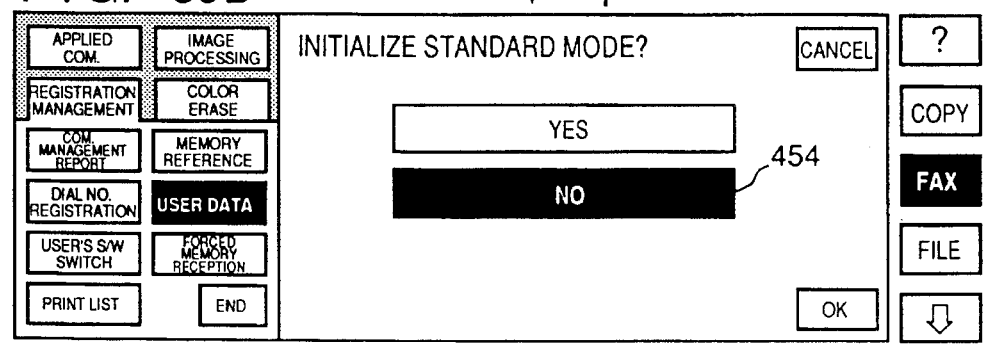

As shown in FIG. 39D, if a NO key 454 is selected and the OK key is pressed, or the CANCEL key is pressed, the panel image returns to the image in FIG. 38D.

The designated standard mode is set after turning on the power or after autoclearing.

Figure 7:
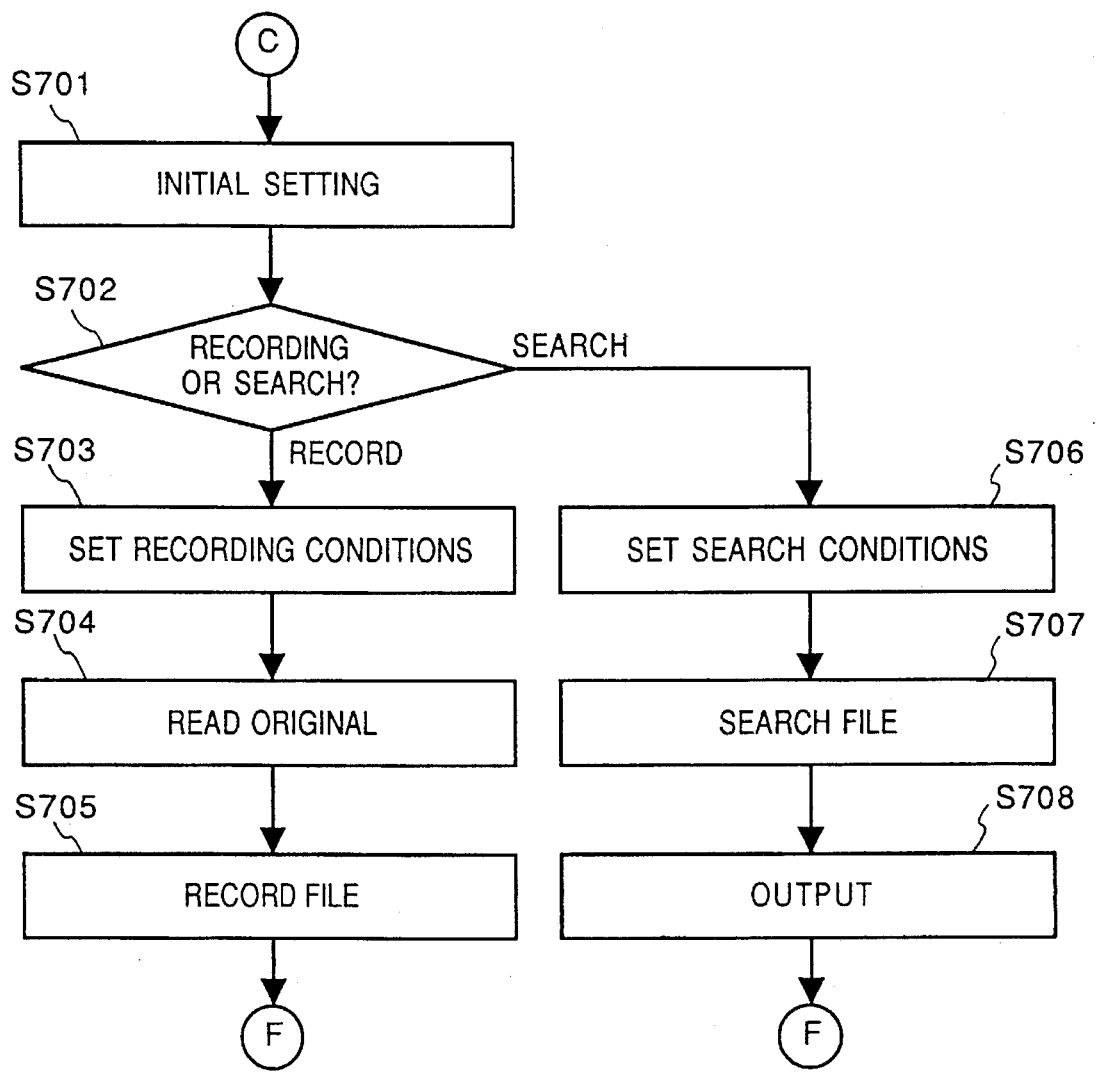
FIG. 7 is a flowchart showing the operation in a file function according to the first embodiment.

FIG. 7 is a flowchart showing the processing in a case where the filing function is selected.

In step S701, the initial setting of the filing function is performed. In step S702, selection keys for recording a file or searching a file are displayed on the operation panel, and key-input from the operator is awaited. If the recording key is selected, the process proceeds to step S703, in which recording conditions are set. In step S704, an original is read by the reader 1, then in step S705, the data is transferred to the file unit 5, and the data is stored in the external storage 6 connected to the file unit 5. The process returns to step S401 in FIG. 4.

In step S702, if the file search key is selected, the process proceeds to step S706, in which search conditions are set. In step S707, the file is searched in the external storage 6, and in step S708, the searched result is outputted. Then, the process returns to step S401.

Figure 8:
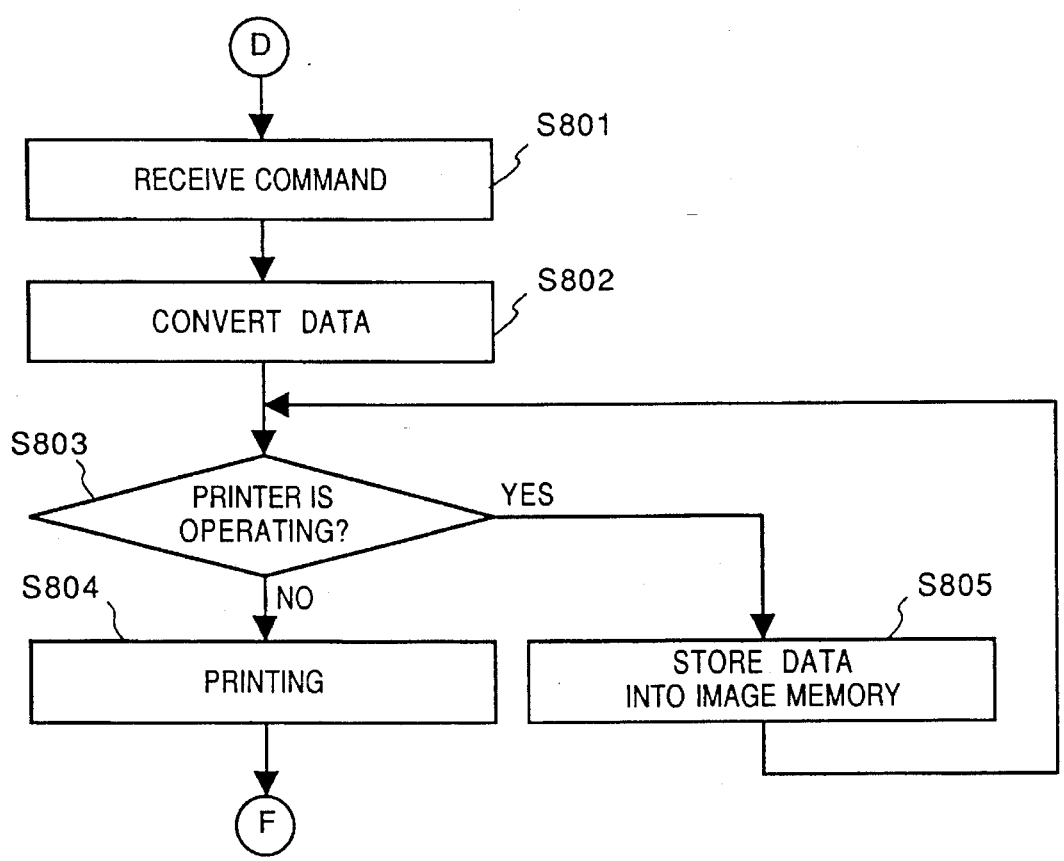
FIG. 8 is a flowchart showing the operation in an input function for input from a computer interface according to the first embodiment.

FIG. 8 shows the processing when the computer interface inputs command data from an external device.

In step S801, the command is received via the computer interface. In step S802, the data is transferred via the core 10 to the formatter 8, where the data is converted into image information. In step S803, whether the printer 2 is busy or not is determined to print an image. If NO, the process proceeds to step S804, in which image printing based on the image data is performed. On the other hand, if YES, the process proceeds to step S805, in which the image information is stored into the image memory 9, and the process returns to step S803. Then, when the printer 2 is not operating, an image is printed based on the image data in step S804. After the image printing in step S804, the process returns to the initial setting in step S401 in FIG. 4.

Figure 40:
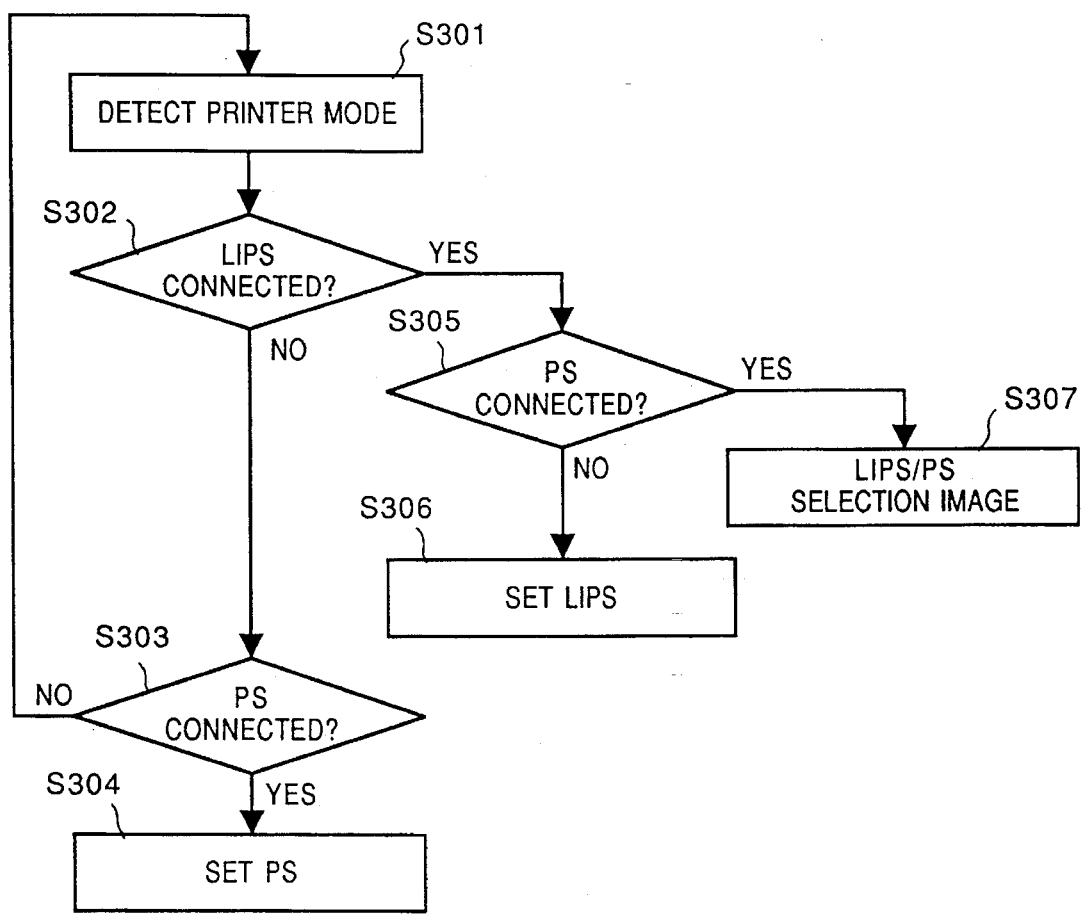
FIG. 40 is a flowchart showing control for selecting the formatter according to the first embodiment.

FIG. 40 shows the control for selecting the formatter.

In step S301, selection of the printer function at the operation panel is detected, and in step S302, whether or not a LIPS board for the printer formatter is connected is determined. If YES, the process proceeds to step S305, in which whether or not a PS board for postscript is connected is determined. If YES, the process proceeds to step S307, where a panel image for selecting the LIPS board or the PS board is displayed. The operator sets the LIPS or the PS in accordance with usage.

Figure 41:
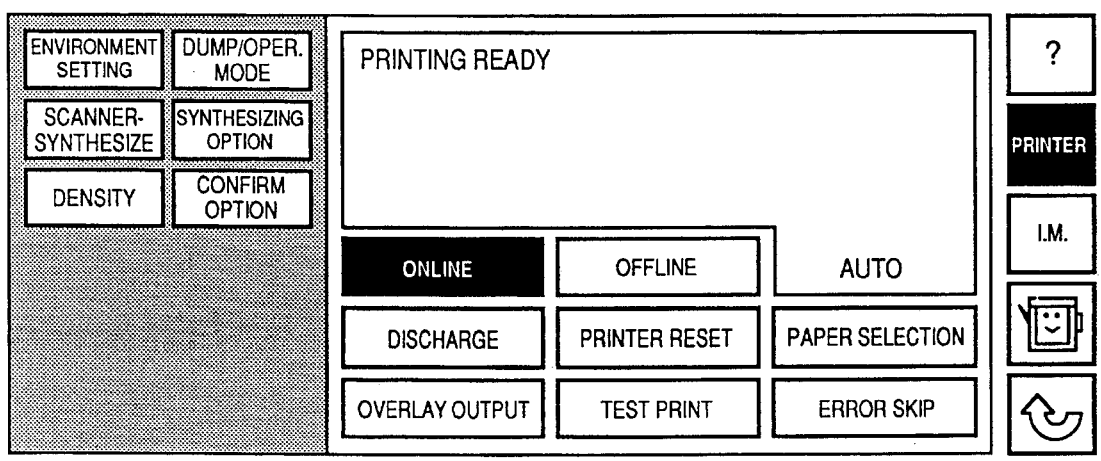
FIG. 41 illustrates an initial display for LIPS setting in a printer function.

On the other hand, if NO in step S305, the process proceeds to step S306, where a panel image for setting the LIPS is displayed. As the setting is completed, the initial image of the LIPS mode is displayed so that the operator confirms the settings. FIG. 41 shows a panel image in case of setting the LIPS.

If NO in step S302, i.e., it is detected that the LIPS board is not connected, the process proceeds to step S303, in which whether or not the PS board is connected is detected. If NO, the process returns to step S301, while if YES, proceeds to step S304, in which a panel image for setting the PS is displayed so that the operator can confirm the settings.

Figure 42A:
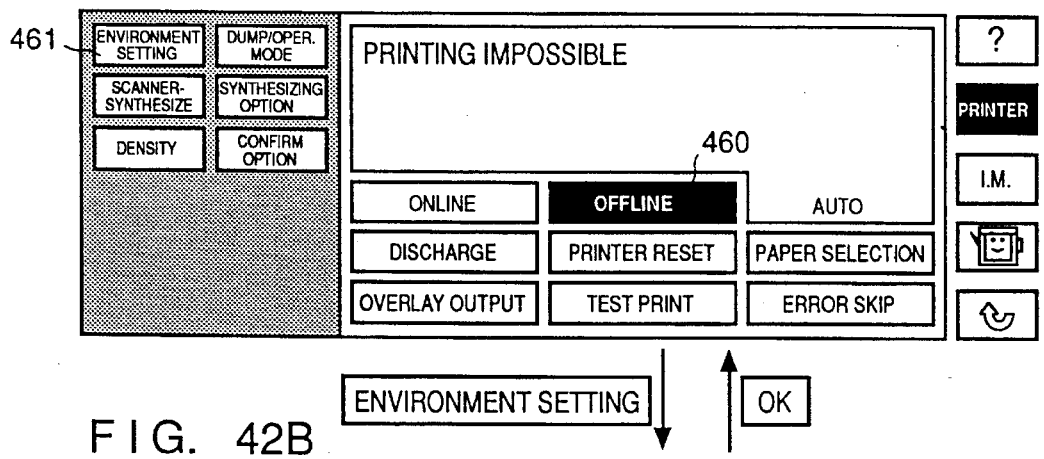
FIGS. 42A to 42D illustrate a display on the operation panel for setting printing environment according to the first embodiment.

FIGS. 42A to 42D and FIGS. 43A and 43B show panel images in setting printing environment. In FIG. 42A, the operator selects an OFFLINE key 460, then the operator selects an ENVIRONMENT SETTING key 461. The panel image changes to an image shown in FIG. 42B for selecting an environment setting mode from environment setting, saving of environment and initialization of environment. If a SET ENVIRONMENT key 462 is selected, the panel image changes to images shown in FIGS. 42C and 42D for setting font (kanji code, size, kanji font etc.), extended functions (two-page printing, enlargement/reduction, vertical directional correction, horizontal directional correction, sorter, double-sided etc.), copy/output (number of copies, overlay condition etc.), layout (direction of page, automatic new-paragraph starting, automatic new-page starting etc.), and memory size (reception buffer, cache). As the setting is completed in FIG. 42D, the operator presses the OK key and the presses an END key, and the panel image returns to the image in FIG. 42B.

Figure 42B:
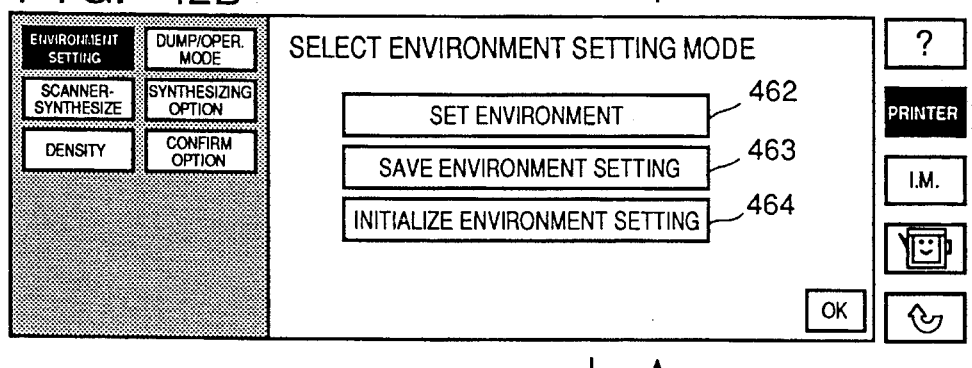
Figure 42C:
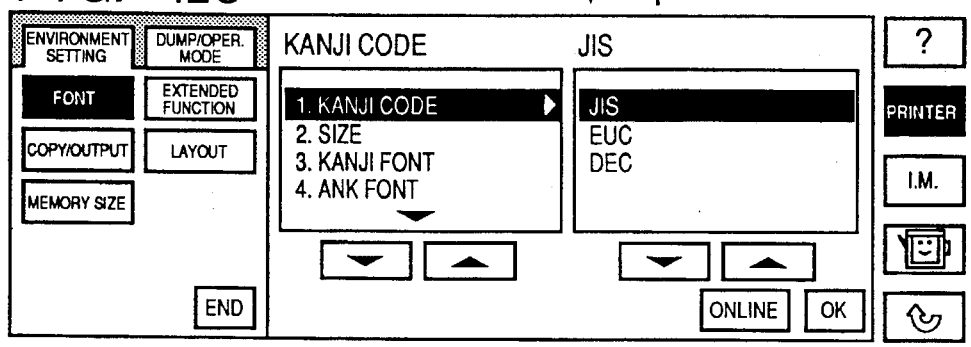
Figure 42D:
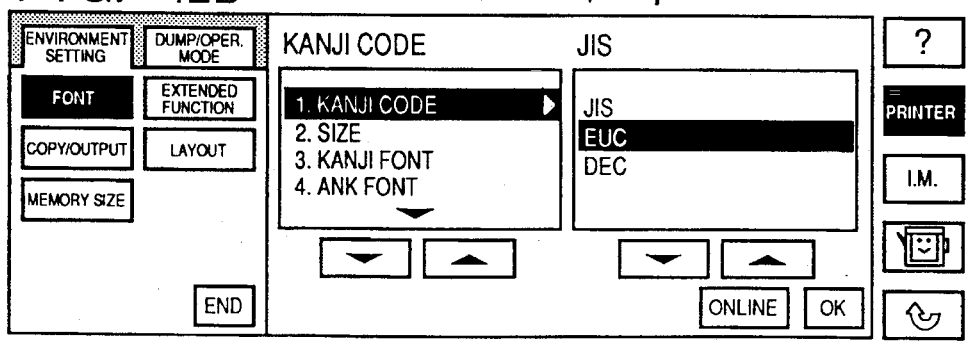
Figure 43A:
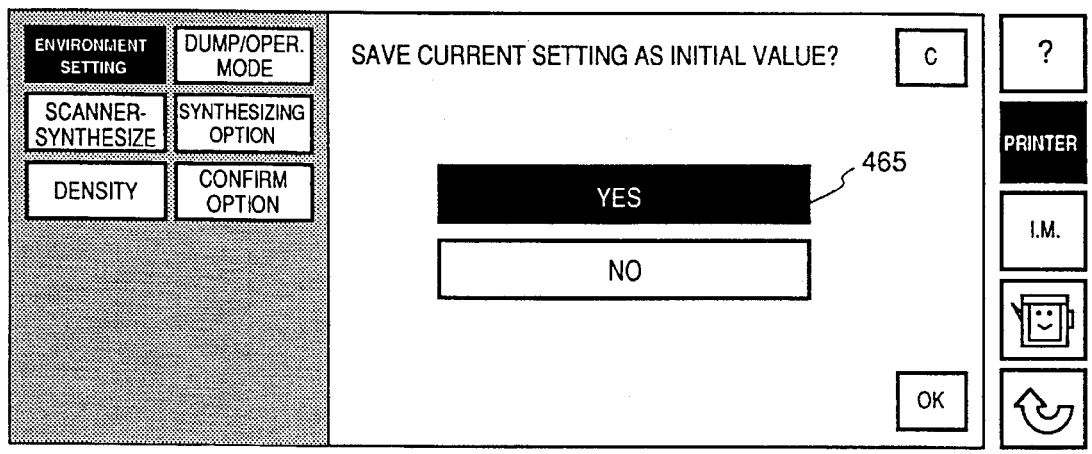
FIGS. 43A and 43B illustrate a display on the operation panel for setting the printing environment.

In FIG. 42B, if a SAVE ENVIRONMENT SETTING key 463 is selected, the panel image changes to an image shown in FIG. 43A for selecting saving the current setting as initial value or not. If a YES key 465 is selected and the OK key is pressed, the setting is saved in the memory while a message "SAVED" appears for a predetermined period, e.g., one second, and the panel image returns to the image in FIG. 42B. In FIG. 43A, if a clear "C" key is pressed, the setting is not saved, and the panel image returns to the image in FIG. 42B.

Figure 43B:
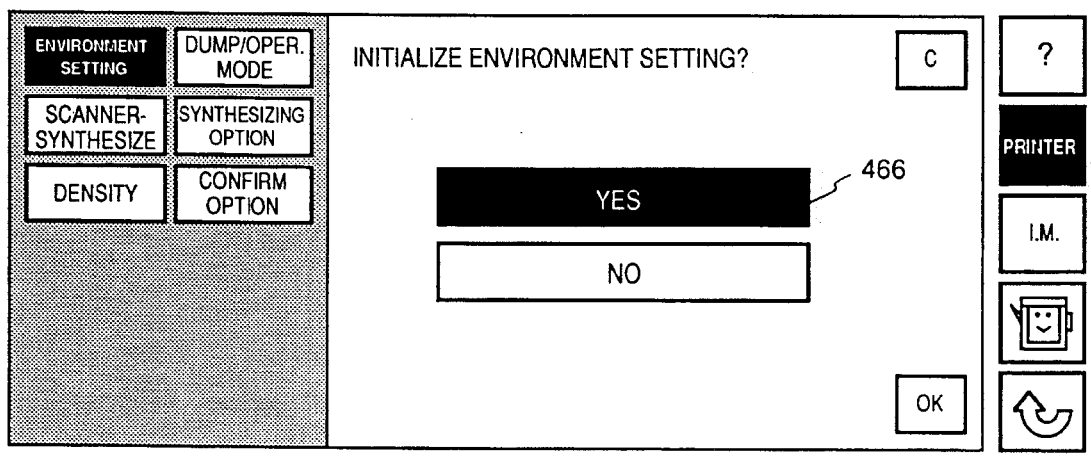

In FIG. 42B, if an INITIALIZE ENVIRONMENT SETTING key 464 is pressed, the panel image changes to the image in FIG. 43B for selecting initializing the environment setting to initial setting at the factory or not. If the operator selects a YES key 466 and presses the OK key, initialization is performed while a message "INITIALIZED" appears for a predetermined period e.g. one second, then the panel image returns to the image in FIG. 42B. Note that if the C key is pressed, the initialization is not performed and the image returns to the image in FIG. 42B.

In this manner, printing operation is executed in accordance with the set environment setting.

Figure 9:
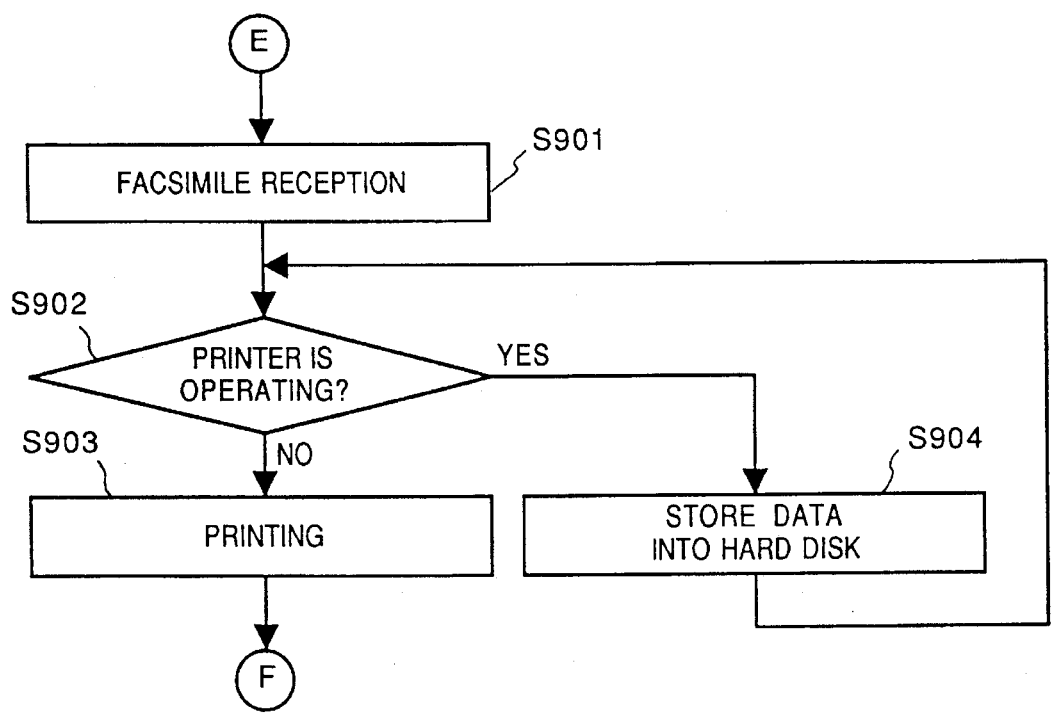
FIG. 9 is a flowchart showing the operation in a facsimile reception function according to the first embodiment.

FIG. 9 shows the processing in a case where a facsimile unit 4 receives some data in step S406 in FIG. 4.

In step S901, facsimile reception is performed by the facsimile unit 4. In step S902, whether or not the printer 2 is busy is determined. If NO, the process proceeds to step S903, in which the data is transferred to the printer 2 and printing is performed based on the data.

If YES in step S902, the process proceeds to step S904, in which the received data is stored in the hard disk 13 of the facsimile unit 4, and the process returns to step S902. When the printer 2 is not busy, the data is read out of the hard disk 12, and printing is performed based on the data in step S903. After the printing, the process returns to step S401 in FIG. 4.

Figure 44:
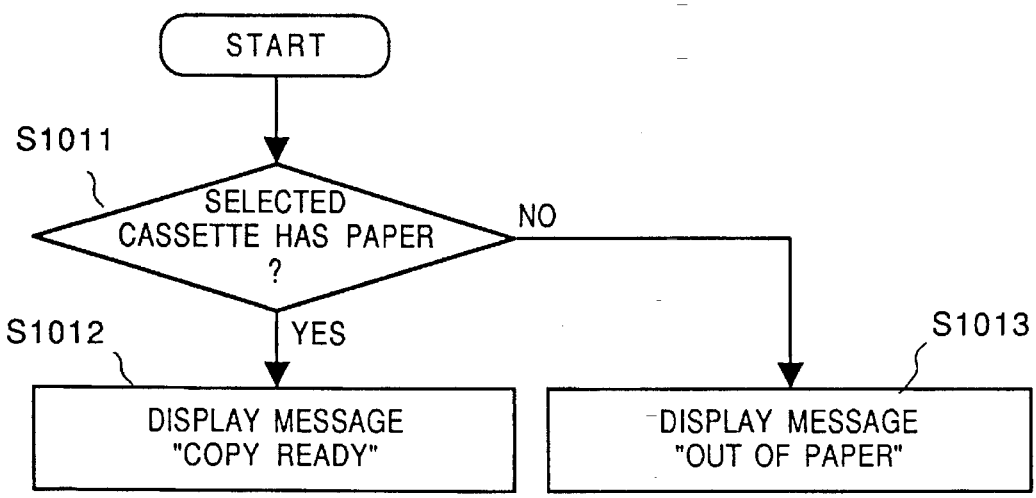
FIG. 44 is a flowchart showing display control when recording sheet is run out.
Figure 45:
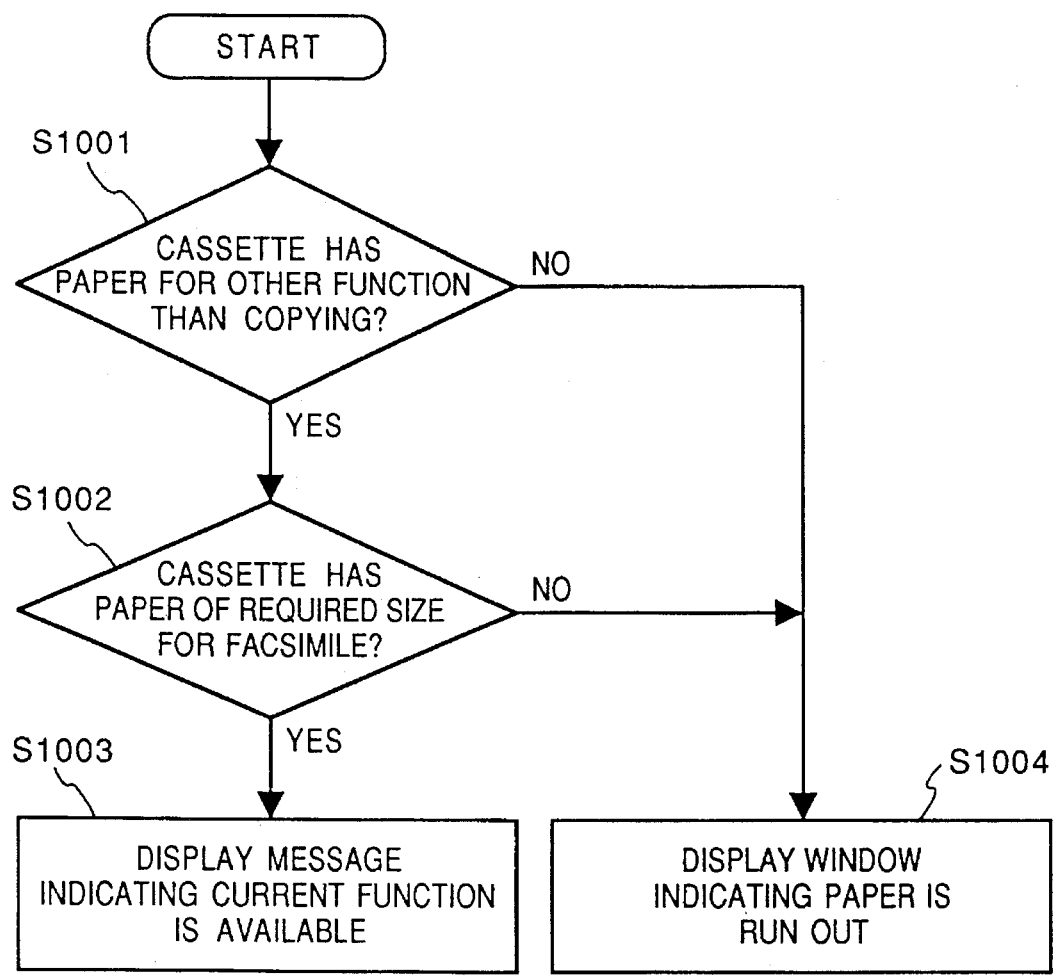
FIG. 45 is a flowchart showing display control when recording sheet is run out.

FIGS. 44 and 45 show the processing in a case where the printer 2 has no recording sheet. In this embodiment, a display when the printer has no recording sheet differs in the copy function and in the other functions than the copy function.

Figure 46:
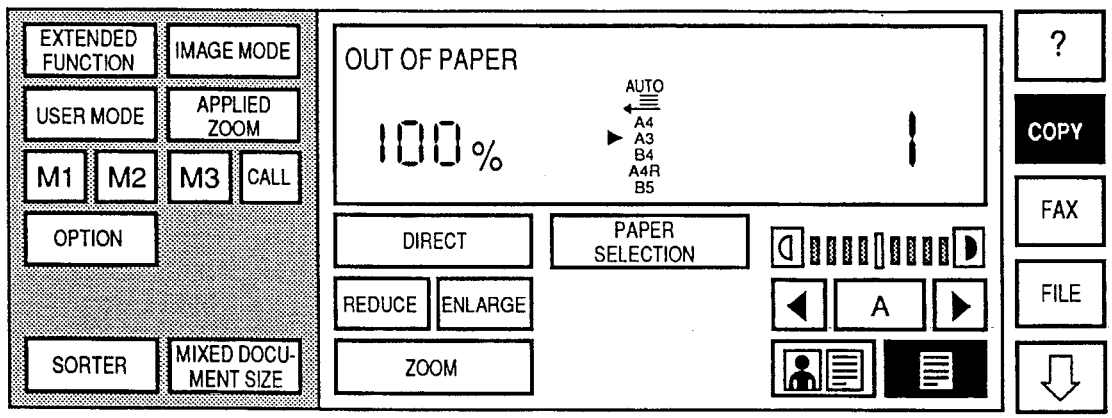
FIG. 46 illustrates a display example of a message indicating that paper cassette has no paper.

FIG. 44 shows the processing in the copy function. In step S1011, whether or not a selected paper cassette has paper is examined. If YES, the process proceeds to step S1012, in which a message "COPY READY" is displayed, while if NO, the process proceeds to step s1013, in which a message "OUT OF PAPER" is displayed. FIG. 46 shows a panel image having this message.

FIG. 45 shows the processing in the other function than the copy function. During printing, whether or not a paper cassette supplying paper in the other function than the copy function has paper is determined in step S1001. If YES, the process proceeds to step S1002, in which whether or not the cassette has paper of a required size for other function is examined. For example, in facsimile reception, where A4-sized paper is designated as recording sheet upon data reception, if there is no A4-sized paper, or when an A3-sized received image is reduced to an A4-sized image, if there is no larger sized paper than A4-sized paper, it is determined that recording sheet of the required size for facsimile output is run out. If it is determined otherwise, a message indicating that the selected function is available is displayed in step S1003. For example, the list of paper of larger size than the required size is displayed.

Figure 47:
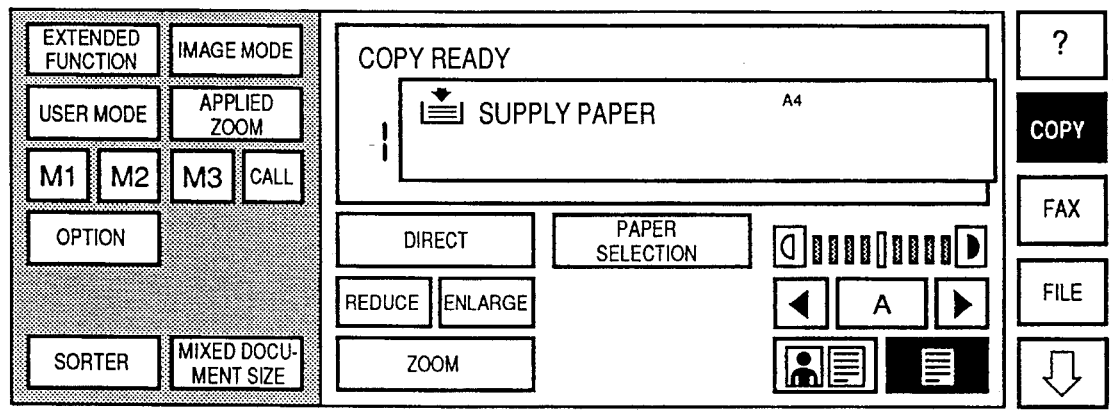
FIG. 47 illustrates a display example of a message indicating that a paper cassette selected in the copy function has paper but paper of a size to be outputted in the facsimile function is run out.
Figure 48:
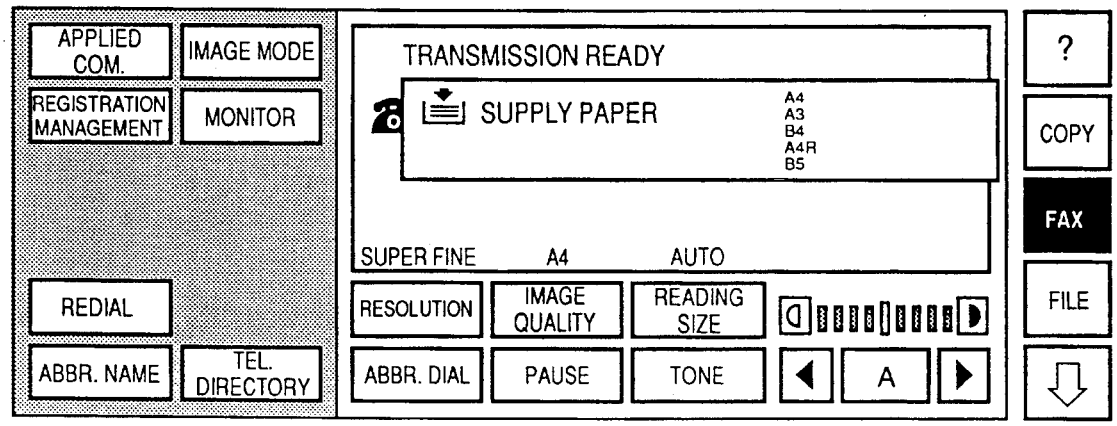
FIG. 48 illustrates a display example of a message indicating that a paper cassette selected in the facsimile function has paper but paper of a size to be outputted in the facsimile function is run out.

On the other hand, if NO in step S1001, i.e., the cassette supplying paper during the printing is out of paper, and if NO in step S1002, i.e., the cassette does not has paper of the required size, the process proceeds to step S1004, in which a small window image indicating that the required sized paper is run out is displayed. For example, when a cassette selected in the copy function has paper, but the paper of a required size for facsimile output is run out, the copy function setting image is as shown in FIG. 47. Further, the facsimile function setting image is as shown in FIG. 48.

Next, the processing in a case where operation of a function (function B) is performed when a panel image currently-being displayed is for setting another function (function A) will be described.

Figure 49:
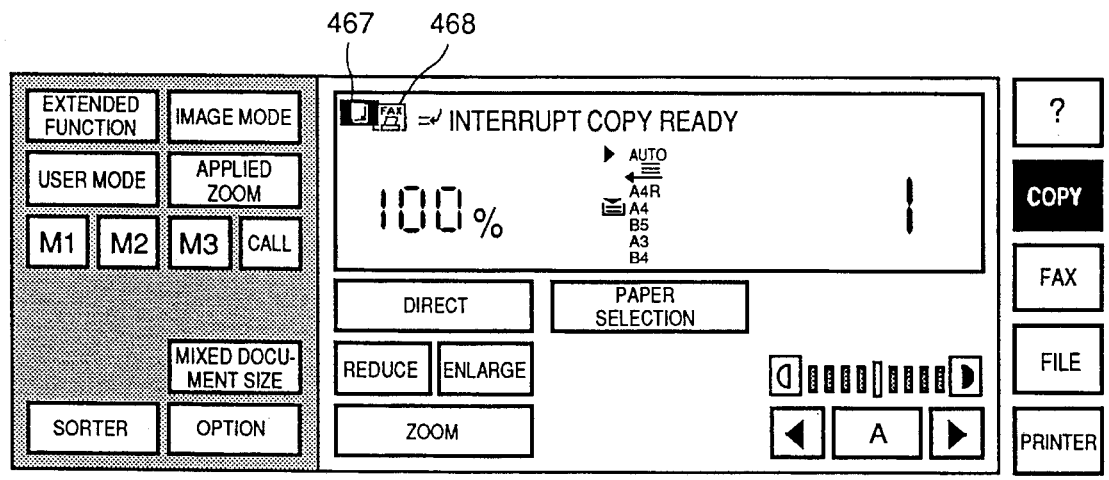
FIG. 49 illustrates a display according to the first embodiment when facsimile output is made while the operation panel has the display for the copy function.
Figure 50:
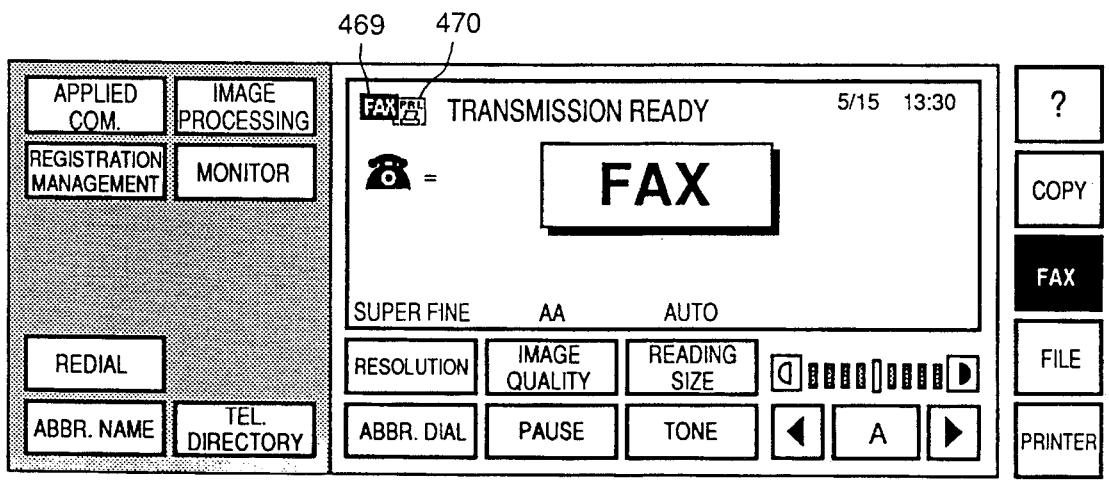
FIG. 50 illustrates a display according to the first embodiment when output from the printer formatter is made while the operation panel has the display for the facsimile function.

First, a message indicating the function A and an icon A indicative of the function A are displayed in the current panel image. As the core 10 transfers data indicating that a function B operates as well as a current function, an icon B representing the function B, operated in parallel to the current function A, appears within the panel image by the side of an icon A representing the current function, and the added icon B blinks. Next, as the operation of the function B is terminated, only the icon B representing the function B disappears from the panel image. For example, if there is facsimile reception while a panel image of copy function is displayed, the panel image becomes as shown in FIG. 49. Numeral 467 denotes the icon A for copy function; and 468, the icon B for facsimile reception function. If there is data output from the printer formatter while a panel image of facsimile function is displayed, the panel image becomes as shown in FIG. 50. Numeral 469 denotes the icon A for facsimile transmission function; and 470, the icon B for printer transmitter.

Next, error processing operation while a panel image of facsimile function is displayed will be described. Error detection is separately performed at the reader 1 or the printer 2, and the facsimile unit 4.

Figure 51:
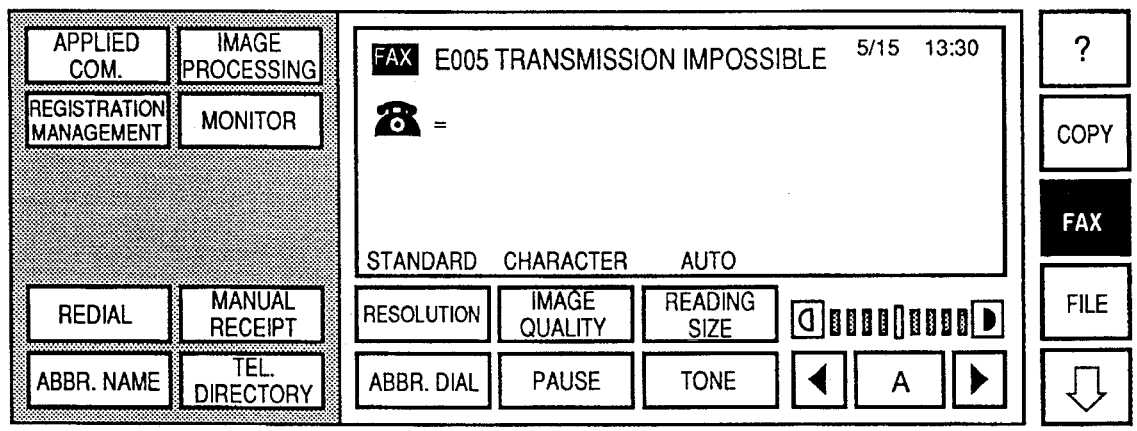
FIG. 51 illustrates a display according to the first embodiment when a facsimile board detects an error.
Figure 52:
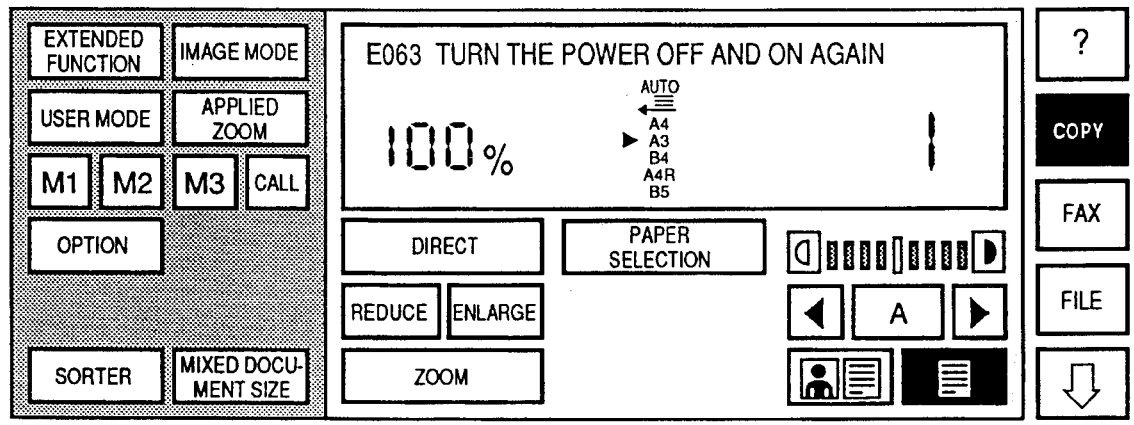
FIG. 52 illustrates a display example according to the embodiment when the reader/printer detects an error.

If the facsimile unit 4 detects an error, an error number is displayed in the facsimile setting image as shown in FIG. 51. If the reader 1 or the printer 2 detects an error, the panel image of facsimile function changes to a panel image of copy function, and an error number is displayed in the panel image of copy function. e.g., "E063" as shown in FIG. 52. In this manner, when an error is detected, a panel image of a function where the error has occurred appears with an error number. This enables forming a display program and data by function, thus attains easy designing of the apparatus.

Figure 53:
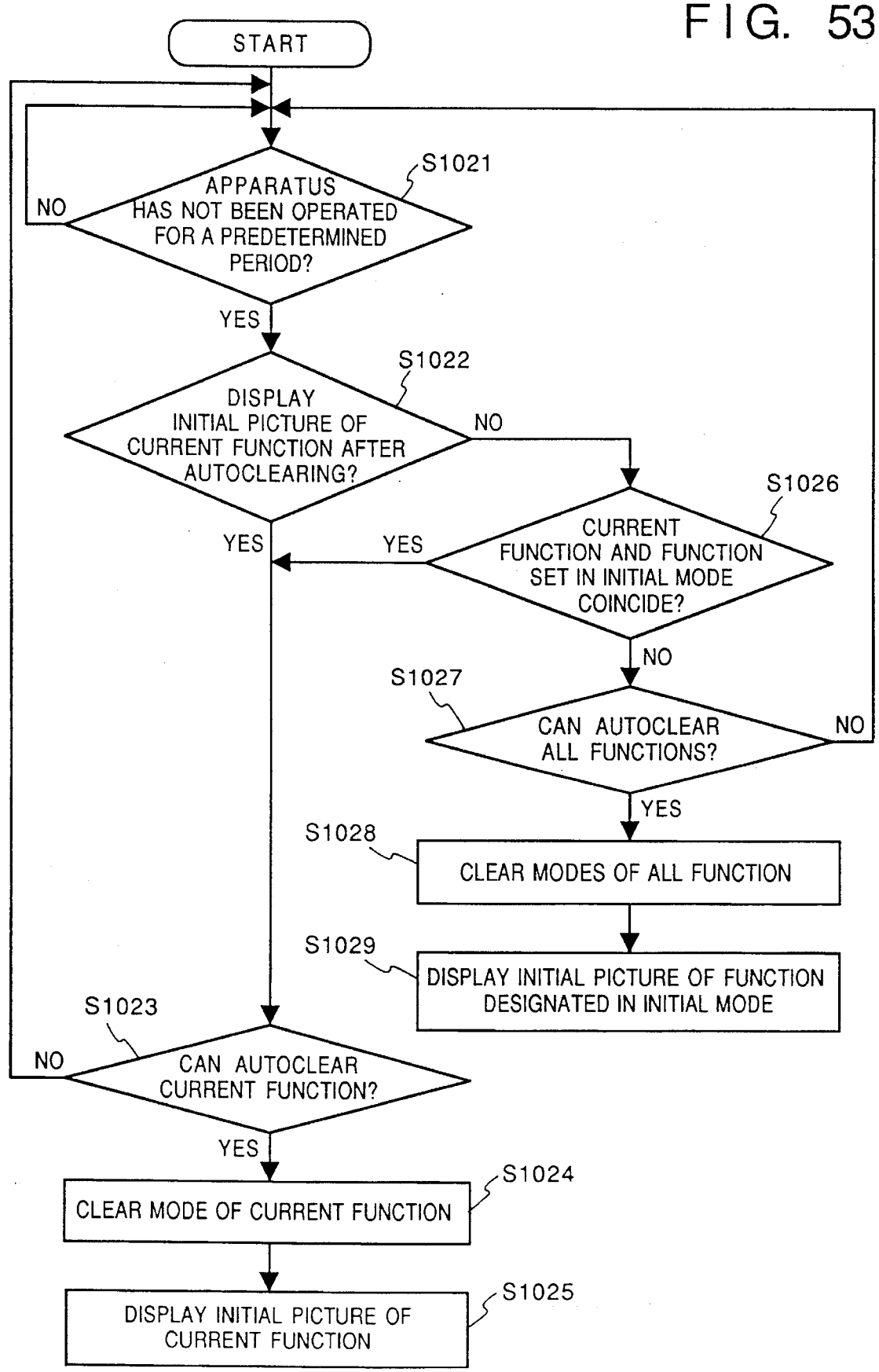
FIG. 53 is a flowchart showing an autoclear process according to the first embodiment.

FIG. 53 shows the autoclear processing. In step S1021, if it is determined that the apparatus has not been operated for a predetermined period, the process proceeds to step S1022, in which whether or not an initial panel image of function currently-being set is to be displayed after autoclearing is determined. If YES, the process proceeds to step S1023, in which whether or not the function currently-set can be autocleared is determined. If YES, the process proceeds to step S1024, in which a mode of the current function is autocleared, then in step S1025, an initial panel image of the current function is displayed.

If NO in step S1023, the process returns to step S1021.

On the other hand, in step S1022, if it is determined not to display the initial panel image of the current function after the autoclearing, the process proceeds to step S1026, in which whether or not the current function is the same as a function set after turning on the power is determined. If YES, the process proceeds to step S1023 to perform the aforementioned operation.

If NO in step S1026, the process proceeds to step S1027, in which whether or not all the functions can be autocleared is determined. If YES, the process proceeds to step S1028, in which the modes of all the function mode are cleared, and in step S1029, the initial panel image of a function set after turning on the power is displayed. If NO in step S1027, the process returns to step S1021.

It should be noted that the respective determinations in FIG. 53 are made based on predetermined operation modes to be described later.

Figure 54:
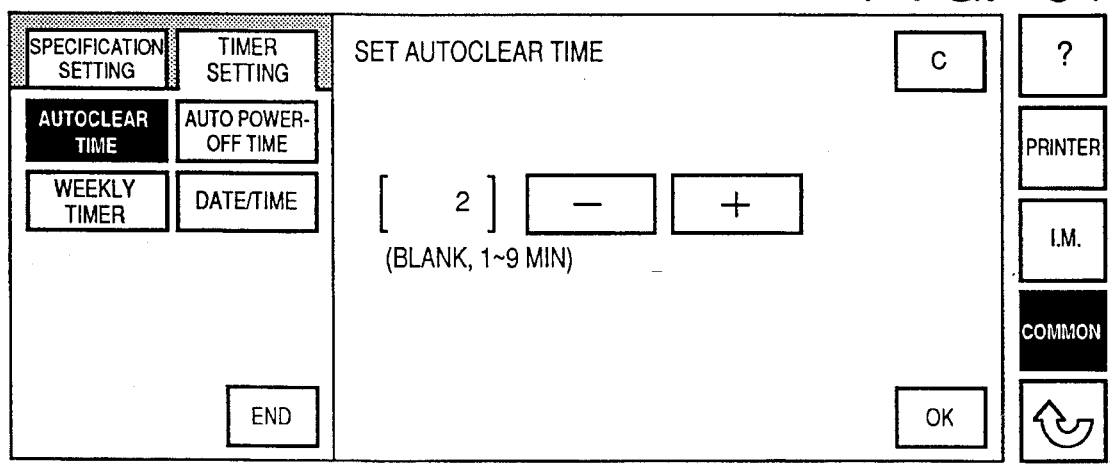
FIG. 54 illustrates a display for setting autoclear time according to the first embodiment.
Figure 55:
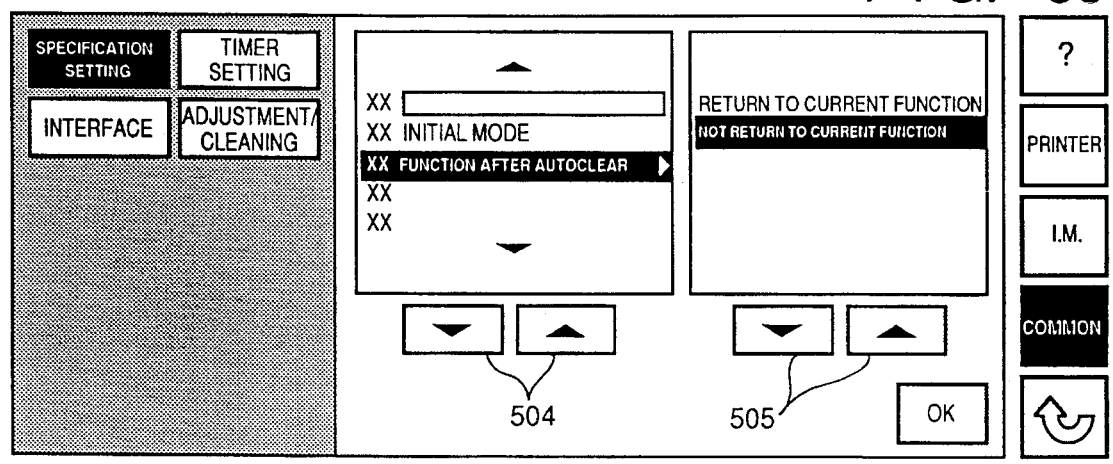
FIG. 55 illustrates a display for selecting the display of a current function or a display of an initial mode to be displayed after autoclearing.
Figure 56:
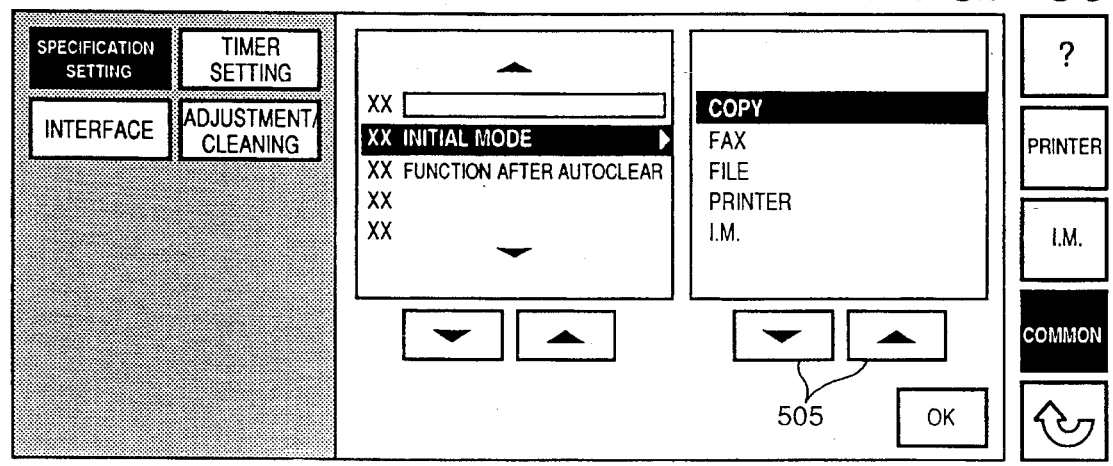
FIG. 56 illustrates a display for setting an initial function.

FIGS. 54 to 56 shows panel images in a case where a common setting mode for settings common to the respective functions is selected. For example, the autoclear function, which a set mode is cleared if no operation is made for a predetermined period, may be set.

FIG. 54 shows a panel image for setting autoclear time. The operator sets the time with the "−" key and the "+" key. As shown in FIG. 54, when the operator sets two minutes and presses the OK key, the autoclear time is set as two minutes. If the apparatus is not operated for two minutes and the mode is in clear-possible state, the mode is cleared.

FIG. 55 shows a panel image for selecting whether the initial panel image of the current function is displayed or a panel image of a function set in INITIAL MODE (FIG. 56) after turning on the power is displayed, after autoclearing. The operator selects FUNCTION AFTER AUTOCLEAR using "▼" and "▲" keys 504 and selects RETURN TO CURRENT FUNCTION or NOT RETURN TO CURRENT FUNCTION using "▼" and "▲" keys 505. If the operator selects NOT RETURN TO CURRENT FUNCTION and presses the OK key, the initial panel image of the function set in INITIAL MODE after the autoclearing is displayed. On the other hand, if the operator selects RETURN TO CURRENT FUNCTION and presses the OK key, the initial panel image of the current function is displayed.

As shown in FIG. 56., in a case were INITIAL MODE selected with the "▼" and "▲" keys 505 is copy function and the function after the autoclearing is NOT RETURN TO CURRENT MODE, if no operation is made for a predetermined period in, e.g., the facsimile function, and if all the functions are in autoclear-possible state, the copy function, the facsimile function and the other function modes are autocleared, and the initial panel image of the copy function is displayed.

If the autoclearing is prohibited when, e.g., paper for printing is run out, any mode of any functions is not cleared and the current function is maintained. Further, when RETURN TO CURRENT FUNCTION is selected as a function after the autoclearing, if no operation is made for a predetermined period in, e.g., in a panel image of facsimile function, only mode of the facsimile function is cleared, the copy function and the modes of other function are maintained, and the initial panel image of the facsimile function is displayed.

Next, setting of the common mode will be described below.

Figure 57A:
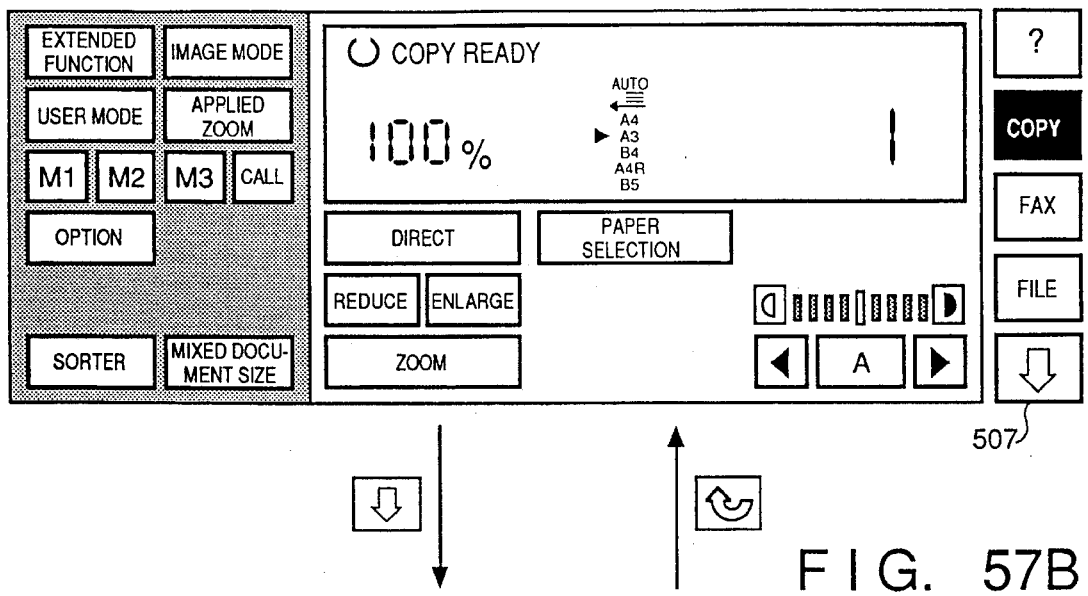
FIGS. 57A to 57C illustrate a display on the operation panel for setting a common function.
Figure 57B:
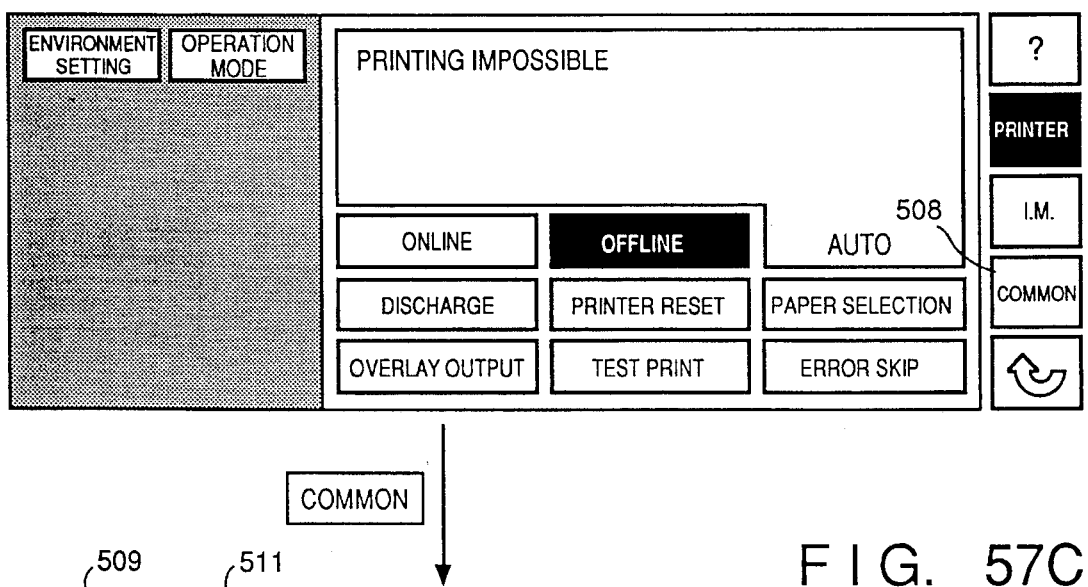
Figure 57C:
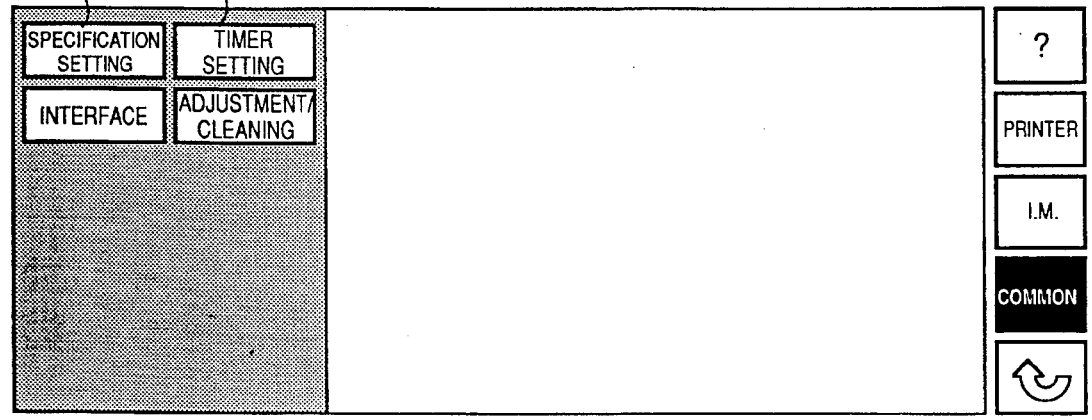
Figure 58:
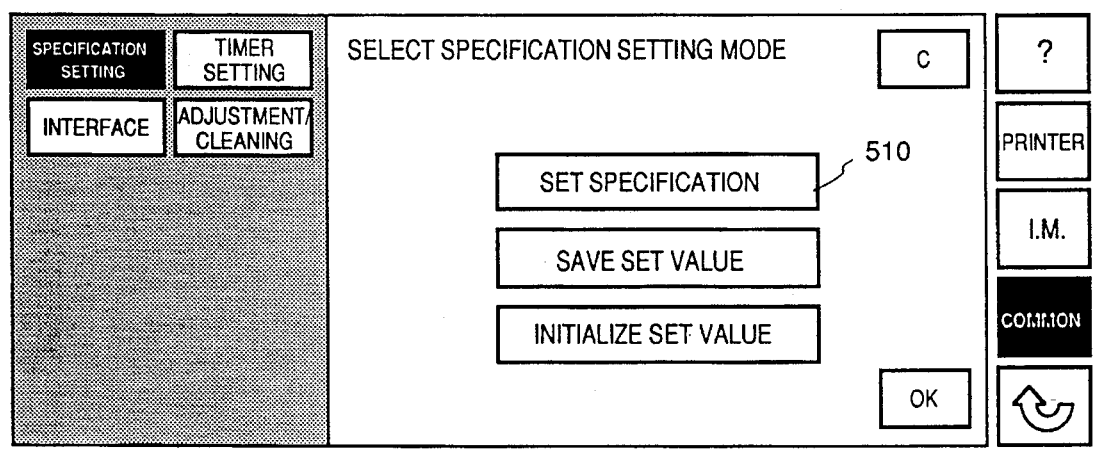
FIG. 58 illustrates a display on the operation panel in the common function setting.
Figure 59A:
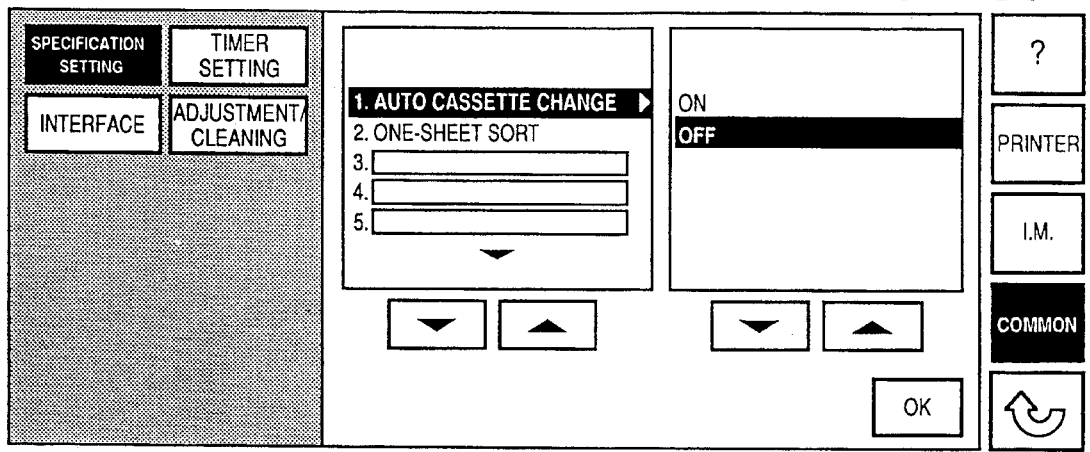
FIGS. 59A to 59C illustrate a display on the operation panel in the common function setting.
Figure 59B:
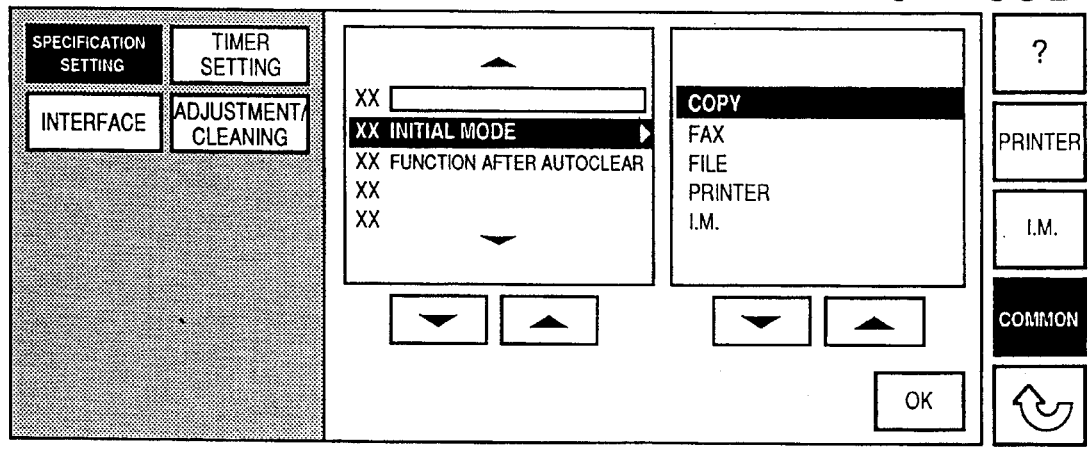
Figure 59C:
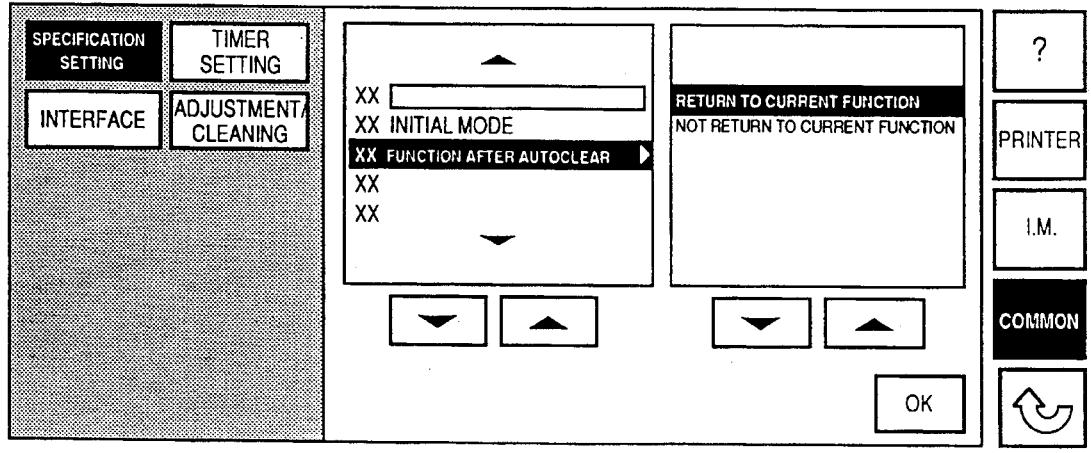

FIG. 57A shows an panel image in the copy function. If the operator presses a downward scroll key 507, the panel image changes to an image as shown in FIG. 57B. If the operator presses a COMMON key 508, the panel image changes to an image shown in FIG. 57C, then the common mode is set. In FIG. 57C, if a SPECIFICATION SETTING key 509 is selected, selection keys for specification setting, saving set values and initialization of set values appear as shown in FIG. 58. If the operator presses a SET SPECIFICATION key 510, the panel image changes to panel images shown in FIGS. 59A to 59C for various settings.

As described above, according to the present embodiment, autoclearing can be performed in accordance with respective functions of a multifunction image processing apparatus.

Second Embodiment

The second embodiment of the present invention will be described below. In the second embodiment, the apparatus construction is similar to that of the first embodiment, and therefore the explanation of the construction will be omitted. In this embodiment, the autoclearing processing shown in the flowchart of FIG. 53 is different.

Figure 60:
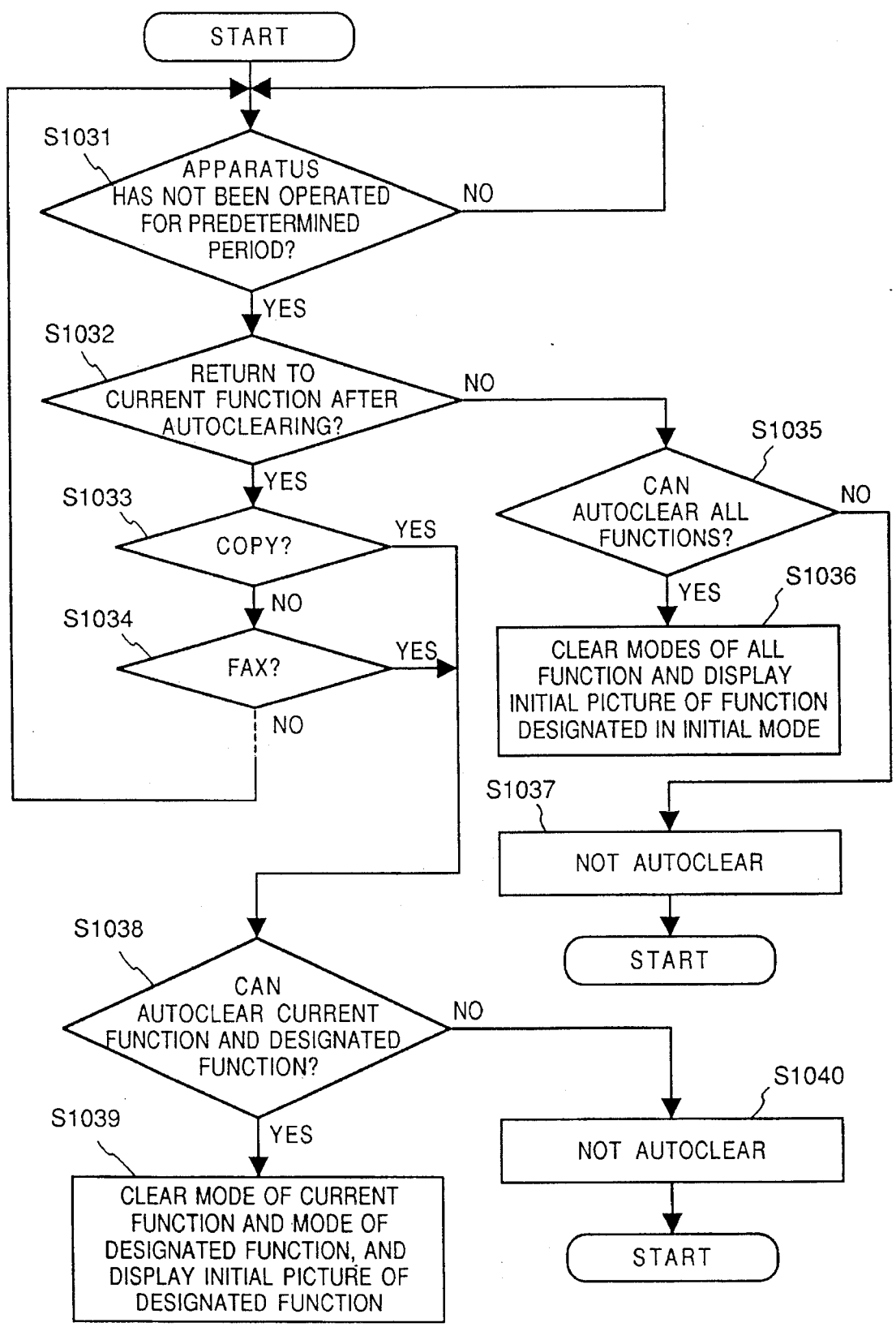
FIG. 60 is a flowchart showing autoclear function control according to a second embodiment.

FIG. 60 shows the autoclearing according to the second embodiment.

Figure 61:
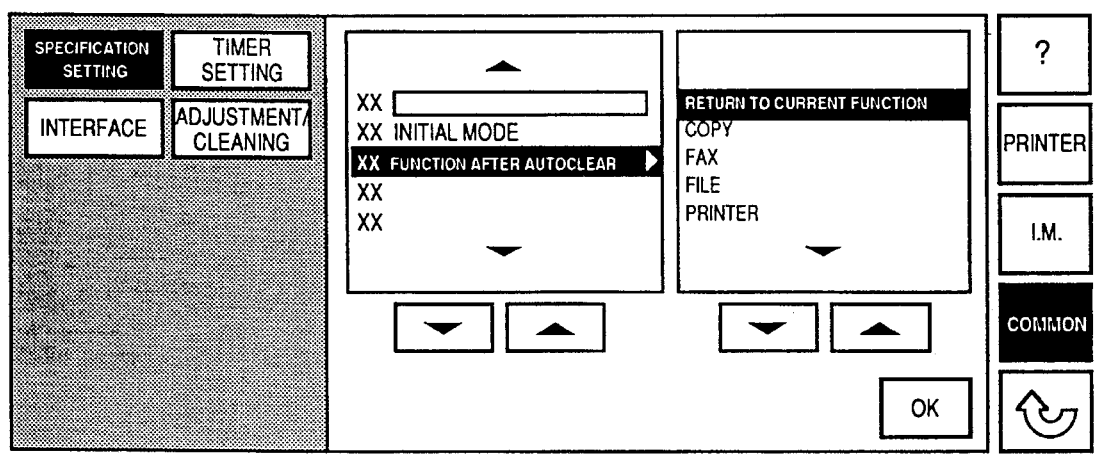
FIG. 61 illustrates a display on the operation panel for designating an autoclear function.

Note that the description will be made on the assumption that as shown in FIG. 61, the function has been selected as setting after the autoclearing in advance.

In step S1031, whether or not no operation has been made for a predetermined period is determined. If YES, the process proceeds to step S1032, in which whether or not NOT RETURN TO CURRENT FUNCTION is selected as setting after the autoclearing is determined. If YES, the process proceeds to step S1035, in which whether or not all functions are in autoclear-possible state is determined. If YES, the process proceeds to step S1036, in which modes of all functions are cleared, and similarly to the first embodiment, an initial panel image of a function set in an initial mode is displayed.

On the other hand, if NO in step S1035, the process proceeds to step S1037, in which the set mode is maintained, and the process returns to step S1031.

In step S1032, if NO, i.e., it is determined that RETURN TO CURRENT FUNCTION is selected as setting after the autoclearing, the process proceeds to step S1033, in which whether or not COPY is selected as setting after the autoclearing is determined. If NO, the process proceeds to step S1034, in which whether or not FAX is selected is determined. If NO, the process advances to repeat similar determination with respect to the respective other functions.

If one of the functions is selected, e.g., if it is determined that COPY or FAX is selected in step S1033 or S1034, the process proceeds to step S1038, in which whether or not both mode of the current function and mode of the pre-set function as setting after the autoclearing (the copy function, the facsimile function etc.) are in autoclear-possible state is determined. If YES, the process proceeds to step S1039, in which mode of the pre-set function and mode of the current function are cleared, and an initial panel image of the pre-set function is displayed.

On the other hand, if any of mode of the current function and mode of the pre-set function (the copy function, the facsimile function etc.) is not in autoclear-possible state, the process proceeds to step S1040, in which the autoclearing is not performed, and the process returns to step S1031.

As described above, according to the second embodiment, the autoclearing processing can be performed in accordance with the respective functions.

Third Embodiment

The third embodiment of the present invention will be described below. In the third embodiment, the apparatus construction is similar to that of the first embodiment, and therefore the explanation of the construction will be omitted.

In the third embodiment, the autoclearing is also different from that in the aforementioned embodiments.

Figure 62:
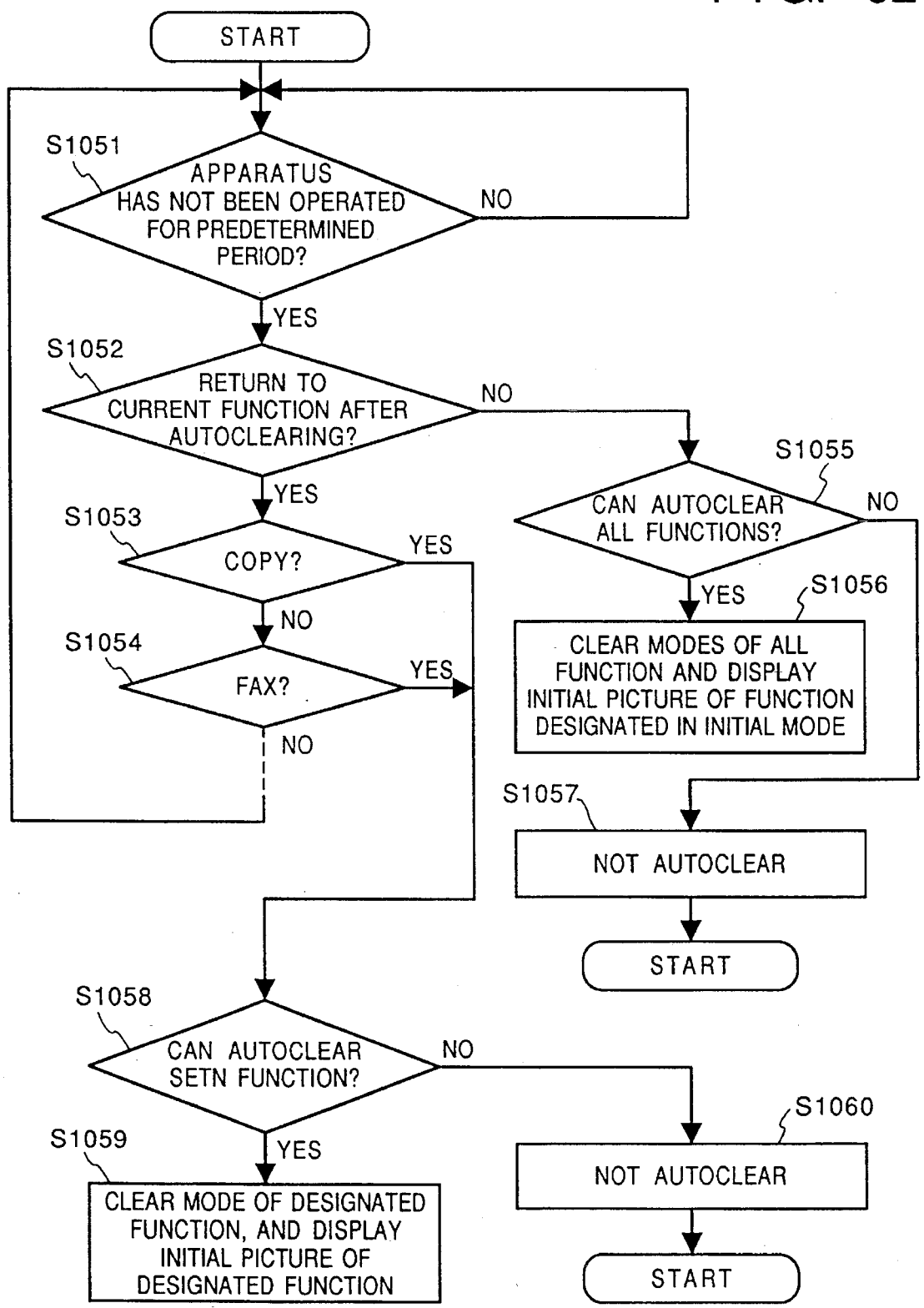
FIG. 62 is a flowchart showing an autoclear function according to a third embodiment.

The second embodiment performs the autoclearing if both of a mode of a current function and a mode of a designated function are in autoclear-possible state. However, the third embodiment perform the autoclearing if a designated function (the copy function, the facsimile function etc.) is in autoclear-possible state, regardless of a mode of a current function. The control of the third embodiment will be described with reference to the flowchart in FIG. 62.

In this embodiment, it is also assumed that NOT RETURN TO CURRENT FUNCTION has been selected in advance as setting after the autoclearing.

If no operation has been made for a predetermined period in step S1051, the process proceeds to step S1052, in which whether or not NOT RETURN TO CURRENT FUNCTION is selected as setting after the autoclearing is determined. If YES, the process proceeds to step S1055, in which whether or not all the functions are in autoclear-possible state is determined. If YES, the process proceeds to step S1056, in which modes of all functions are cleared, and similarly to the first embodiment, an initial panel image of a function set in INITIAL MODE is displayed.

On the other hand, if NO in step S1055, the process proceeds to step S1057, in which the autoclearing is not performed, and the process returns to step S1051.

In step S1052, if NO,. i.e., NOT RETURN TO CURRENT FUNCTION is selected as setting after the autoclearing, the process proceeds to step S1053, in which whether or not COPY is selected as setting after the autoclearing is determined. If NO, the process proceeds to step S1054, in which FAX is selected is determined. If NO, the process advances to repeat similar determination with respect to the respective other functions.

If any function is selected, e.g., in step S1053 or step S1054, COPY or FAX is selected, the process proceeds to step S1058, in which the selected function is in autoclear possible state is determined. If YES, regardless the current function is in autoclear possible state or not, the process proceeds to step S1059, in which only a mode of the selected function is autocleared while the current function is maintained, and then the initial panel image of the selected function is displayed.

On the other hand, if the selected function set as a function after the autoclearing is not in autoclear possible state in step S1058, the process proceeds to step S1060, in which the autoclearing is not performed, and the process returns to step S1031.

As described above, according to the third embodiment, the autoclearing processing can be performed in accordance with the respective functions.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. A multifunction image processing apparatus having at least a copy function for copying an original image and a print function for printing data from a computer, comprising:

selection means for selecting a desired function from a plurality of functions including the copy function and the print function;

a plurality of key-input means for setting a desired processing mode in the function selected by said selection means;

memory means for storing the processing mode set by said plurality of key-input means;

autoclear means for clearing the processing mode stored in said memory means if input by said plurality of key-input means has not been made for a predetermined period; and designation means for designating a function to be selected after clearing by said autoclear means.

2. The apparatus according to claim 1, further comprising:

display means for displaying a picture of the processing mode set by said plurality of key-input means; and control means for controlling said display means to display a picture of a standard processing mode of the function, designated by said designation means after the clearing by said autoclear means.

3. The apparatus according to claim 1, further comprising second selection means for selecting a mode for enabling designation by said designation means.

4. A multifunction image processing apparatus comprising:

first selection means for selecting a desired function from a plurality of functions;

a plurality of key-input means for setting a desired processing mode in the function selected by said first selection means;

autoclear means for clearing the processing mode set by said plurality of key-input means if said image processing apparatus has not been operated in the function selected by said first selection means for a predetermined period; and designation means for designating maintaining the function selected by said first selection means, or automatically selecting a specific function, after clearing the processing mode by said autoclear means.

5. The apparatus according to claim 4, further comprising a second selection means for selecting in advance the specific function among the plurality of functions.

6. A multifunction image processing apparatus comprising:

selection means for selecting a desired function from a plurality of functions;

a plurality of key-input means for setting a desired processing mode in the function selected by said selection means;

autoclear means for clearing the processing mode set by said plurality of key-input means if the image processing apparatus has not been operated for a predetermined period; and designation means for designating a function to be cleared by said autoclear means, wherein said autoclear means sets the processing mode in the function designated by said designation means to a predetermined standard mode, no matter whether the function is selected by said selection means or not.

7. In an image processing apparatus having at least a copy function for copying an original image and a print function for printing data from a computer, and comprises selection means for selecting a desired function from a plurality of functions including the copy function and the print function, a plurality of key-input means for selecting a desired processing in the function selected by said selection means, memory means for storing the processing mode set by said plurality of key-input means, and autoclear means for clearing the processing mode stored in said memory means if input by said plurality of key-input means has not been made for a predetermined period, an image processing control method for controlling the image process apparatus, the method comprising the steps of:

designating, in advance, a function to be selected after clearing by said autoclear means; and automatically selecting the function designated in said designating step, after the processing mode stored in said memory means has been cleared by said autoclear means.

8. The method according to claim 7, further comprising the step of displaying a picture of a standard processing mode in the function selected in said selecting step.

9. In a multifunction image processing apparatus which comprises selection means for selecting a desired function from a plurality of functions, a plurality of key-input means for setting a desired processing mode in the function selected by said selection means, and autoclear means for clearing the processing mode set by said plurality of key-input means if said image processing apparatus has not been operated in the function selected by said selection means for a predetermined period, an image processing control method for controlling the multifunctional image processing apparatus, the method comprising the steps of:

designating, in advance, to maintain the function selected by said selection means, or automatically to select a specific function, after clearing the processing mode by said autoclear means; and controlling, after clearing the processing mode by said autoclear means, to maintain the function which has been selected by said selection means or to select the specific function, in accordance with the designation at said designating step.

10. The method according to claim 9, further comprising the step of designating, in advance, the specific function from the plurality of functions.

11. In a multifunction image processing apparatus which includes, selection means for selecting a desired function from a plurality of functions, a plurality of key-input means for setting a desired processing mode in the function selected by said selection means, and autoclear means for clearing the processing mode set by said plurality of key-input means if the image processing apparatus has not been operated for a predetermined period, an image processing control method for controlling the multifunctional image processing apparatus, the method comprising the steps of:

designating, in advance, a function to be cleared by said autoclear means; and setting a predetermined standard mode as a processing mode in the function designated at said designating step, in the case said image processing apparatus has not been operated for a predetermined period, whether or not the function designated at said designating step has been selected by said selection means.

* * * * *